United States Patent
Goldston et al.

(10) Patent No.: US 12,530,437 B2
(45) Date of Patent: *Jan. 20, 2026

(54) TOKENIZED MEDIA CONTENT MANAGEMENT

(71) Applicant: TUNEGO, INC., Henderson, NV (US)

(72) Inventors: Mark Goldston, Beverly Hills, CA (US); Stacy Haitsuka, Las Vegas, NV (US); John Kohl, Henderson, NV (US); Ofek Hayon, Las Vegas, NV (US); Harold MacKenzie, Torrance, CA (US)

(73) Assignee: TUNEGO, INC., Henderson, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,298

(22) Filed: Sep. 27, 2022

(65) Prior Publication Data

US 2023/0273980 A1 Aug. 31, 2023

Related U.S. Application Data

(63) Continuation of application No. 17/586,747, filed on Jan. 27, 2022, now Pat. No. 11,500,972, which is a
(Continued)

(51) Int. Cl.
*G06F 21/00* (2013.01)
*G06F 16/61* (2019.01)
(Continued)

(52) U.S. Cl.
CPC .............. *G06F 21/16* (2013.01); *G06F 16/61* (2019.01); *G06F 16/686* (2019.01); *G06F 3/0482* (2013.01); *G06F 21/1078* (2023.08)

(58) Field of Classification Search
CPC . H04L 2209/56; H04L 2209/38; G06F 21/16; G06F 16/61; G06F 16/686; G06F 3/0482; G06F 2221/0775; G06Q 2220/00
See application file for complete search history.

(56) References Cited

U.S. PATENT DOCUMENTS 7,920,528 B2 4/2011 Karaoguz
8,312,064 B1 11/2012 Gauvin
(Continued)

FOREIGN PATENT DOCUMENTS

JP 2012521036 9/2012
JP 2014010343 1/2014
(Continued)

OTHER PUBLICATIONS

Deahl, Dani., "Metadata is the Biggest Little Problem Plaguing the Music Industry," The Verge, The Verge, May 29, 2019, www.theverge.com/2019/5/29/18531476/music-industry-song-royalties-metadata-credit-problems, (Year: 2019), 8 pages.
(Continued)

*Primary Examiner* — Yogesh Paliwal
(74) *Attorney, Agent, or Firm* — Sheppard Mullin Richter & Hampton LLP

(57) ABSTRACT

A system and method for media content management include creating, via a digital vault, a container file comprising media content submitted by a user and content metadata; verifying, via the digital vault, a completeness of the content metadata associated with the media content in the container file; classifying, via the digital vault, the container file based on the completeness of the media content; and capturing, via the digital vault, event metadata when a second user gains access to the container file, the event metadata comprising identification of the second user, an activation timestamp, a duration of access, portions of the container file accessed, and changes to the container file.

20 Claims, 30 Drawing Sheets

Related U.S. Application Data continuation of application No. 17/240,916, filed on Apr. 26, 2021, now Pat. No. 11,256,788, which is a continuation-in-part of application No. 17/221,723, filed on Apr. 2, 2021, now Pat. No. 11,604,858, which is a continuation-in-part of application No. 16/950,734, filed on Nov. 17, 2020, now Pat. No. 11,030,283, which is a continuation of application No. 16/681,598, filed on Nov. 12, 2019, now Pat. No. 10,860,694, which is a continuation-in-part of application No. 15/831,128, filed on Dec. 4, 2017, now abandoned, which is a continuation-in-part of application No. 15/430,871, filed on Feb. 13, 2017, now Pat. No. 9,836,619.

(60) Provisional application No. 62/872,348, filed on Jul. 10, 2019.

(51) Int. Cl.
  G06F 16/68 (2019.01)
  G06F 21/16 (2013.01)
  G06F 3/0482 (2013.01)
  G06F 21/10 (2013.01)

(56) References Cited

U.S. PATENT DOCUMENTS

| | | | |
|---|---|---|---|
| 8,321,064 | B2 | 11/2012 | Kazuo |
| 8,484,089 | B1 | 7/2013 | Lin |
| 9,253,282 | B2 | 2/2016 | O'Donoghue |
| 9,397,998 | B2 | 7/2016 | Ford |
| 10,819,504 | B2 | 10/2020 | Shi |
| 10,819,507 | B2 | 10/2020 | Dewan |
| 11,556,620 | B2 | 1/2023 | Goldston |
| 2002/0002468 | A1 | 1/2002 | Spagna |
| 2002/0087224 | A1 | 7/2002 | Barile |
| 2002/0099694 | A1 | 7/2002 | Diamond |
| 2003/0220894 | A1 | 11/2003 | Russon |
| 2004/0267390 | A1 | 12/2004 | Ben-Yaacov |
| 2005/0038813 | A1 | 2/2005 | Apparao |
| 2005/0055372 | A1 | 3/2005 | Springer |
| 2005/0091681 | A1 | 4/2005 | Borden |
| 2006/0062426 | A1 | 3/2006 | Levy |
| 2006/0176516 | A1 | 8/2006 | Rothschild |
| 2006/0229993 | A1 | 10/2006 | Cole |
| 2007/0027707 | A1 | 2/2007 | Murray |
| 2007/0220092 | A1 | 9/2007 | Heitzeberg |
| 2007/0244924 | A1 | 10/2007 | Sadovsky |
| 2007/0283167 | A1 | 12/2007 | Venters, III |
| 2008/0065547 | A1 | 3/2008 | Shimizu |
| 2008/0126937 | A1 | 5/2008 | Pachet |
| 2008/0154696 | A1 | 6/2008 | Spiegelman |
| 2008/0163312 | A1 | 7/2008 | Faust |
| 2008/0175190 | A1 | 7/2008 | Lee |
| 2008/0280598 | A1 | 11/2008 | Delegue |
| 2008/0318669 | A1 | 12/2008 | Buchholz |
| 2009/0063574 | A1 | 3/2009 | Kim |
| 2009/0282093 | A1 | 11/2009 | Allard |
| 2009/0307201 | A1 | 12/2009 | Dunning |
| 2010/0017395 | A1 | 1/2010 | Wayn |
| 2010/0030607 | A1 | 2/2010 | Holcombe |
| 2010/0046553 | A1 | 2/2010 | Daigle |
| 2011/0083085 | A1 | 4/2011 | Steelberg |
| 2011/0125999 | A1 | 5/2011 | Cilfone |
| 2011/0188718 | A1 | 8/2011 | Hill |
| 2011/0208616 | A1 | 8/2011 | Gorman |
| 2011/0218983 | A1 | 9/2011 | Chaney |
| 2012/0072608 | A1 | 3/2012 | Peters |
| 2012/0150997 | A1 | 6/2012 | Mcclements, IV |
| 2012/0158531 | A1 | 6/2012 | Dion |
| 2012/0158802 | A1 | 6/2012 | Lakshmanan |
| 2013/0227038 | A1 | 8/2013 | Rich |
| 2013/0238474 | A1 | 9/2013 | Nagel |
| 2013/0263184 | A1* | 10/2013 | Melnychenko ...... H04N 21/482 725/50 |
| 2014/0040216 | A1 | 2/2014 | Eric |
| 2014/0081846 | A1 | 3/2014 | Gallagher |
| 2014/0156363 | A1 | 6/2014 | Hsu |
| 2014/0195025 | A1 | 7/2014 | Wieder |
| 2014/0195675 | A1 | 7/2014 | Silver |
| 2014/0278873 | A1 | 9/2014 | Shimizu |
| 2014/0280763 | A1 | 9/2014 | Grab |
| 2014/0289516 | A1 | 9/2014 | Sahay |
| 2014/0297655 | A1 | 10/2014 | Paglia |
| 2014/0336798 | A1 | 11/2014 | Emerson, III |
| 2014/0336799 | A1 | 11/2014 | Emerson, III |
| 2014/0359465 | A1 | 12/2014 | Litan Sever |
| 2015/0177938 | A1 | 6/2015 | Kleinpeter |
| 2015/0188975 | A1 | 7/2015 | Hansen |
| 2015/0207786 | A1 | 7/2015 | Pitroda |
| 2015/0235276 | A1 | 8/2015 | Wilson |
| 2016/0005135 | A1 | 1/2016 | Bokestad |
| 2016/0098393 | A1 | 4/2016 | Hebert |
| 2016/0232538 | A1 | 8/2016 | Papakostas |
| 2016/0267178 | A1 | 9/2016 | Wang |
| 2016/0275194 | A1 | 9/2016 | Borza |
| 2016/0352523 | A1 | 12/2016 | Bisbee |
| 2017/0024399 | A1 | 1/2017 | Boyle |
| 2017/0099149 | A1 | 4/2017 | Eber |
| 2017/0140743 | A1 | 5/2017 | Gouyon |
| 2017/0359353 | A1 | 12/2017 | Tan |
| 2018/0063594 | A1 | 3/2018 | Alexander |
| 2018/0109587 | A1 | 4/2018 | Spilka |
| 2018/0218451 | A1 | 8/2018 | Bebber |
| 2019/0220836 | A1 | 7/2019 | Caldwell |
| 2019/0238320 | A1* | 8/2019 | Mccurry ................. G06F 21/64 |
| 2019/0286646 | A1 | 9/2019 | Kraytem |
| 2019/0355336 | A1 | 11/2019 | Steinwedel |
| 2020/0005284 | A1* | 1/2020 | Vijayan ................... H04L 63/08 |
| 2020/0082061 | A1* | 3/2020 | Goldston .............. G06F 16/686 |
| 2021/0201336 | A1* | 7/2021 | Mallett ................... G06F 3/011 |
| 2021/0358038 | A1 | 11/2021 | Vandenberg |
| 2022/0067086 | A1 | 3/2022 | Jahan |
| 2022/0075845 | A1 | 3/2022 | Bowen |
| 2022/0309491 | A1 | 9/2022 | Shapiro |
| 2022/0351195 | A1 | 11/2022 | Quigley |
| 2022/0391888 | A1 | 12/2022 | Kim |
| 2023/0081488 | A1 | 3/2023 | Ramaswamy |
| 2023/0119641 | A1 | 4/2023 | Meyers |

FOREIGN PATENT DOCUMENTS

| | | | |
|---|---|---|---|
| JP | 2015021987 | 2/2015 | |
| KR | 1020080081954 | 9/2008 | |
| WO | 2010107490 | 9/2010 | |
| WO | 2020092900 | 5/2020 | |
| WO | WO-2020092900 A2 * | 5/2020 | ........... G06F 21/602 |

OTHER PUBLICATIONS

European Union Intellectual Property Office, European Search Report and Written Opinion for European Application No. EP18208302.2, mailed Feb. 15, 2019, 10 total pages.

Ex Parte Quayle Office Action dated Jul. 9, 2021 for U.S. Appl. No. 17/240,928, filed Apr. 26, 2021, 10 pages.

Final Office Action dated Feb. 18, 2022 for U.S. Appl. No. 17/221,723, filed Apr. 2, 2021, 22 pages.

Final Office Action dated Nov. 9, 2021 for U.S. Appl. No. 16/601,886, filed Oct. 15, 2019, 15 pages.

Final Office Action mailed Oct. 4, 2021 for U.S. Appl. No. 15/831,128, filed Dec. 4, 2017, 35 pages.

Musician Blog Post, "Metadata and Label Copy—the role of data in the Music Industry," Apr. 30, 2014, https://musician.pro/en/resources/blog/metadata-label-copy, 7 pages.

International Search Report and Written Opinion mailed Jan. 4, 2021 for International Application No. PCT/US2020/059863, filed Nov. 10, 2020, 6 pages.

International Search Report and Written Opinion mailed Jun. 3, 2022 for International Application No. PCT/US2022/026401, filed Apr. 26, 2022, 6 pages.

(56) References Cited

OTHER PUBLICATIONS

International Search Report and Written Opinion mailed Jun. 9, 2022 for International Application No. PCT/US2022/026397, filed Apr. 26, 2022, 6 pages.
International Search Report and Written Opinion mailed Oct. 13, 2020 for International Application No. PCT/US2020/041567, filed Jul. 10, 2020, 9 pages.
Japan Intellectual Property Office, Notice for Reasons for Rejection for Japanese Application No. 2018-216844, mail date Jan. 29, 2019, 4 total pages with English translation.
Non-final Office Action dated Jan. 31, 2020 for U.S. Appl. No. 16/681,598, filed Nov. 12, 2019, 15 pages.
Non-final Office Action dated Jul. 21, 2021 for U.S. Appl. No. 17/240,916, filed Apr. 26, 2021, 12 pages.
Non-final Office Action dated Jun. 17, 2021 for U.S. Appl. No. 16/601,886, filed Oct. 15, 2019, 15 pages.
Non-final Office Action dated Jun. 21, 2021 for U.S. Appl. No. 15/831,128, filed Dec. 4, 2017, 36 pages.
Non-final Office Action dated Jun. 24, 2021 for U.S. Appl. No. 17/221,723, filed Apr. 2, 2021, 10 pages.
Non-final Office Action dated Sep. 14, 2021 for U.S. Appl. No. 17/221,723, filed Apr. 2, 2021, 13 pages.
Non-final Office Action mailed May 27, 2022 for U.S. Appl. No. 15/831,128, filed Dec. 4, 2017, 27 pages.
Stinson, Jamie, "Spotify drops five-plays-per-song limit for free users," MSE News article, published Mar. 19, 2013, http://moneysavingexpert.com/new/shopping/2013/03/spotify-drops-five-play-per-song-limit-for-free-users?ga=1.81803094.1534910942.1487007596, 2 total pages.
The Spotify Community, "How long do you have to listen for a song to count as "played"?", Message board between Nov. 11, 2014 and Jan. 4, 2017, https://community.spotify.com/t5/forums/replypage/board-id/002/message-id/14842, last accessed Jan. 5, 2017, 8 total pages.
Kelly, James, "NFT Royalties Explained: What Are They and How Do They Work?", NFTgators, <URL: https://www.nftgators.com/nft-royalties-explained/>, Dec. 26, 2021 (Year: 2021), 3 pages.

\* cited by examiner

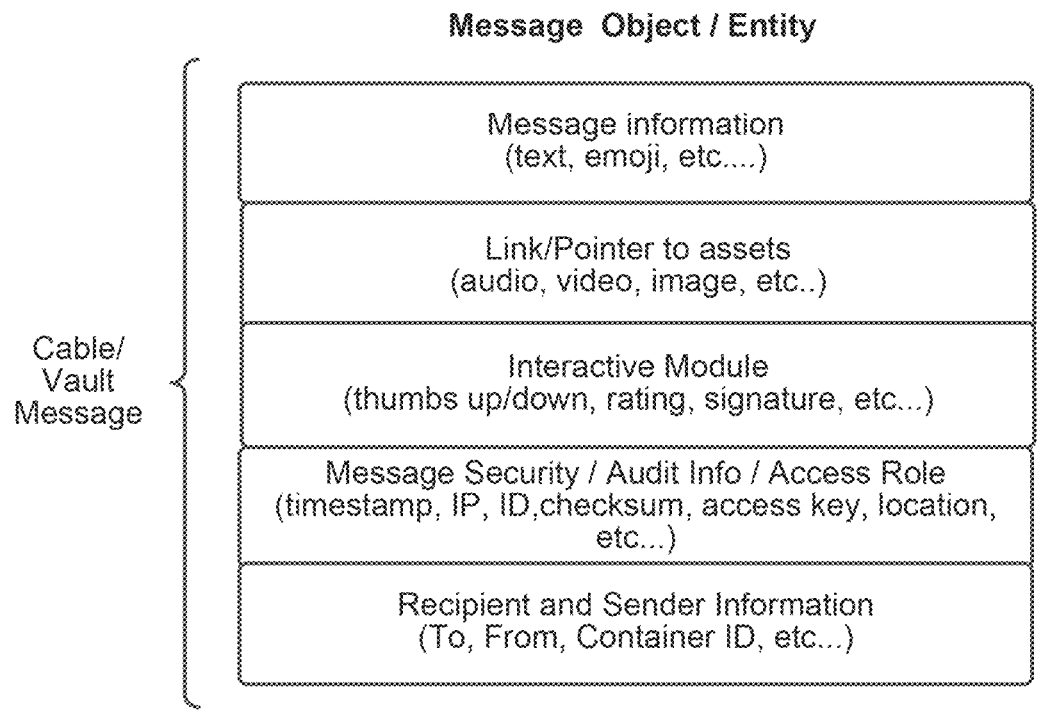
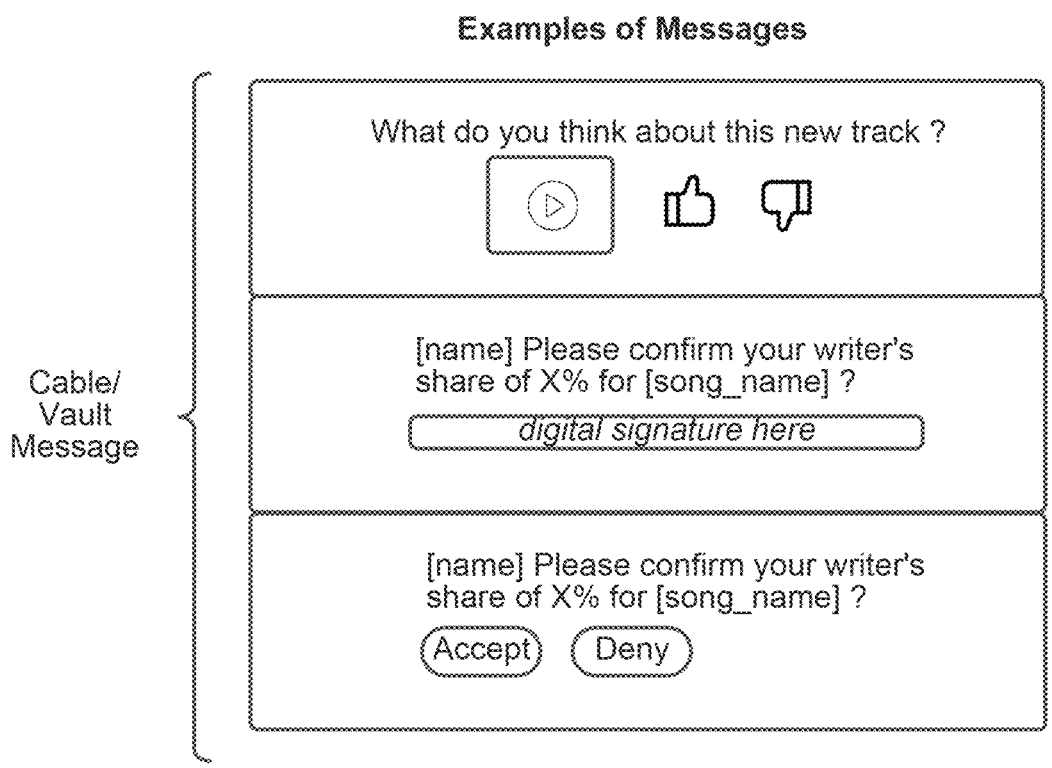
Fig. 24

TOKENIZED MEDIA CONTENT MANAGEMENT

CROSS-REFERENCE TO RELATED APPLICATIONS

This application is a continuation of U.S. patent application Ser. No. 17/586,747, filed on Jan. 27, 2022, titled "TOKENIZED MEDIA CONTENT MANAGEMENT", which is a continuation of U.S. patent application Ser. No. 17/240,916, filed on Apr. 26, 2021, which is a continuation-in-part of and claims the benefit of U.S. patent application Ser. No. 17/221,723, filed on Apr. 2, 2021, titled "MEDIA CONTENT MANAGEMENT," which is a continuation-in-part of U.S. patent application Ser. No. 16/950,734, filed Nov. 17, 2020, titled "MEDIA CONTENT MANAGEMENT," which is a continuation of and claims the benefit of U.S. patent application Ser. No. 16/681,598, issued as U.S. Pat. No. 10,860,694, filed Nov. 12, 2019, titled "SYSTEMS AND METHODS FOR CONTENT METADATA MANAGEMENT," which is a continuation-in-part of and claims the benefit of U.S. patent application Ser. No. 15/831,128, filed Dec. 4, 2017, titled "DIGITAL VAULT FOR MUSIC OWNERS," which is a continuation-in-part of and claims the benefit of U.S. patent application Ser. No. 15/430,871, issued as U.S. Pat. No. 9,836,619, filed Feb. 13, 2017, titled "DIGITAL VAULT FOR MUSIC OWNERS," each of which is incorporated by reference in their entirety as if reproduced in full below.

U.S. patent application Ser. No. 16/681,598 also claims the benefit of U.S. Patent Application No. 62/872,348, filed on Jul. 10, 2019, titled "SYSTEMS AND METHODS FOR CONTENT METADATA MANAGEMENT," which is incorporated herein by reference in its entirety.

TECHNICAL FIELD

The disclosed technology relates generally to media content files, and more particularly, some embodiments relate to containers for media content and associated content metadata.

DESCRIPTION OF THE RELATED ART

The recording industry has struggled for many years with problems associated with keeping track of records associated with audio recordings. Record labels, licensing companies, publishers and other industry participants have been known to spend months, and sometimes years, tracking down music rights information and other records associated with audio recordings. Also, the industry in general and the artist themselves have often struggled with keeping track of who contributed to the creation of a song or who should otherwise have certain rights. These issues are not limited to audio recordings and can span other media content as well.

The foregoing issues can lead to difficulties when licensing content for use by third parties, difficulties recognizing and compensating artists for their contribution to content, difficulties with version control for content items, and difficulties keeping track of pertinent content information in general.

The media content industry has yet to arrive at an acceptable solution, leading to critical data being lost or untraceable and in some cases the loss of rights. Current manual techniques for addressing metadata have proven unsuccessful as oftentimes metadata is either lost or incomplete, or not collected in the first place. Participants such as content creators and publishers are also often unaware of the types of information that needs to be collected and maintained along with their content. Accordingly, much time is often spent after the fact attempting to locate and gather this information. In some instances, the information is no longer available due to the amount of time that has passed.

BRIEF SUMMARY OF EMBODIMENTS

According to various embodiments of the disclosed technology, systems and methods may be implemented to create, manage and share one or more content items, along with metadata or other related files associated with those content items such as, for example, in a portable physical file that can be exported. The system may be implemented to create a container to contain one or more content items and associated metadata. The system may be further implemented to verify the completeness of metadata files associated with content items in the containers, alert appropriate users if specified metadata files are missing from a container, and allow users to update the metadata to complete the containers.

Some or all of the metadata information pertaining to a song/single, EP or album (or other content) can be shared, copied or transferred by generating a container file that includes the media file (e.g., audio/video), metadata and all other related assets encapsulated in one secure file. Information and assets may be stored either directly in the file or using an identifier or link that identifies the data stored on a server. Information and assets can also be viewed and managed either through a web portal and application utilizing a network connection to a server, or via native application on a user device that will access and update the data stored in the file or a combination of both.

Embodiments may be implemented to allow media content owners who own some or all of the rights associated with a media content item managed in the vault (directly, or via or an agent acting on behalf of an owner) to divest those rights to others and track the divestiture such as, for example, via tokens. For example, media content items such as artwork, audio files, video files, lyrics or other works can be associated with a nonfungible token (NFT) (e.g., via a pointer to the NFT) and one or more NFT's associated with such content item or items can be managed via the media content management system. For example, embodiments may be configured to allow a content owner (i.e., him or herself or via an agent) to sell an NFT, which embodies the ownership or other rights to the asset to be divested. The NFT memorializes the sale (e.g., based on a smart contract) of the rights and can be recorded against a distributed ledger such as a blockchain. The NFT could embody or represent the work being transferred, which could be, for example, ownership rights or exclusive or non-exclusive license rights (e.g., any or all of the rights to use, display, perform, reproduce, create derivative works, etc.) in and to the work that are being sold. The sale could be the sale of all or part of the work (e.g., the entire work, lyrics only, music only, soundtrack only, video only, script only, stanza only, a certain verse, image only, and so on), and the sale could be for whole or fractional ownership, or for exclusive or non-exclusive rights ownership or license rights. The NFT and associated smart contract can be configured to define the rights transferred with the NFT, which rights may specify what a purchaser can and cannot do with the content purchased.

Various embodiments can be implemented to address problems in the media content industry such as keeping track of records regarding items such as, for example, creators and co-collaborators, performers and other artists, media rights information, version control, copyright information, recognition of rights information, and so on. Embodiments may be implemented to effectively track all who contributed to an item of media content and capture the nature of their contribution. This can help to avoid issues with recognizing the wrong individuals or failing to recognize actual contributors. Embodiments may also be implemented to store and associate NFT's with their respective media content items and may be used to offer purchase of content items using such NFT's. Embodiments provide systems and methods to solve problems in the industry that have yet to be solved and to accomplish this using novel processes for receipt, management, sharing, transferring (e.g., via tokens) and tracking of media content items and their associated metadata including, for example, novel files and file structures, novel data capture and storage techniques, novel metadata checking, and so on.

Some embodiments of the application are directed to methods, systems, or computer readable media comprising, for example, creating, via a digital vault, a container file comprising media content submitted by a user and content metadata; verifying, via the digital vault, a completeness of the content metadata associated with the media content in the container file; classifying, via the digital vault, the container file based on the completeness of the media content; identifying a salable content item that is to be put up for sale, the salable content item comprising all or part of the media content; creating, via the digital vault, a nonfungible token (NFT) container file and populating the NFT container file with the salable content item and NFT metadata pertaining to the salable content item, the NFT metadata comprising a specification of ownership rights in the salable content item; offering the specified ownership rights to the salable content item for sale via an NFT transaction; and updating the NFT container file to reflect a new owner of the ownership rights to the salable content after sale of the salable content item.

Some embodiments of the application are directed to methods, systems, or computer readable media comprising, for example, creating, via a digital vault, a container file comprising media content submitted by a user and content metadata; verifying, via the digital vault, a completeness of the content metadata associated with the media content in the container file; classifying, via the digital vault, the container file based on the completeness of the media content; identifying a salable content item that is to be put up for sale via a nonfungible token (NFT) transaction, the salable content item comprising all or part of the media content; determining, via the digital vault, whether other stakeholders of the salable content item hold rights in the salable content item and whether consent for the NFT transaction of any such other stakeholder is required; and the digital vault prohibiting the sale of the salable content item until consent for the sale is received from each stakeholder from whom consent is required.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 24 illustrates an electronic communication in accordance with one embodiment.

Figure 1:
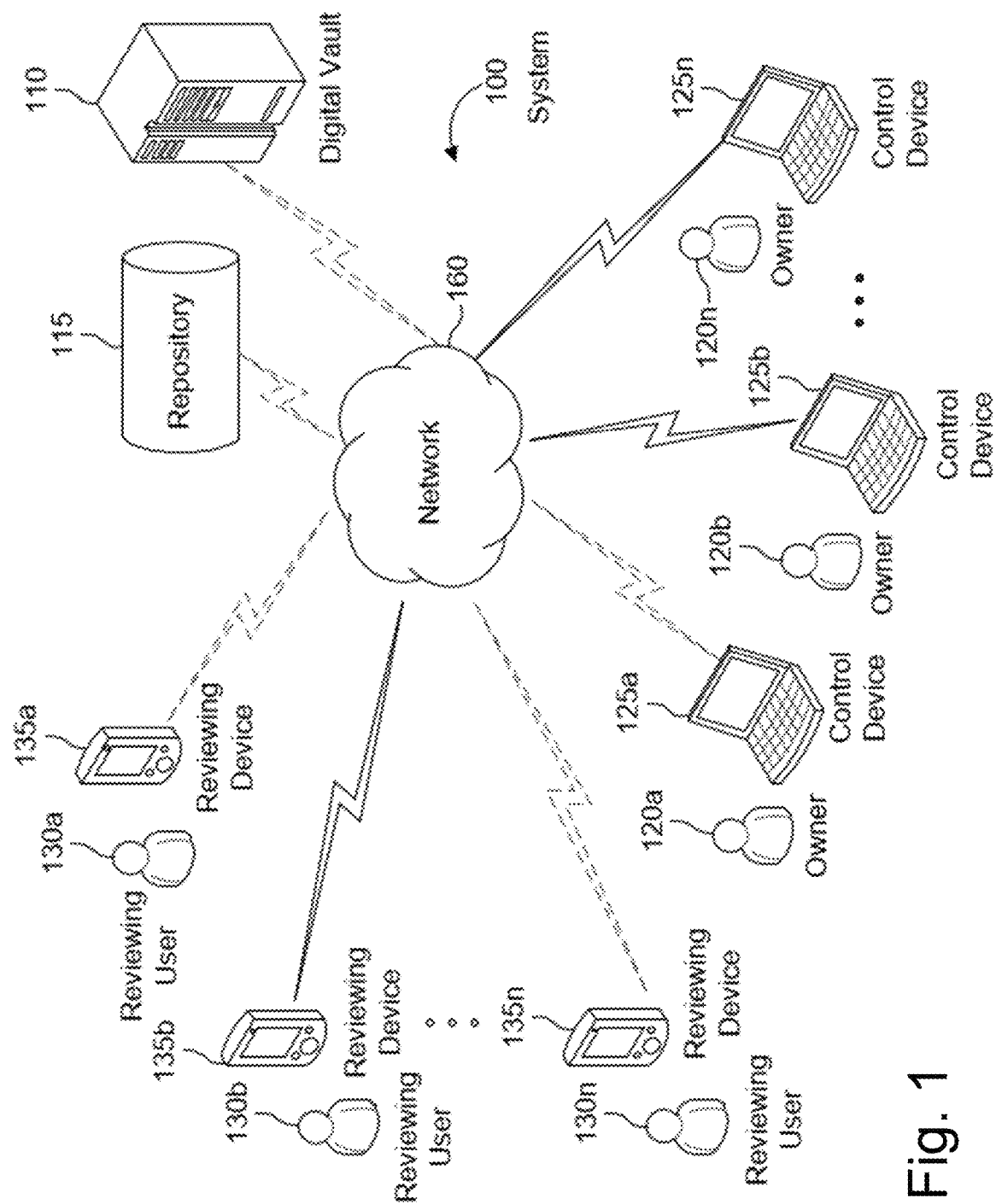
FIG. 1 illustrates an example diagram of a system for controlled distribution of digital music.

The figures are not exhaustive and do not limit the disclosure or the disclosed embodiments to the precise form disclosed.

DETAILED DESCRIPTION OF THE EMBODIMENTS

According to various embodiments of the disclosed technology, systems and methods may be implemented to create, manage and share one or more content items, along with metadata or other related files associated with those content items such as, for example, in a portable physical file that can be exported. The content items may include, for example, recorded audio files, video files, images, or other electronically capturable or storable content. The file, or container, in which a content item and its associated files are kept may be maintained, for example, as a portable, physical file (e.g., on a flash drive, on a disk, or as a file in memory or on disk on a server or other computing system) that the owner can share with others.

The information stored in the container may be one or more content items of various types and related files themselves, it may be in the form of links to the data or files stored elsewhere, it may be a link to third party data or services, or it may be a combination of the foregoing. Third party data and services might include, for example, the IRS, streaming services (e.g., Spotify, Pandora, etc.), Performance Rights Organizations (PROs), Soundexchange, the Copyright Office, or other third party resources. The container can be secured such as, for example, by encrypting the files stored on the container or otherwise using access-control techniques to keep the file and its contents from being accessed by unintended recipients.

Embodiments also provide an interface for the user to view, play or edit the data within the container. For example, a UI can allow a custodian of the container (e.g., the author(s) of the content, publisher, recipient with designated permissions, or other recognized user) to provide an updated content file, access and play back the content file, modify the content file, add or remove the associated files or other metadata and otherwise edit the associated files or other metadata. Embodiments may also be implemented to track and validate any changes made to the container or the data contained therein.

The system may further be implemented to utilize tokens to track rights and ownership. For example, embodiments may provide the ability for the user to establish one or more non-fungible tokens (NFTs), or other tokens, for his or her content items and to offer the one or more NFTs representing their respective content. For example, a single NFT may be associated with a single salable item or group of salable items, or multiple NFTs may be associated with a single salable item or group of salable items (the latter to provide fractional ownership or non-exclusive licenses for example). Accordingly, the system may be configured to tie the NFTs and NFT data to these items. Salable content items may include, for example, a complete work (e.g., a content item), part of a complete work (e.g., a segment, a layer, lyrics, music, a video file, soundtrack, stanza, verse, image, etc.), a collection of works, and so on.

The NFT can be used to represent and transfer ownership of the associated salable content item(s), which can be tracked via a blockchain or other distributed ledger. Embodiments may be configured to track the rights owned by various contributors or other system users in a work and to tie those rights to the respective NFT such that an NFT can be created to represent only the rights owned by a user or users wishing to sell those rights. Thus, the system can be configured to track any or all of the various rights in a work and provide a level of accountability and authenticity to an NFT purporting to represent those rights. Tracking rights during the creation and collaboration phase coupled with tracking rights transferred, such as via an NFT transaction, can allow the system to be used to determine which (and whose) rights would be needed for future licensing, sales or other transfers of content items; how payments are to be split among the various stakeholders of content items; and otherwise determine who's consents, permissions, etc. may be required for other actions associated with the content item. The system can also be configured to ensure that all consents that may be required from the various stakeholders for a given transaction are obtained and documented before a user is permitted to initiate or complete such a transaction. Thus, embodiments may be implemented to greatly simplify rights management and accounting and to provide integrity in the process.

The system can also be used to prohibit a party from generating an NFT container and attempting to move rights into the container or to sell rights that party does not hold. As described herein ownership of those rights may be tracked based on contributions made through the system as well as rights that may be delegated or assigned contractually among the parties. Accordingly, embodiments may tie the ability to generate and sell rights via an NFT (or otherwise) to the ownership of rights as tracked and maintained by the digital vault system. Because the system can track these rights (e.g., based on contributions to the vault, confirmation or acquiescence of other contributors, designation of rights in the vault, etc.) and maintain records thereof, a certain level of integrity can be injected into the NFT process. Also, the system can ensure that any rights that are transferred via an NFT are also transferred subject to pre-existing license or other rights that the seller's interest might be subject to. Once again, this information may be tracked and maintained via the digital vault.

Embodiments may further be configured in which the system employs other mechanisms to authenticate the work and the user that is selling rights via a token to help ensure authenticity. For example, the system can be configured to accept and verify various forms of identification to verify the purported owner and seller of rights to a salable content item such as, for example, a driver's license, passport or other ID. Additionally, proprietary or third-party identity verification services can be used to verify the identification of the seller such that purchasers may be given greater comfort in the purchase of digital content via a token transaction. Identity of the seller can be compared to ownership information, such as, for example, ownership information maintained in the digital vault, ownership information as determined from registered ownership records (e.g., BMI IPI/CAE number), checking ownership information on ownership contracts, or other verifiable ownership information.

Embodiments may further be implemented to confirm digital identification of a purported seller such as, for example, implementing processes in accordance with NIST 800-63-3 digital identity guidelines or the like to validate the seller and authenticate the work. For example, embodiments may be configured in which the digital vault system acts as a credentials service provider (CSP) or enlists the services of third-party CSPs to verify authentication. As yet another example, the system can utilize biometric identification to validate the identity of a purported seller. For example, where a performing artists intends to sell an audio track featuring his or her voice, the system can be configured to require the seller to speak certain texts or phrases to perform a voice identification/verification on the individual.

Also, in circumstances in which the work was created using the content management system (e.g., and contributions to the work by various contributors entered into the system as created), the content management system can authenticate a work based on the contributions made and the contributors who participated in such contributions, all of which may be tracked, for example, as metadata associated with the content stored. For example, the system can store source files for content items created using the digital vault and can check (e.g., compare) the salable content item to these project files to verify its authenticity. As another example, works created via an authoring tool (e.g., Pro Tools™ digital audio workstation for music works, PhotoShop™ for photographic works, and analogous tools for other types of works) the original project files can be verified, or in some cases rerun to recreate the work (e.g., audio output or digital photograph or final video etc.) for sale. Thus, the original source materials, which a party merely copying the final work would not have access to, can be verified or used to create the salable item.

Additionally, once a work is transferred (such as via an NFT) ownership records can be updated by the digital vault and the work locked as to parties who don't have or who no longer have ownership rights or access rights in the work. In some embodiments, the new owner purchasing a work (via an NFT or otherwise) will be able to manage and control access to his or her acquired works using the digital vault. That is, the new owner may "step into the shoes" of the previous owner in terms of content management via the digital vault. Such embodiments may be useful, for example, where the sale of the work is an outright sale of rights. In some embodiments, the system may be configured to create a new container (separate from the original container) for the salable content item being transferred such that the new owner can manage his or her rights via the container such as in the manner described herein for content management via the content management system. Thus, the new owner would be able to perform digital vault operations such as maintaining, sharing, tracking usage, etc. of the work here she purchased.

Users of the system may also create other property items that may be associated with works and offer those appropriate items for sale through the system, for example, as a package with the rights in the work being sold through an NFT. For example, users may create branded merchandise, event tickets, celebrity appearance events, backstage passes, and so on, and offer those for sale through the systems and methods described herein. In other words, the content management system can also be configured as a platform for selling, licensing, offering, or otherwise transferring media content items and related goods and services, whether directly or via an auction, to $3^{rd}$ parties.

The content management system may be implemented as separate components or as an integrated system, with all components in one location or application. A content or asset creation and management platform can be used to facilitate creation of the content and management of the created content. This can be an application that may be downloaded to or downloadable by users to run on their own devices, or it may be an application supported by a cloud-based platform. A content editor allowing operation such as viewing content, reading content, editing content and so on may also be provided as a downloadable app or as an app presented by a cloud-based solution. This can include one or more components (or other apps) for file reading, content viewing/playing, content editing, and so on. A content or asset sharing application can be used to allow the asset to be shared in a secure and controlled manner. For example, a transportable container can be provided to contain the content and associated metadata, and the container may be secured to allow content items to be transported to other users. As noted above, the container may include the files themselves, links to the files, or a combination of the foregoing. The container may also include NFTs or other tokens that can be used to track ownership in rights to the content items in the container. NFT data can also be maintained in the digital vault. NFT data can include, for example, NFT information, contract information, ownership information, works associated with an NFT, a transaction log, and so on. As further noted above, where a salable content item is offered, a separate container may be created for the salable content item.

The container may be securely stored locally, on a portable storage device, or on a cloud-based storage device. The content management system may maintain pointers to file location so that all local updates can be populated to files on a cloud server as well.

Controls may be implemented to allow only owners or administrators to make changes to the container items to help maintain integrity of the data. A mechanism can be provided such that if a user does not have permission to make changes, they can enter their suggested changes into the system. The system can then send a notification of the change request to the proper users who will view and approve or disapprove the requested changes. Access and modification activities may be tracked along with notifications being sent (e.g., based on notification settings). Where multiple approvals are required, approval may be based on various rules such as majority required, unanimous consent required, and so on.

The system may be configured determine consents required for a given transaction and ensure that consensus among the appropriate stakeholders is reached before permitting a transaction to occur. For example, the system's tracking of stakeholder rights as described herein (including, e.g., ownership rights) allows the system to determine which rights owners are required to be a party to which types of transactions. As a further example, where multiple stakeholders own a given work, each must consent to the sale of that work; but where a subset of those stakeholders own a portion of the media content (such as the performance rights of the work, or the cover art, etc.) then each member of that subset must consent to the sale of that portion of the content.

When an owner initiates an NFT transaction, the system can be configured to inform the initiating owner of the consents required so the initiating owner is aware of such requirements. The initiating owner may then reach out to the other owners to reach consensus on the transaction. For example, the initiating owner may use communication mechanisms of the content management system to message the other owners, such as via the messaging mechanisms described with reference to FIGS. 22-25. Polling type messages may be used, as one example, to receive a 'thumbs up' or 'thumbs down' type of response. As another example, the content management system may be configured to automatically notify other owners when one owner initiates a transaction.

The content management system may further be configured to track the responses to determine whether the required stakeholders have reached consensus on the transaction. The content management system may update the metadata to reflect the responses and consensus, if reached. The messaging may further include proposed terms of the transaction, and the stakeholders may negotiate such terms amongst themselves and reach consensus on such terms via the content management system's messaging capabilities. The system may further be configured to embed such terms into the smart contract and other appropriate NFT metadata. The content management system may be configured to, upon completion of the transaction, distribute proceeds in accordance with the agreed upon terms, which may be consistent with or different from previously agreed splits recorded in the content metadata.

Accordingly, embodiments may be implemented in which the content management system can validate the transaction by, for example, authenticating the salable content item, validating the authority of the seller to sell the salable content item (whether outright sale, license rights or otherwise), verifying that all stakeholders whose consent are required have consented, and ensuring that proceeds (whether sale proceeds, royalties, or other consideration) are properly distributed among the stakeholders.

Where rights to a salable content item have been transferred by a token such as an NFT, any access, modification, use or other rights transferred along with that item can be tracked such that the aforementioned controls can also apply to new owners or rights holders that acquire those rights. That is, in some embodiments, rights specified for a content item in a container in the digital vault can be maintained, as appropriate, and follow the salable content item to its new owner (and to subsequent owners). Where the seller holds certain rights in a content item and is selling some or all of those rights, the rights sold may be maintained in the container file (e.g., as metadata) and ownership information updated to reflect the new owner of those rights upon the sale.

Where other users also have rights to the content item in the container, metadata reflecting their existing rights may be maintained such that all rights can be recorded and tracked in the container file and the rights of those other users can be preserved along with the new owner's rights. Thus, the new owner can virtually step into the shoes of the seller to the extent of the new owner's purchased rights. In further embodiments, the system may create a new container file (which may be referred to as an NFT container file) into which a salable content item and its metadata can be placed. The new container file can include NFT metadata (which may include a smart contract) specifying the ownership rights of the salable content item (e.g., outright ownership of the content, fractional ownership, ownership of certain license rights, etc.) which are being in the NFT transaction.

Upon the sale, the new container file can be updated to reflect the new owner's ownership of the rights and the new container "transferred" to the new owner to be under his/her control. For an outright sale of all rights in their entirety, for example, the container can be transferred and the new owner takes over. The system may update the rights to the container (e.g., the metadata) to remove access rights to the container from the seller or sellers of the salable content item, for example, to the extent access rights that accompanied the rights were sold. Where the sale is subject to the rights of other users, the original container may be updated to reflect the transferred rights and the ownership thereof. Accordingly, in various embodiments the benefits that can be attained through the content management system can be made available to the NFT purchaser such as via the existing container or via a new container housing the relevant content item.

Embodiments of the systems and methods disclosed herein represent an improvement over conventional solutions which do not provide a suitable mechanism for checking, tracking, verifying or maintaining metadata associated with content items. Implementing a container to maintain metadata items and modifying the computing process to perform functions such as determining a content type for the content; identifying items of metadata specified for the determined content type; determining whether specified metadata corresponding to the content is missing from or included in the container; and prompting a user to supply identified missing metadata corresponding to the container represent an inventive concept that alters the conventional operation of the computing system. Embodiments can ensure that the appropriate metadata is collected and maintained with the content and avoid issues with conventional systems. Moreover, establishing a mechanism within the vault to manage NFT or other token transactions represents a further improvement over conventional solutions, at least by virtue of allowing transfers of rights via NFTs or other tokens, and the various rights and other information associated with such transfers, to be tracked and stored. As noted above, embodiments can be implemented in which the identity of the seller of the rights can be verified to enhance the integrity of NFT transactions. Additionally, the new owner requiring rights through the NFT may be afforded the same features and benefits as previous owners in terms of content management via the content management system.

Referring now to FIG. 1 there is shown a diagram of a system 100 for controlled distribution of digital music. The system 100 includes a digital vault 110, repository 115, two or more control devices 125 and two or more reviewing devices 135. A network 160 connects the various devices for intercommunications. The network 160 may be wired or wireless or combination, may be packet switched and/or circuit-switched or a combination, may include public and private LANs and WANs and may include or be the Internet.

The digital vault 110 is a hardware system providing digital vault services as described herein. The hardware of the digital vault 110 may be shared in whole or in part. Software of the digital vault 110 may be on one or more of a single computer, or a group of computers which may be arranged as a cloud. The hardware of the digital vault 110 may be one or multiple computers and may be in a single location or distributed among multiple locations. The digital vault services may be embedded in hardware and/or implemented with machine readable storage media in a storage device included with or otherwise coupled to a computing device.

The repository 115 is a data storage system and may be a single storage device, an array of devices, a distribution of devices and/or cloud storage, may be in a single location or distributed among multiple locations, may be local or remote to the digital vault 110, and may be a combination of these. The repository 115 may store media items data and metadata. By media item, it is meant a single unit of streaming media, such as a song, a video or a playlist. The repository 115 may store both structured and unstructured data sets.

By song it is meant a file consisting of music in digital form having a play time at normal speed of between ten seconds and several hours. By normal speed it is meant a default playback speed; that is, not sped up or slowed down, and without use of fast forward to skip ahead or rewind to jump back. The songs may be stored in the repository 115 in one or multiple well-known and/or proprietary formats including, for example, MP3, MP4, WAV, AAC, OGG, AIFF, WMA, and other lossy and lossless formats.

By video it is meant a file consisting of moving images in digital form having a play time at normal speed of between ten seconds and several hours.

A playlist is akin to a song, but formed from a compilation of songs. In a playlist, individual songs may be modified by the creator (e.g., a DJ) such as with effects, transitions between songs may be added, and entirely new music or sounds may be placed between pre-existing songs. Furthermore, the digital vault may include a DJ mode that allows creation and modification of playlists on the fly, and captures and records the product.

FIG. 1 shows three identical control devices 125a, 125b, 125n, and three identical reviewing devices, 135a, 135b, 135n. This is intended to show that the system 100 can support numerous such devices. Furthermore, these devices need not be identical; they need only have the specific minimum components and capabilities described below. Furthermore, the control devices 125 and the reviewing devices 135 may be geographically distributed to the extent supported by the network 160.

Human users, not part of the system 100, are also shown. Owners 120 are users who own media items; that is, they own the copyrights and not merely copies, or human agents who act on behalf of the copyright owners. Owners 120 of songs may be musicians, including songwriters and performers. Owners of videos may be producers. Owners of playlists may be DJs.

Reviewing users 130 are an intended audience of the owners, such as people who work as producers, distributors, agents, labels, potential employers, other musicians and creators, fans, commercial purchasers of media and promoters. Owners 120 are shown adjacent respective control devices 125. Reviewing users 130 are shown adjacent respective reviewing devices 135. The respective users 120, 130 interact with the respective devices 125, 135. The devices 125, 135 may be single-user or may support multiple users. Users may use multiple devices 125, 135 which may be synchronized. Owners 120 may also be reviewing users 130.

The control devices 125 and reviewing devices 135 are end user computing devices through which the owners 120 interact with the digital vault 110. These end user computing devices 125, 135 include software and/or hardware for providing functionality and features described herein. As shown in FIG. 1, the control devices 125 are laptop computers and the reviewing devices 135 are smartphones. However, other general purpose and special purpose computing devices may be used.

Figure 2:
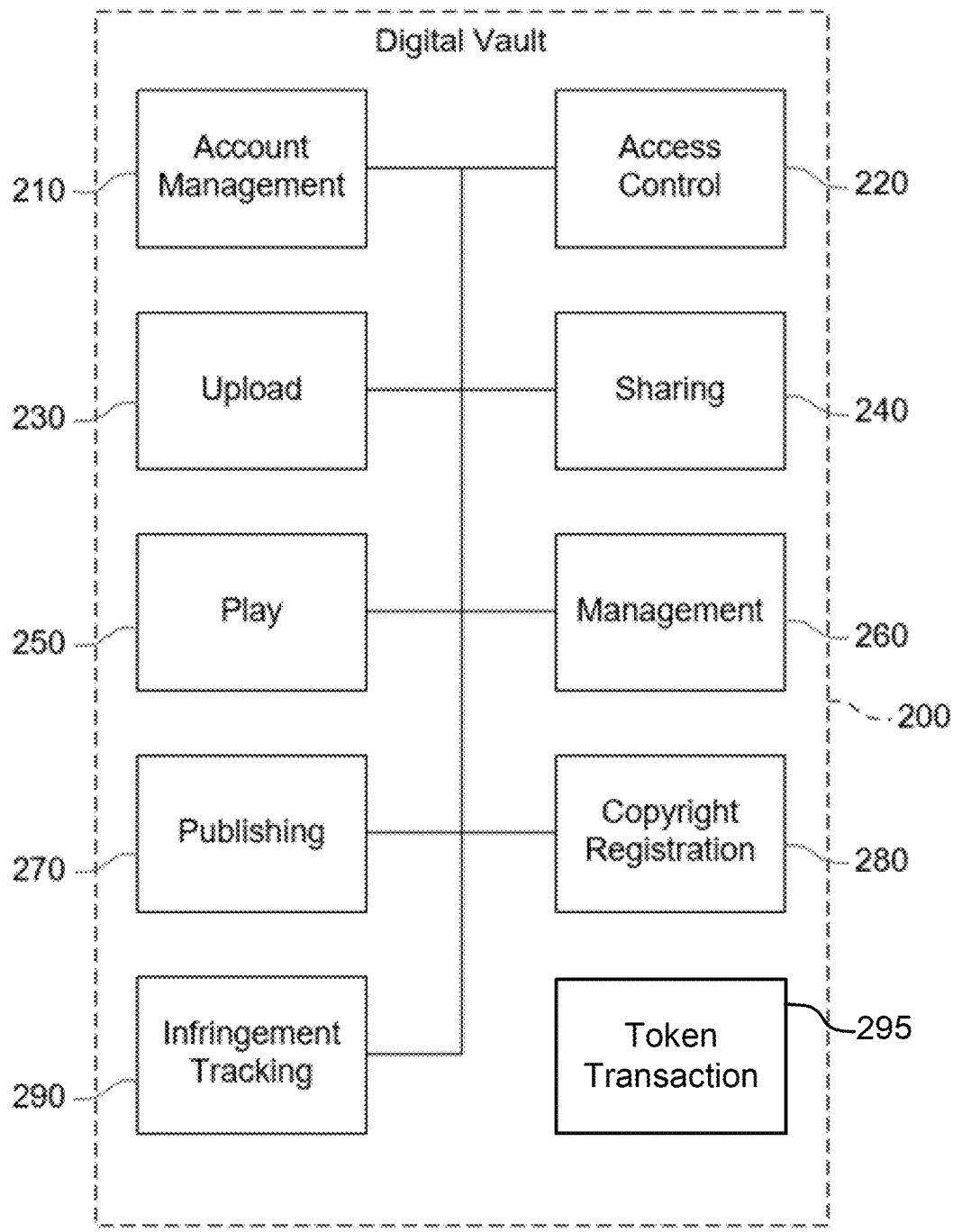
FIG. 2 illustrates an example block diagram of a digital vault for music owners.

Referring now to FIG. 2 there is shown a block diagram of a digital vault 200, which may be the digital vault 110 of FIG. 1. The digital vault 200 has a number of modules: an account management module 210, an access control module 220, an upload module 230, a sharing module 240, a play module 250 and a management module 260. The digital vault 200 may be used by owners to share their media items with reviewing users. The digital vault 200 may further include one or more of a publishing module 270, a copyright registration module 280 and an infringement tracking module 290. Additional and fewer modules or other arrangement of software, hardware and data structures may be used to achieve the processes and apparatuses described herein.

Each of the modules 210, 220, 230, 240, 250, 260, 270, 280, 290 has a respective function. The account management module 210 is for creating accounts with the digital vault for plural owners. The access control module 220 is for providing the owners secure access to their respective accounts. The access control module 220 also maintains security measures to prevent unauthorized access to the owners' accounts. The security module may include encryption and decryption components, digital watermarking components, and related copy-limiting and song tracking components. The access control module 220 also provides reviewing users access to the media items in an owner's account. The upload module 230 is for the owners to upload media items into the owners' respective accounts. The sharing module 240 is for the owners to provide reviewing users with access to their media items. The play module 250 is for the reviewing users to stream the media items in the digital vault to which the owners have given them access. The management module 260 provides the owners various options for managing the media items in their accounts. The activity module will record/track the exact time and date the reviewing users entered the digital vault, provide a timestamp of that activity by reviewer showing what specific media items they played and what the duration of the playback was for each specific original media item the owner deposited in the vault. The activity module may also capture or receive the IP address, anonymized or non-anonymized or other identifier of a reviewer.

The publishing module 270 provides an automated publication function to owners. Through the publishing module 270, an owner can identify one or more media items in their account to publish. The publishing module 270 then automatically causes the identified media items to be streamed through a public channel, and records play information such as timestamp and channel identification. The public channel may be an online streaming service, such as Spotify, Pandora, YouTube or Hulu, or a broadcaster such as a terrestrial radio station, or a cable music channel such as those provided by Time Warner Cable. The media item may be streamed on demand by a user of the public channel, or may be included in a play list of the public channel. When the media item is streamed, the publishing module 270 may also capture or receive the IP address, anonymized or non-anonymized or other identifier of a reviewer or recipient of the media item from the streaming service. If providing songs directly from the digital vault, then a streaming player with decoder/codec may be provided by the play module 250 or the publishing module 270 to the reviewing user.

The copyright registration module 280 provides an automated copyright application function to owners. Through the copyright registration module 280, an owner can identify one or more media items in their account for copyright registration. The copyright registration module 280 then collects whatever information is required to file a copyright application and, through an interface with the online application system of a copyright office such as the U.S. Copyright Office, automatically files applications for registration for the identified media items. The copyright registration module 280 may request some of the required information from the owner. The copyright registration module 280 may obtain some of the required information automatically. For example, the digital vault 200 stores publication information about media items published through the publishing module 270, and the copyright registration module 280 may use this information in copyright applications.

The infringement tracking module 290 provides an automated function to owners to learn about unauthorized distribution and plays of their media items. Through the infringement tracking module 290, an owner can select one or more media items in their account, and the infringement tracking module 290 will automatically cause a search outside of the digital vault 200 for media which match the selected media items. The infringement tracking module 290 may perform the identification using the digital watermark added to the selected media item by the publishing module 270. a bit comparison of media item files, a hash computation comparison or other identification technique. The infringement tracking module 290 then reports the match information, including location of the found media item and a rating of confidence in the match.

The digital vault may further include a token transaction module 295, which may be attached via the bus. The token transaction module 295 may be included to manage token transactions involving the sale of rights associated with a salable item (e.g., sale, license or other conveyance of such rights). The token transaction module may be configured to, for example, manage and secure assets for the NFT (Content Management), provide users/collaborators a place that facilitates the building of the NFT container/package (e.g., for the salable item), facilitate communications amongst NFT parties (e.g., contributors, owners, purchasers, and others); provide and maintain an audit trail/log (Fingerprint) documenting the collaboration, ownership, creation, and other information related to the NFT Assets and Metadata; provide a smart contract viewer that allows users to view a user friendly easy to read representation of the smart contract code, providing minting in the digital vault or facilitate external minting along with NFT distribution to an internal or external third party marketplace; provide NFT Owner access to access, view, play listen to, etc. the NFT assets; and allow the NFT owner to securely share access to view and listen to the NFT assets, such as with an access code that is limited to number of accesses/views/plays or for a duration of time. The token transaction module may also be configured to facilitate a process to secure and check for readiness/completeness and consensus on an NFT transaction.

Figure 3:
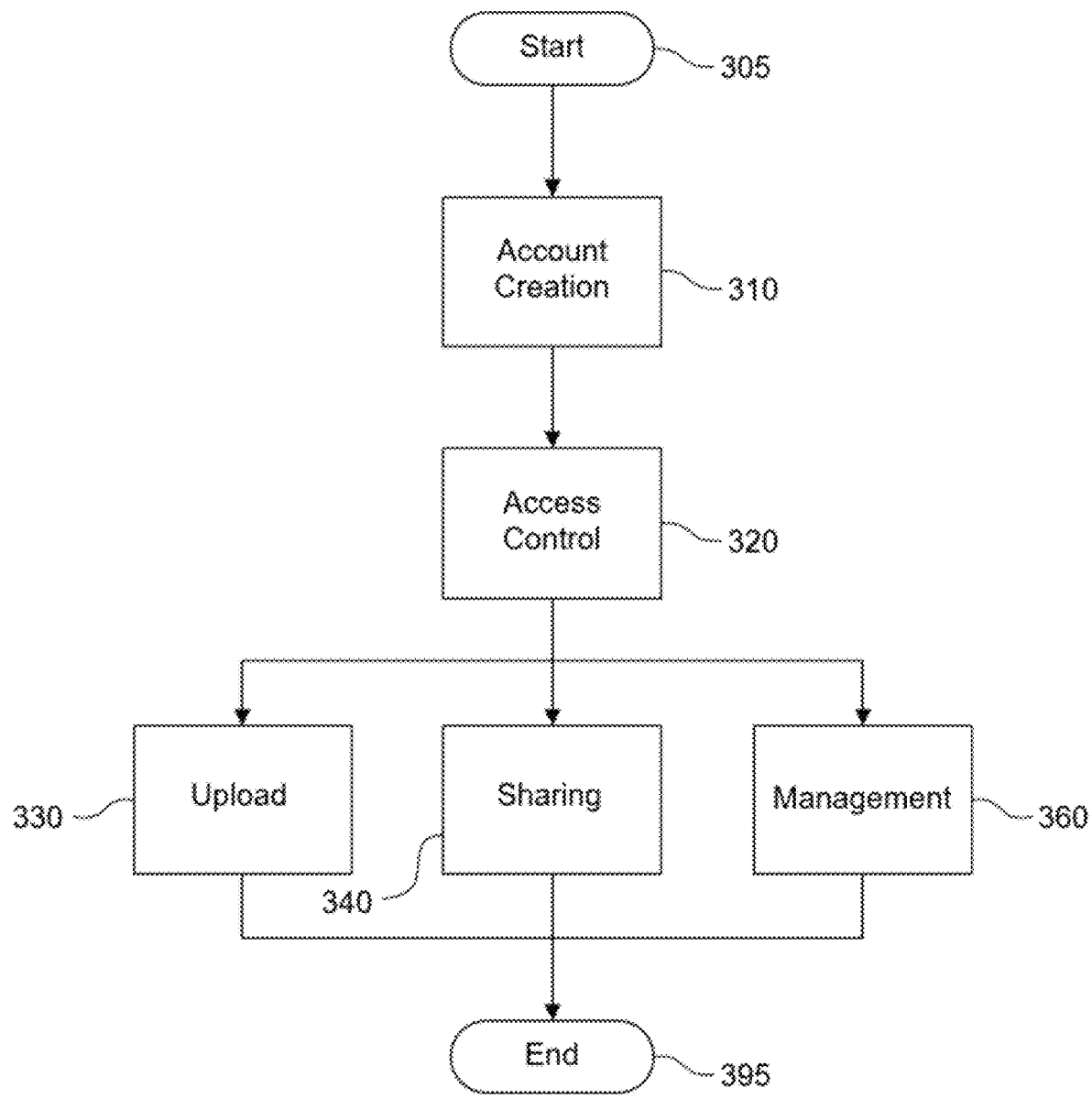
FIG. 3 illustrates an example flowchart of a method of a music owner controlling distribution of music.

Referring now to FIG. 3 there is shown a flowchart of a method of an owner controlling distribution of media items using a digital vault, such as the digital vault 200 (FIG. 2). The flow chart has both a start 305 and an end 395, but the process is cyclical in nature. The description of FIG. 3 is with respect to one owner, though the digital vault is a multiuser system which supports concurrent operations regarding multiple owners and their respective accounts.

The method of FIG. 3 may include major steps corresponding to modules of FIG. 2. That is, the major steps include account creation 310 through the account management module 210, access control 320 through the access control module 220, upload 330 through the upload module 230, sharing of media 340 through the sharing module 240 tracking and time stamping the activity of reviewers through the activity tracking module and song management 360 through the management module 260. The digital vault may provide a user interface to the owner's control device through which the operations described herein are performed by the owner and the control device. These user interfaces may be provided by the respective modules.

In account creation 310 an owner accesses the digital vault, such as through a website or an app on their control device which connects to the digital vault, and activates an account. Accounts may be created at initial sign-on or in advance. At the owner's initial connection to the digital vault, the owner's account is activated, and basic account settings configured. For example, the digital vault may obtain a user ID and a password for the owner. After validation of the initial information the digital vault then activates the account for the owner. Through the account management module, the owner can change passwords and other typical account management operations.

In access control 320, the owner logs into the digital vault. Log-in may be through the same website or app as in account creation 310, or another on the owner's control device which is connected to the digital vault. The digital vault validates the user and, once validated provides the user/owner access to their account. From within the access control user interface, the owner can then perform various other operations including upload 330, sharing 340 and management 360.

In upload 330, the digital vault obtains media items from the owner. In this regard the digital vault may provide a user interface for the owner to identify one or more media items to upload to the digital vault. The upload user interface may allow the owner to select media items stored in their control device or elsewhere, such as cloud storage. The digital vault may then upload the selected media items into its repository, such as the repository 115 (FIG. 1). Uploading may take the form of copying the media item, or may be storage of a pointer to or address of the location identified by the owner. The upload module 230 automatically records a timestamp in the digital vault of receipt of each media item from the owner.

In sharing 340, the sharing user interface allows the owner to identify one or more reviewing users and the media items in the music owner's account to which the reviewing users are provided access. The sharing user interface may also allow the owner to set streaming limitations. The limits may be set with respect to an individual reviewing user or a group of reviewing users, and with respect to an individual media item or a group of media items. The total number of plays may be limited. Total amount of time played may be limited. Availability of media items for playing may be limited, such as for fixed deadline or a period beginning from some milestone such as first play or log in. The sharing user interface may allow the owner to select streaming players which reviewing users are authorized to use for streaming their media items, or which are not permitted. The digital vault may include counters and a tracking database to track numbers of listens, length of each listen, etc. In sharing, the sharing user interface allows the owner to assign individual access codes authorizing the reviewer to enter the owner's vault and allowing for specific tracking of the reviewer's activity and identifying the machine ID of the reviewer. The individual access codes would be specific to an individual reviewer and would not be transferable. The individual access codes for reviewers would be controlled by the owner and could be one-time review codes for a single session or may be a reviewer specific code that could be reused only by that reviewer on more than one reviewing occasion. A log file would be created for each individual reviewer who receives an access code showing and time-stamping the date of their activity, the duration of their activity by specific media item and the exact time they exited the digital vault.

In management 360 the management user interface allows the owner to manage the media items in the owner's account. Management may include assigning metadata and reporting. Metadata may be obtained from various sources. The management user interface may allow the owner to provide metadata, such as media item name, for the media items stored in their account. The digital vault, such as through the management module 260 (FIG. 2) may automatically create and store as metadata for each media item a length of the media item. Other metadata may include album name, performing artist names, producer name, arranger name, recording engineer name, recording studio name, recording date and time, author name, lyrics author name, genre and sub-genre.

The management user interface may also provide a report to the owner of plays of their respective media items by the reviewing users. The report may identify the respective media item names and the respective reviewing users, plus playback information such as the timestamp of the start of the stream, the length of time of the stream, whether the media item was played in full or stopped early, and total number of streams. Reporting may be with respect to an individual reviewing user or a group of reviewing users, or an individual media item or a group of media item.

Whether a media item has been fully played may be defined by criteria. The simplest criteria would be that the media item has been played from start to finish without interruption. That is, the complete file has been streamed. The management user interface may allow the owner to define different criteria for defining a play. One play may be defined as the stream continuing for a predetermined period of time, or through a predetermined percentage. However, all authorized music plays for a music reviewer would be logged in and a record kept of any plays by the reviewer utilizing a specific authorized access code regardless of the duration of the play period of time. This will prevent reviewers from managing their playing time to keep the play session under a specific or predetermined period of time.

In management 360, the user interface may also allow the owner to associate one or more images and/or videos with songs and/or albums. The videos may include the respective songs. The management user interface may allow the owner to designate images, videos and other files, and upload these files in association with designated media items.

Figure 4:
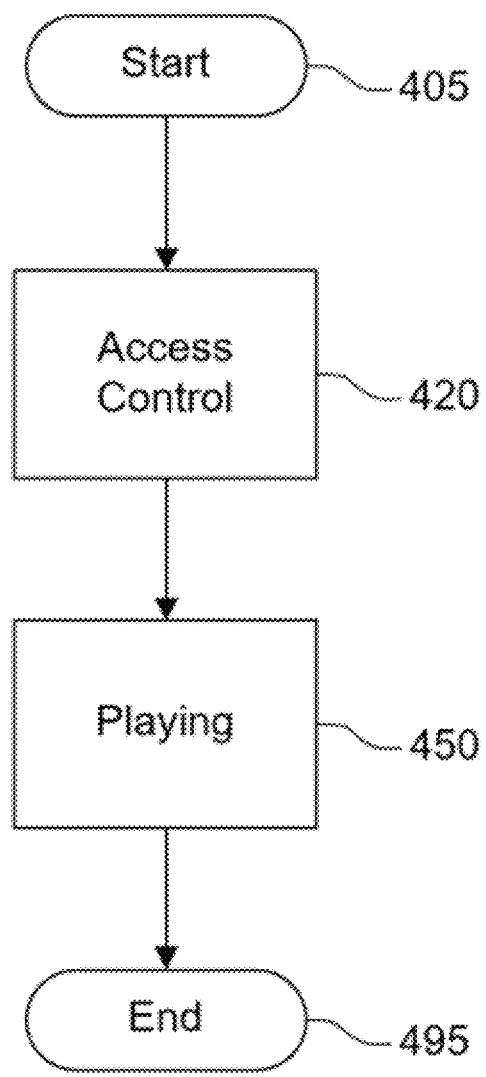
FIG. 4 illustrates an example flowchart of a method of a reviewing user receiving controlled distribution of music.

Referring now to FIG. 4 there is shown a flowchart of a method of a reviewing user receiving controlled distribution of media items. The flow chart has both a start 405 and an end 495, but the process is cyclical in nature. The description of FIG. 4 is with respect to one reviewing user, but the digital vault supports concurrent operations regarding multiple reviewing users along with multiple owners.

The method of FIG. 4 may include major steps corresponding to the modules of FIG. 2. That is, the major steps include access control 420 through the access control module 220 and playing 450 through the play module 250. The digital vault may provide a user interface to the reviewing user's reviewing device through which the operations described herein are performed by the reviewing user and the reviewing device. These user interfaces may be provided by the respective modules.

In access control 420 the reviewing user, through their reviewing device, is provided access to media items in an owner's account. This may be in response to an owner, in the access control step 320 of FIG. 3, designating the reviewing user for access to media items in the owner's account. The digital vault may then send a message to the reviewing user, inviting the reviewing user to access the media items. The invitation may include media item metadata such as media item name and name of the owner. The invitation may be an email message which, when opened obtains data from the digital vault and also shares metadata from the reviewing device with the digital vault. The invitation may be provided through other electronic communications channels, such as text messaging and social networks. The digital vault may support offline invitations, such as through automated mailing.

The invitation may include links or credentials for the reviewing user to play media items in the owner's account. When activated by the reviewing user, the link may cause a user interface display from the digital vault to be displayed on the reviewing device. The user interface may provide additional metadata about the media item and display images or video, such as that obtained by the management module 360 (FIG. 3). Activation of the link may cause a streaming media player on the reviewing device to be activated. The invitation may include a specific access code that is specific to the music reviewer and non-transferrable. The access code may be for a review session of a single designated media item or may be for multiple review sessions over a predetermined period of time with a specific beginning and end established by the owner for the specific reviewer.

When the reviewing user gains access to the media item, the digital vault may capture relevant event metadata such as identification of the reviewing user and an activation timestamp. Reviewing users may be provided with an access code, such as from the owner or the digital vault, that is either a single use, disposable access code or a user-specific, non-transferrable access code that remains valid for a predetermined period of time established by the music owner. In the event that the reviewer requests additional affiliated members of the reviewer's organization or network be allowed to access the owner's media items in their vault, the owner could provide for additional authorized users to the specific access code given to the reviewer provided through the use of a suffix related to a specific individual that is part of the reviewer's organization or network. Alternatively, a new access code could be issued to every individual reviewer regardless of their affiliation with another authorized reviewer. Further a mechanism could be created whereby any additional authorized reviewers added to the primary authorized reviewer's organization or network, would be issued single use or extended, pre-determined period of time access codes under a group umbrella access code designation so that all affiliated members of a reviewer's circle of individuals can be tracked as part of a single reviewer group. Each subsequent request to play the owner's media items by the reviewer would require a new access code or would have to qualify under the pre-determined duration and scope of the access code already issued to that reviewer.

After accessing the digital vault 420 the reviewing user may begin playing 450. Streaming of the media item may initiate automatically. There may be a user interface which allows the reviewing user to change the streaming of the media item. This user interface may be integrated with the streaming media player in the reviewing device, and/or provided by the digital vault. Through this user interface the user may request to jump back or ahead in the stream. However, the listening module 320 may limit the reviewing user to plays, streaming media players and stream controls as set by the owner in the sharing module 340. The playing module 450 may record event metadata of each stream by the reviewing user, such as an identifier of the reviewing user, a timestamp of the start of the stream, and either a timestamp of the stop of the stream or a length of time of the stream. The metadata may also include stream controls by the reviewing user such as requests to jump back or ahead in the stream.

The play module 250 may record the type of streaming player used. The play module 250 may restrict the reviewing user to stream using only the streaming players selected by the owner, such as through the sharing module 340.

During play 450, the reviewing user may be provided options to listen to additional media items, or to repeat a media item, such as until the reviewing user is satisfied.

Figure 6:
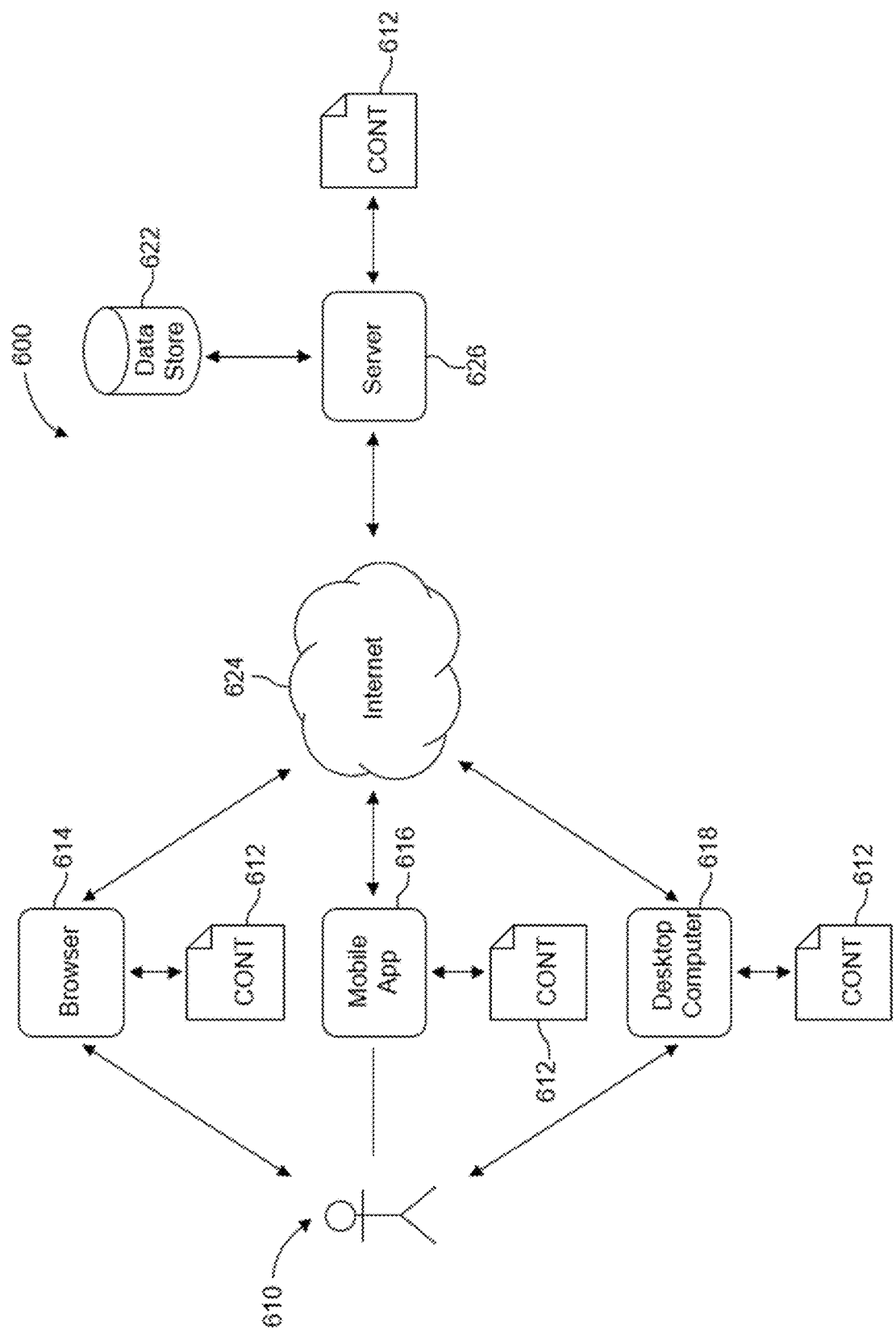
FIG. 6 illustrates an example container-based content management system in accordance with one embodiment.

FIG. 6 illustrates an example container-based content management system in accordance with one embodiment. In this example of a container-based content management system 610, a content creator creates media content for publication. Creators can include, for example, writers, performers, arrangers and so on. The media content can include, for example, audio content, video content, image content, written works, multimedia content, and so on. Content management 610 may provide one or more of a plurality of vehicles by which content creators may store their completed or in process works in a container file 612 that includes a metadata file associated with the works. The metadata file in container 612 can include the metadata itself, links to locations where the metadata is stored, or a combination of the foregoing.

In this example, applications such as a browser application 614 (e.g., in a web-based application), a mobile app 616 (e.g., such as may be made available on a smart phone, tablet, or other portable device), and a desktop application 618 (e.g., such as may be made available on a desktop computer, server, laptop computer, or other computing device) may be used by the creators 610 to store their content in a container 612. These applications 614, 616 and 618, and other applications may be used by creators 610 to create content, review content, modify content and share content that they created. The data in container 612 may be encrypted or compressed, stored using a markup language such as JSON or XML, or a combination of the foregoing.

The files in the container or the container itself may be stored, retrieved and updated locally by access to a local copy associated with the user's device. Additionally, the files in the container or the container itself may be stored, retrieved and updated via a network connection to a server 626 that stores and accesses the files on storage device 622. Accordingly, the creation portion of the system can be connected to data store 622, which is preferably a secure data storage environment at which multiple containers 612 may be stored for access by creators and entities with whom which creators wish to share their content. One example of a secure data store 622 is the digital vault for content owners disclosed by U.S. Pat. No. 9,836,619, which is hereby incorporated by reference herein in its entirety.

Local applications or other portals can be provided to allow creators or other custodians to manage, play and update the content and data. In this example, the content management applications 614, 616, 618 access data store 622 and it server 626 via the Internet 624. In other examples, a data storage unit such as data store 622 can be a local data storage unit such as, for example, a disk drive on the creator's computer or other storage unit accessible over a LAN or other available network, a flash drive (e.g., thumb drive, jump drive, etc.) or other local storage unit. In further examples, a data storage unit such as data store 622 can be a remote storage unit accessible by means other than the Internet such as, for example, a WAN or other wired or wireless communications interface. As this example also illustrates, a stored container file 612 can be shared by server 626 with third parties at the direction of the creators or other authorized personnel.

Figure 7:
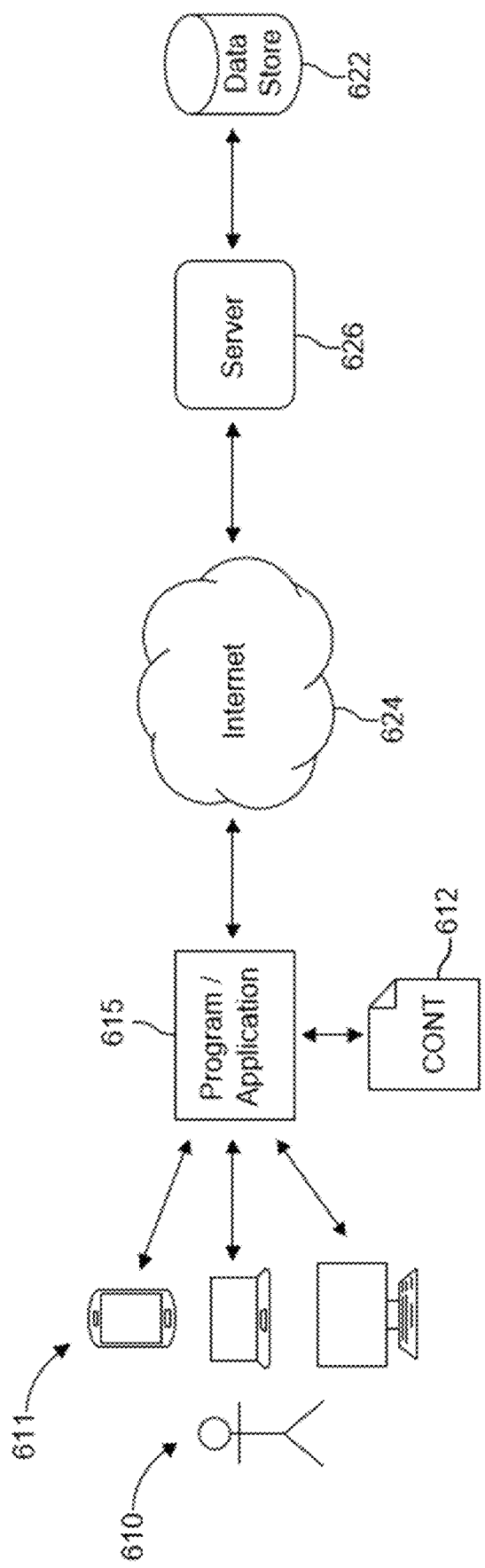
FIG. 7 illustrates a high level example of a creator accessing a content management system to create and store a container file in accordance with one embodiment.

FIG. 7 illustrates a high level example of a creator accessing a content management system to create and store a container file in accordance with one embodiment. With reference now to FIG. 7, in this example creator 610 accesses a content management application 615 (e.g., application 614, 616, 618) on a user device 611 (e.g., smart phone, tablet, laptop, desktop computer, server, rig, etc.) to create a container file 612. Container file 612 can be stored locally or remotely. This example, similar to the example of FIG. 6, illustrates application 615 accessing a server 626 and data store 622 by a communications interface such as the Internet 624.

Figure 8:
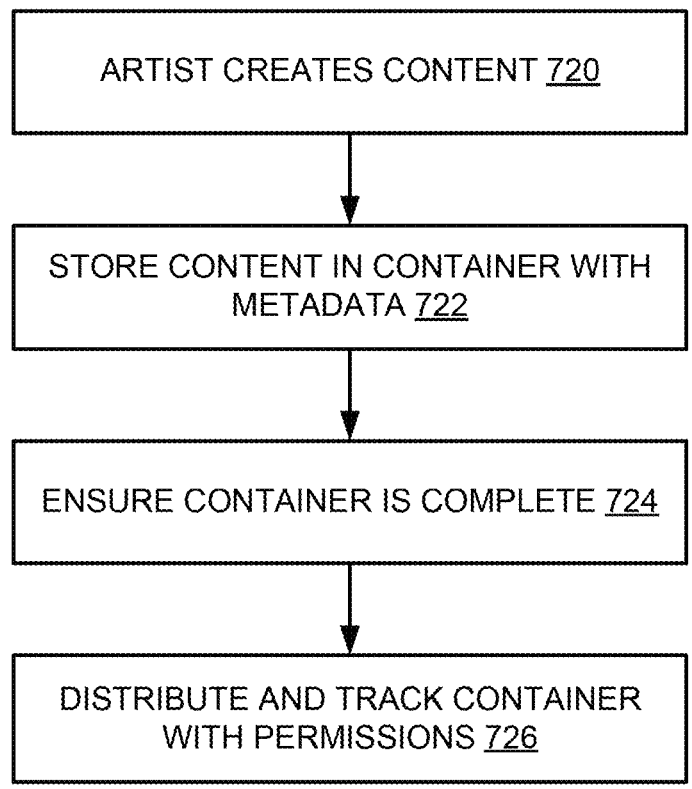
FIG. 8 illustrates an example process for content management using a container file in accordance with one embodiment.

FIG. 8 illustrates an example process for content management using a container file in accordance with one embodiment. In this example, an artist, or a plurality of artists in collaboration, create content at operation 720. As noted above, the content created can be any of a number of different forms of media (including multimedia) content such as audio, video, and so on. The created content can include a completed piece of content or it can be content that is still a work in progress. For example, the created content can be partially completed elements of a song, video production, or other media content that a collaborator or co-collaborators are working on but have not yet finished. As another example, the created content can be a completed song, video production or other media content that the collaborator or collaborators have completed.

At operation 722, the creators store the created content in a container file. The creators also store metadata associated with the content in the container file. In some circumstances, at least some of the metadata might be stored prior to storage or creation of the content. In other circumstances, at least some of the metadata might be stored when the creators store the content. In yet other circumstances, at least some of the metadata might be stored after the content is created and stored. Because the system can store content and metadata for works in progress as well as completed works, the system can allow receipt, management, sharing and tracking of content during the creation process as well as after the creation is complete. Where one or more users store content elements for a given created content in the system, the system can be configured to flag each of those users as potential co-collaborators for that given created content. Accordingly, the system can automatically gather metadata even during the creation process.

At operation 722 users and the system may also store NFT metadata in the container file. NFT metadata may include metadata specific to a contemplated NFT transaction such as, for example, ownership rights for the salable item subject to the NFT transaction; owner information including contact information; token/s NFT information such as: ID/Pointer to the salable item, restrictions on the item (e.g., nNumber of play limitations, Time expiration, ID/pointer to artwork, Smart contract information (e.g., ID and pointers, user-friendly readable text information, etc.); NFT physical or service perks information and tracking (e.g., tickets, concierge services, physical memorabilia, CD, Vinyl Record, etc.); contracts and agreements and other relevant information.

At operation 724, the content management system checks the container to ensure that it is complete. Particularly, the system can check to determine that the appropriate items of metadata are included, depending on the type of content stored. For example, different types of metadata may be specified for different types of content. Examples of metadata that might be stored in the container file for audio content are listed in Table 1.

TABLE 1

METADATA EXAMPLES

CREATOR IDENTIFICATION
OWNERSHIP INFORMATION
ROYALTY PAYMENT INFORMATION
DIGITAL DISTRIBUTION RELEASE METADATA AND FILES
LYRICS
SHEET MUSIC
COPYRIGHTS
AGREEMENTS
ALBUM ARTWORK
WORK FOR HIRE CONTRACTS
PERFORMER AND COMPOSER INFORMATION
OTHER METADATA

Figure 29:
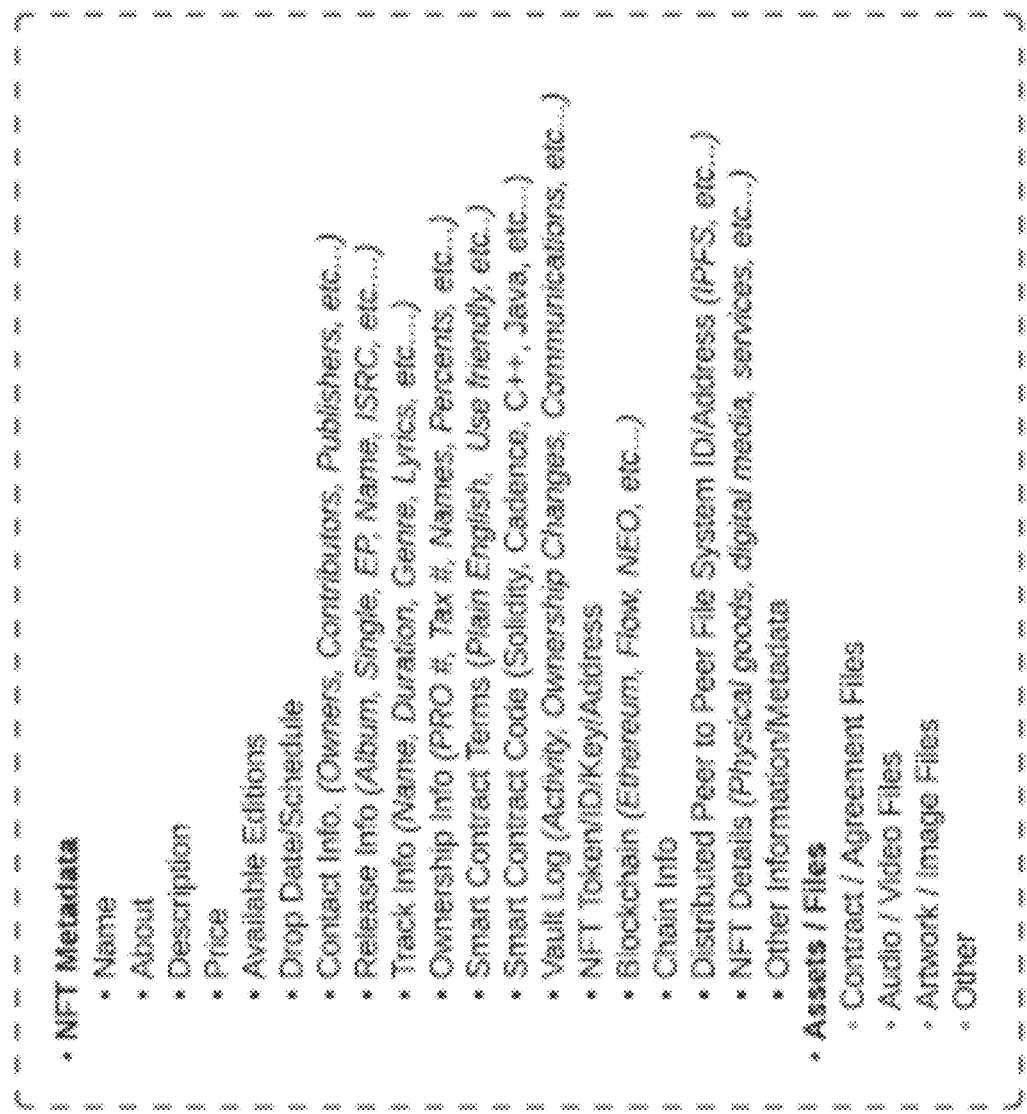
FIG. 29 illustrates examples of NFT metadata that may be included in the container in accordance with one embodiment.

As noted above, the system may also be configured to check that the NFT metadata is complete as well. FIG. 29 illustrates examples of NFT metadata that may be included in the container to facilitate NFT transactions and that may be checked during the verification operation 724. FIG. 29 also lists assets and files that may be included in the container associated with NFT or other token transactions including contracts and agreement files; audio, video or other content files; artwork or other image files; and other content or other files.

Checks to ensure that the container is complete with the appropriate forms of metadata (including NFT metadata) can be done at different times. For example, the system may check to ensure that the container is complete when the content is first stored in the container, periodically after the container is created or in response to a user query. In some instances, the container can be configured to check certain of the content items for compliance with the requirements such as, for example, ensuring that an ISBN number is numeric and that it contains 13 digits. As another example, the system can check file types to ensure the correct file type is logged for the metadata it is purported to represent. For instance, the system might be configured to check to ensure that data stored as Album Artwork is a .jpg, .tiff, .gif or other appropriate file type. In further embodiments, the system may be configured to inspect files for content to ensure files are of the appropriate type for the metadata they are purported to represent. In this manner, the system may be programmed to scan purported contracts to determine whether certain language is present confirming it is at least the appropriate document type. This may be based on programming instructions to search for certain text strings, or on an AI trained model employed to predict document types based on content.

As these examples illustrate, when checking for completeness of the metadata, the content management system may be able to check whether certain metadata items are present, but may not be able to verify the accuracy or comprehensiveness of each item. For example, while the system might check to confirm that one or more creators are identified, the system may not know whether all creators have been identified. In some embodiments, the system can send reminders not only for metadata items that appear to be incomplete, but also to remind users to verify that metadata items that appear to be complete are in fact complete and accurate. For example, the system can generate and send a message to the original creators and query them to ensure that no co-collaborators have been left off of the information collected. Because this can be done somewhat contemporaneously with the creation of the content, or at least with the deposit of the content into the container, this information can be gathered while collaborators are still around and recollections of collaborators and their relevant contributions are likely to be fresh and accurate.

Additionally, there may be different levels of completeness for container files. For example, in some applications a first level of completeness (e.g., Level I) the indicated container is ready for distribution to certain recipients or types of recipients, but that it is not ready for other distribution. For example, Level I may mean complete for purposes of distribution to producers or publishers for review, but not yet ready for production. As another example, Level I may mean that the container is complete for distribution to certain streaming services, but not for other streaming services. Continue with these examples, Level II may indicate completeness for all streaming services whereas Level III may be required for certain licensing activities, and so on. As these examples indicate, different levels can be custom defined for various containers or for different content types and the system can be configured to check for levels of completeness.

Where the container appears complete, the system can set a flag or other indicator indicating that it is complete. Where the container is incomplete, the system may set a different flag on the container, indicating that materials are missing. The flag may be in various forms such as a change in the file name, a change in the file extension, an indicator or other alert associated with the container, data in a designated field in the container, or other designation that may indicate the completeness status of the metadata. The system may also be configured to send an alert to the creators or other users indicating that the metadata does not appear to be complete or ask them to verify the completeness of metadata that does appear to be complete. For example, the system may send a message to a user stating that the container is not complete. This message may further include a list of the metadata that is missing or a list of errors that appear to have been found in the metadata (e.g., wrong file type). This information may also be stored in a determined location in the container file itself, so others accessing the file may view this information as well. In yet further embodiments, the system may track container status as a central function such as, for example, by maintaining a log of containers and their statuses at a central or other accessible location or locations. As another example, the system may send a message to a user stating that a metadata element appears to be complete but asking the user to verify accuracy and completeness of the information.

As another example, where the system automatically created metadata not input by the users (e.g., identified users uploading content as collaborators), the system may be configured to generate and send a message to provide this gathered metadata to one or more users asking the one or more users to verify that the automatically created and stored metadata is accurate and complete. The users can verify the accuracy and completeness or update it to include corrections or additional information.

Different components of the content management system may be configured to ensure that the container is complete, to set flags indicating a completeness status and to send alerts to users. In some embodiments, the application on which the content is created may read the container file, compare the contents to the expected contents and determine whether the container is complete. This function may also be performed by a server and data store storing containers (e.g., server 626 and data store 622). Also, viewer applications or other creator or editor applications (in addition to the specific application on which the content was created) may also be configured to perform these functions.

In operation 726, the content management system can be configured to distribute one or more containers at the direction of or with the permission of their respective creators or other custodians. For example, a creator may direct the content management system (e.g., the creator's application or the server) to send one of his or her container files to a third party. The content management system can send the container to the designated recipient or recipients and track the container. In addition to tracking collaboration and other recipients outside of or absent an NFT transaction, the system can also be configured to track content shares to or accesses by purchasers or potential purchasers as part of an NFT transaction. The container can be protected such as by encryption, by password protection, by keying it to designated recipients, and so on. The system can set up tiered protection such that different recipients might have different levels of access to the container and the contents therein. For example, some recipients might be able to access everything in the container, whereas other recipients might only be able to access certain container items. As another example, some recipients might be given read-only access to one or more items in the container whereas other recipients might be given read/modify/write access. The system can be configured to track every user or entity who had access to the content as well as rights that were given to such users and entities as well as their access parameters such as, for example when they accessed it, what they accessed it, for how long they accessed it, and so on.

Where the container is a container housing a salable item for a token transaction, items in the container may be identified for distribution by a user and checked for completeness by the system. For example, certain items in the container may be identified as being available to potential rights purchasers at different times such as before submitting a bid or offer to purchase rights, after submitting a bid or offer to purchase rights, or on completion of a purchase of rights in the salable item in the container. As a further example, the offeror may provide a sample of the work whose rights are up for sale as well as other works providing information about the work for sale such as, for example, fact sheets, promotional materials (e.g., sound clips, video clips, brochures, etc.), a term sheet, and so on. In some embodiments, the work up for sale may be made available to potential purchasers for sampling. Further to this example, the system can be configured to provide a limited number of plays or views (or other access depending on the nature of the work). Features described above such as providing different levels of access and security can also be provided in the NFT context. For example, this might be implemented to provide different levels of purchaser or potential purchaser with different levels of access. Further to this example, a purchaser who paid a deposit or submitted a bid may have a different level of access as compared to a purchaser who only provided an indication of interest. Likewise, once a transaction is complete and a purchaser has completed the purchase (e.g., including remitted the funds) that purchaser may be granted full access rights to the content as specified in the smart contract. Where the sale is exclusive, at this time access by others may be terminated and from this point forward governed at the direction of the new owner. Where the purchased rights are nonexclusive or not yet exhausted (e.g., a nonexclusive license or a fractional ownership) other potential purchasers and bidders may be permitted to continue to enjoy the access rights they had prior to the other party completing his or her purchase.

In further embodiments, the system may be configured to provide a 'translation' of the term sheet to buyers or potential buyers. Embodiments may be implemented in which a processing module of the system (e.g., token transaction module 295 or other module) translates the machine-readable version of the smart contract governing the subject transaction into an English language (or other human-readable) form such that the buyer or potential buyer understands the terms of the respective NFT transaction. This can be presented in term sheet or other form and can describe, for example, the rights purchased (e.g., outright purchase, a license for X quantity of specified views or plates, a license for views or displays for a specified duration; and so on). Financial and residual rights can also be specified in the contract and a description provided to the user. These might include, for example, the cost of the transaction, royalties or other fees due to the seller (and in some instances other authors or owners), resale rights, payments due to the owner (and in some instances other authors or owners) in the event of a resale, and any other rights, obligations or restrictions that may be included as part of the transaction. The system may also be configured to accept an English language or other human readable form of terms and conditions from the seller and to compile those into the machine-readable contract automatically such at the smart contract can be created from a human generated term sheet.

In various embodiments, the custodian or custodians may be dynamic in that they can change over time as permissions change, such as when new persons are given access levels to view/modify content, or permissions are revoked from other persons.

The system may further be configured such that when the file is opened, the viewer application verifies the data in the local copy of the container against the data in the primary storage location (e.g., the data stored in the cloud) to determine whether any changes have been made since the transfer. If any changes were made, those changes may be highlighted to the viewer. Additionally, if authorized, an updated version of the file can be downloaded to the viewer. Likewise, changes made by a file recipient can be shared with other custodians (e.g., original content creators, other authorized viewers or editors) and they can be highlighted so that changes can be easily identified. Embodiments may require that such changes be approved by an authorized custodian prior to acceptance.

At operation 726, where a salable item is being transferred using an NFT transaction, the system might further be configured to mint an NFT and distribute the NFT to the new owner(s) and record the transaction in the distributed ledger. The system can also update the container data, including the NFT and other metadata to reflect the transaction. In some embodiments, as noted above, the system can be configured to create a new container for an NFT transaction and place the salable item subject to the transaction in the container. Accordingly, at operation 726 the transfer may encompass transferring rights to the container to the new owner of those rights.

Figure 9:
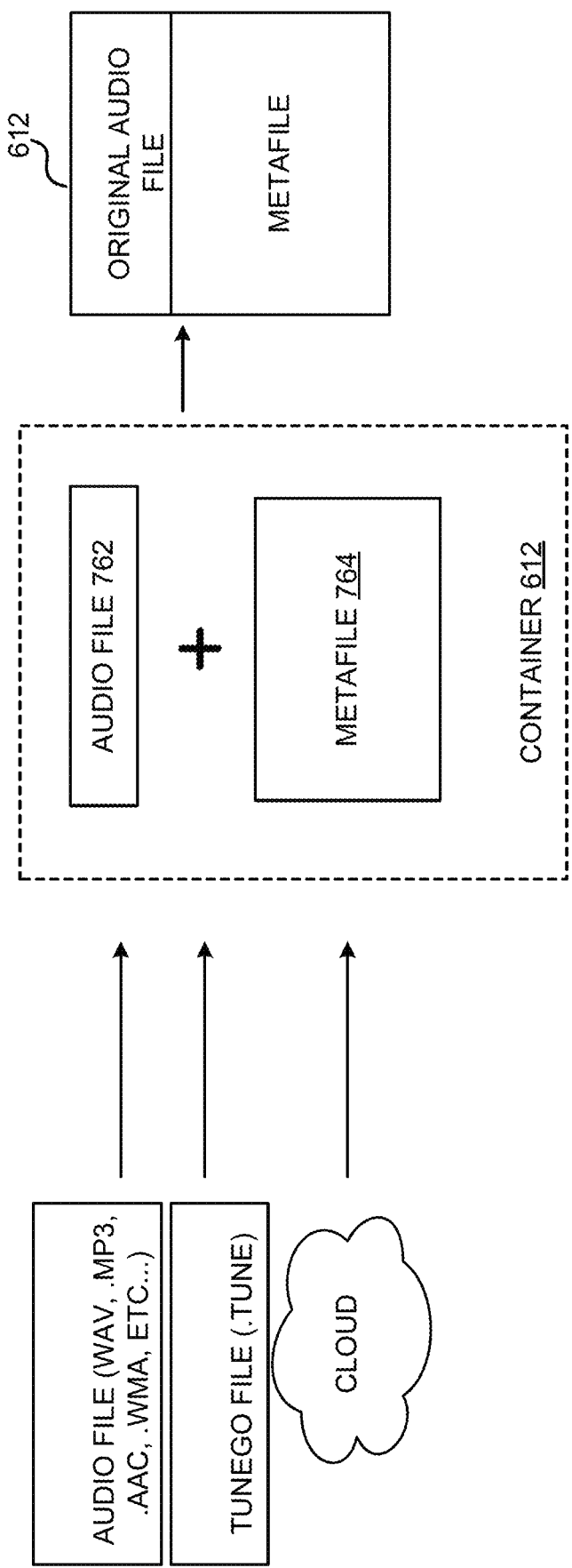
FIG. 9 illustrates an example creation of a content container in accordance with one embodiment.

FIG. 9 illustrates an example creation of a content container in accordance with one embodiment. More particularly, FIG. 9 illustrates an example of how an existing audio file such as a WAV, MP3, etc. file can be associated with, concatenated with or appended to include metadata (e.g. .TUNE data) and other data from the cloud to create a new file that could be played with an existing audio player (such as a conventional mp3 player). In this example, the resulting file includes the original audio file and information or data that might be included with it, and the additional metadata while retaining compatibility for play back with a conventional audio player. In this example, an original content file (in this case an audio file) 762 and a content metafile 764 are loaded into container 612. Content file 762 created by one or more creators might be a file such as a WAV, MP3, AAC, WMA or other audio file. The final container in this example includes the original audio file (or files) and the metafile(s).

Metafile 764 can be a collection of data that is added to container 612. In other embodiments, metafile 764 may be a specific or proprietary file structure that has a specified file format and may require a particular application to read, write or modify it. In the example illustrated in FIG. 9, metafile 764 is a proprietary .TUNE file type accessed with a compatible application. In other embodiments, other file types may be specified. In another application, the container 612 is a file with a specified file format (e.g., the .TUNE file) that can be loaded and accessed/played with a corresponding file player. As noted above, metadata (which may be stored in metafile 764) may include NFT metadata as well as other content metadata.

This example of FIG. 9 can be implemented to preserve backward compatibility with existing audio players while still including the capability to associate or store metadata which might be accessed, for example, via a particular viewer or application. Stated another way, embodiments may append metadata to an existing standard audio file while maintaining backwards compatibility with existing audio players so they can play the file as is a standard playable audio file, but when the container is opened by a proprietary app configured to work with container files, the app would know how to play the file and extract all the additional metadata as well.

Figure 10:
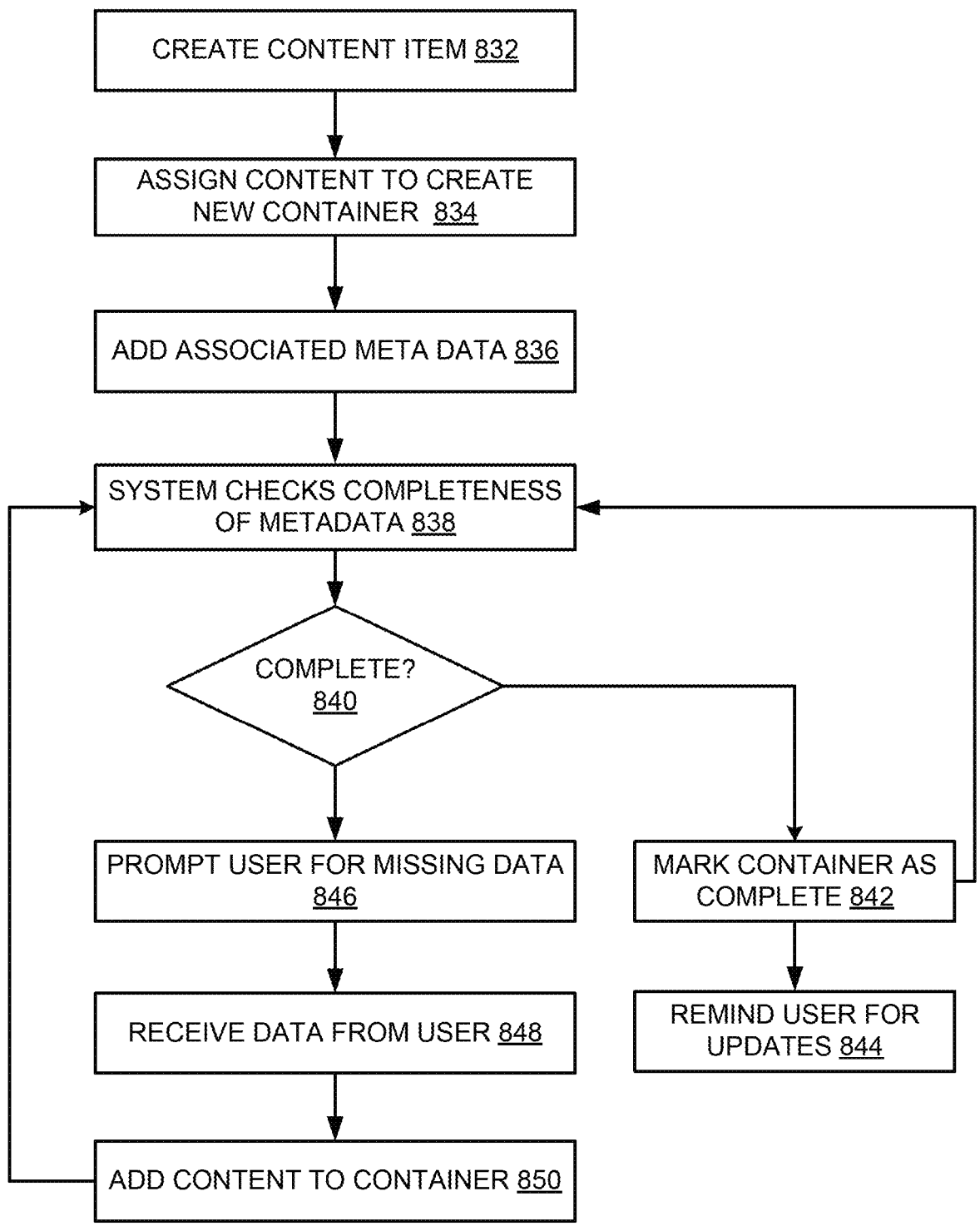
FIG. 10 illustrates an example process for creating a container in accordance with one embodiment.

FIG. 10 illustrates an example process for creating a container in accordance with one embodiment. At operation 832, one or more creators create a content item. For example, recording artists/musicians may record a song or an album. Although in various embodiments any content item created may be suitable for sale (in whole or in part, or alone or in combination), in various embodiments, the content created can be a content item created as an NFT content item intended for sale using an NFT transaction. Any container created for the content can be a special-purpose container created to hold the content for the NFT transaction, and ultimately for the new owner who acquired rights in the content as a result of the NFT transaction.

At operation 834, the creators provide the content they created to a content management application (e.g., content management application 615) so that the content can be assigned a container 612. Some embodiments may assign NFT content to an NFT container, for example, a container that is created specifically for NFT content to accommodate NFT metadata. However, in other embodiments, content may be assigned to a container not configured to store NFT metadata, but such containers may be modified by the system later on to accommodate NFT metadata. Accordingly, the application receives the content created at operation 832 and creates a container in which the received content can be stored. In some embodiments, the content created at operation 832 may be content that was previously created without specific contemplation of an NFT transaction, and that was later designated as being subject to NFT transaction and placed into an NFT container. In other embodiments, the content created at operation 832 may have been created specifically with the notion that rights to that content (or parts thereof) would be made transferable via an NFT transaction.

At operation 836, the creators or other authorized users add metadata associated with the created content to the created container. Where an NFT transaction is contemplated, NFT metadata can be included as well. Accordingly, the application receives the metadata associated with the content created at operation 832 and stores this metadata in the container 612 created for the content. Although the metadata may be stored in any of a number of different file formats, some examples of metadata file formats are described below.

At operation 838, the system checks for the completeness of metadata. Specifications may be created identifying the types of metadata items that are expected to be included for a particular content type. Accordingly, the system may identify the content type (e.g., based on the file extension or extensions for multiple files, or based on an identification provided by the creator on a UI), retrieved the appropriate specification for the content type or types included in the container and check the metadata file to determine whether specified content is included. In terms of the example depicted in Table 1, the system may check to ensure that creator information is included, album artwork is included, royalty payment information is included, copyright information is included, and so on. In other implementations, creators may be given the option to edit the standard specification for metadata for their particular content or to provide a custom specification for their content. In such applications, the system may compare the metadata on file with the custom or semi-custom specification to determine completeness. For NFT transactions, the system may check for the completeness of any required NFT metadata such as, for example, an identification of the salable item, a smart contract, other purchase terms, and so on.

Once the system verifies that the content is present in the metadata is complete, the content management system marks the container accordingly. In some embodiments, the system may be configured to check content metadata (for example, as described in Table 1) and to also check NFT metadata. Accordingly, the container can be marked as complete or incomplete for each type of metadata. As noted above, this may include setting a flag for the container, adjusting a container name, providing an appropriate designation in a field for the container (e.g., complete, NFT ready), emailing the appropriate users (e.g., creators or other authorized users) or other appropriate designation technique. This is illustrated at operations 840 and 842. Although not illustrated, the system may also inform the user that it believes the container is complete. The system may continue at operation 838 to perform periodic checks for completeness of the container. These checks may be performed at regularly scheduled intervals based on system settings or user preferences. These checks might also be triggered by system events such as request to share content, an indication to initiate an NFT transaction, actions to edit or update content, actions to view or listen to content, and so on.

At operation 844, even where the system has determined from its checks that the metadata appears to be complete, the system may be configured to periodically remind the creators or other designated users to update the metadata or to check the metadata to ensure that it is still current and complete. Users may be able to set the timing for periodic updates or this timing may be predetermined in the system. Updates may also be triggered based on events. For example, when a user requests that content be shared with a third party, the system may prompt the user at that time to confirm that the metadata is up-to-date and complete.

If upon completing its verification the system determines that the container is incomplete, the system may prompt the appropriate user or users for any missing data or information. This is illustrated at operations 840 and 846. In some applications the user may simply be provided with a warning that the metadata file appears to be incomplete or that content appears to be missing. In other applications, the system may provide a specific listing to the user or users of content or metadata items that appear to be missing. Accordingly, the user may use this warning as an opportunity to complete the metadata information.

Where the user subsequently provides additional content or metadata to be added to the container, at operation 848, the system receives this additional data from the user. At operation 850, this data is added to the container. The system may continue at operation 838 to perform periodic checks for completeness of the container. These checks may be performed at regularly scheduled intervals based on system settings or user preferences. These checks might also be triggered by system events such as request to share content, actions to edit or update content, actions to view or listen to content, and so on.

In various embodiments, the content management system may further be configured to prohibit users from sending or sharing files to others if the metadata appears incomplete. The system may be configured to allow the user to override the safeguard, in essence verifying that the user has confirmed the completeness of the metadata despite the systems warning or that the user is otherwise satisfied that the file can be appropriately shared.

Figure 11:
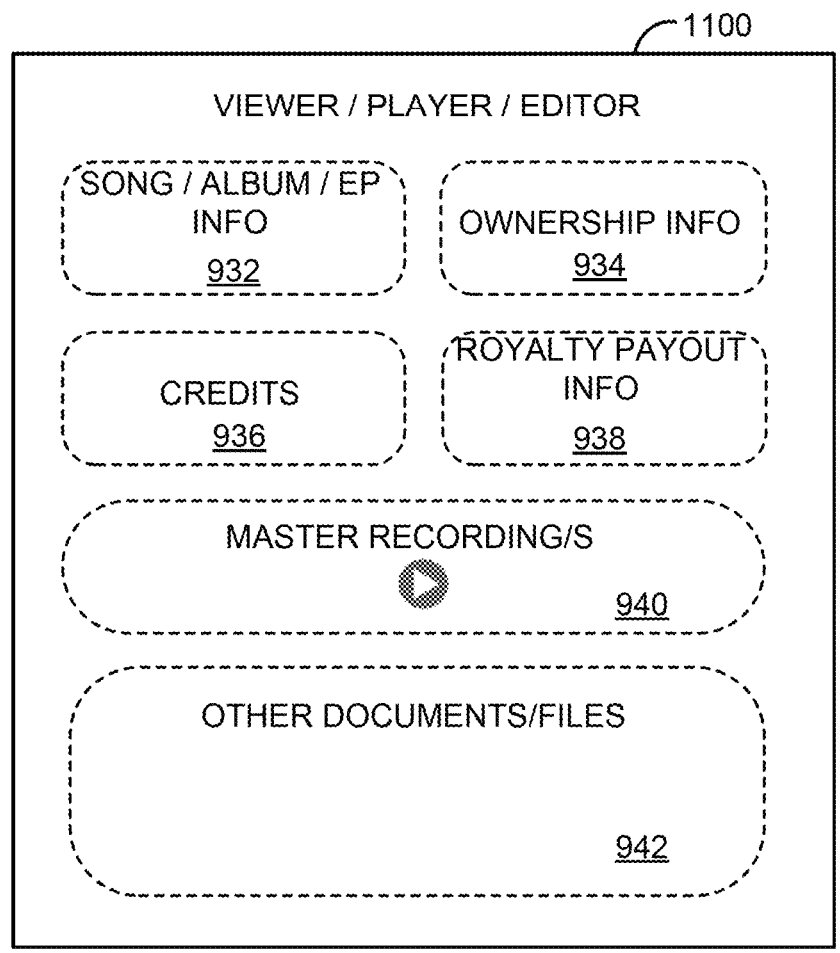
FIG. 11 illustrates an example UI for an application for a content management system in accordance with one embodiment.

FIG. 11 illustrates an example UI for an application (e.g., application 615) for a content management system. This can be implemented as the UI to allow users to view play or otherwise access content in a container, view metadata associated with that content in the container and edit the content or the metadata in the container. With reference now to FIG. 11, this example UI 1100 includes a plurality of user selection elements (e.g., physical or touchscreen buttons) allowing the user to access the information. Shown are user selection elements for content information 932, ownership information 934, credits information 936, royalty payment information 938, master recordings 940, and other documents and files 942. Selection of these user selection elements allows the user to drill down to the next level of data stored in the application. For example, selection of content information 932 (in the case of audio content, song/album/EP information) allows the user to view or edit this information. Selection of the master recordings 940 element allows the user to play the stored audio or A/V content or to view stored image content. Selection of ownership information, for example, may display the various parts of a content item and the ownership shares therein, including any rights held via an NFT. FIG. 11 illustrates just one example of a UI layout. In other embodiments, other layouts may be provided and other user selection elements for different data items can be provided.

Figure 12:
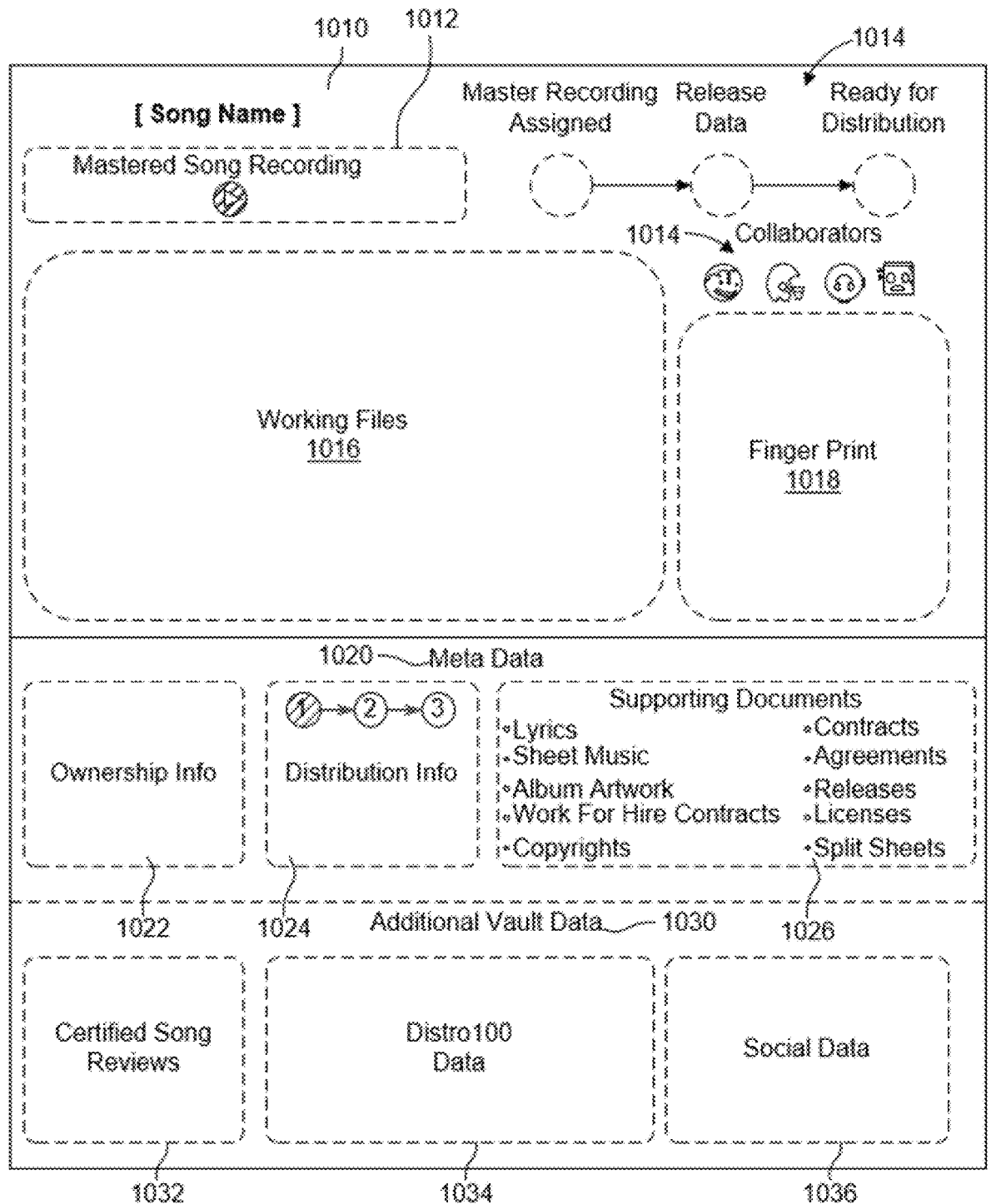
FIG. 12 illustrates an example UI for a container viewer in accordance with one embodiment.

FIG. 12 illustrates an example UI for a container viewer in accordance with one embodiment. As with the example of FIG. 11, FIG. 12 illustrates just one example of a UI layout.

In other embodiments, other layouts may be provided and other user selection elements for different data items can be provided. This example includes a file portion 1010, a metadata portion 1020 and an additional vault data portion 1030. Referring to file portion 1010 first, master recording element 1012 allows an authorized user to access and play/view the content stored in the container. Actuation of master recording element 1012, may launch an appropriate player application and cause the associated content to be played.

Status element 1014 allows a user to view and update status information relating to assignment of master recording, release dates, and distribution dates. In some embodiments, this information can be displayed in the form of dates such as the date the master recording is assigned, the release date, and the date it is ready for distribution. States may be captured by the system and displayed based on system activities (e.g., the actual date that content was released through the system) or they may be manually set an update. In other embodiments, the status information can be displayed in the form of indicators (as opposed to dates) such as a GREEN status indicator indicating complete, a YELLOW status indicator indicating partially complete and a RED status indicator indicating incomplete.

Working files element 1016 allows the user to access the content files associated with the master. This may allow authorized users to review and modify the content files themselves. Actuation of working files element 1016 may launch an appropriate editor application allowing the content to be accessed, reviewed and modified by the authorized user.

Fingerprint element 1018 can be included to provide a container fingerprint. The container fingerprint can include an audit log of activities occurring associated with the container. Activities may include actions such as changes to the container contents (e.g., updates, additions, deletions), access actions, transfers/shares of the container, and other events. The activities may also include an identification of those accessing the container, the date and time of access, duration of access, portions of the content accessed and so on. The log may, like other contents, be encrypted or otherwise protected. Container activities can also be managed and tracked using blockchain or other distributed ledger technology.

Metadata section 1020 can provide user interface elements to allow users to access and revise metadata for the container. This example illustrates user interface elements for ownership information 1022, distribution information 1024 and supporting documents 1026. Selection of interface element for ownership information 1022 allows the user to pull up, view and modify ownership information for the content in the container. Selection of interface element for distribution info 1024 allows the user to pull up, view and modify current distribution information. This may be used to track and display parties to whom content has been distributed, set distribution parameters for parties to receive the information (e.g., identify who where and when to send the associated content or the entire container), and to track dates and times of distribution and access. Selection of interface element for supporting documents 1026 can allow users to pull up, view and modify other metadata items in the container such as, for example, associated song lyrics, sheet music, album artwork, contracts, copyright information, licenses, and so on.

Additional vault data portion 1030 may be included to allow additional data to be tracked and stored for the content in the container. This example includes three storage elements, certified song reviews 1032, distribution information (e.g., Distro100 data) 1034, and social data 1036. The certified song reviews storage element stores reviews of the content and allows a user to access and view reviews of the content. In some cases, reviews may be limited to certified or verified reviews, whereas in other implementations, all reviews can be included. Distribution information interface element stores, and allows the user to access, view and modify distribution data regarding the who/when/where the content was distributed on a streaming basis. Streaming data from providers such as TuneGo™, Distro100™, Spotify™, Pandora™, and others can be accessed via this interface element. Social data storage element 1036 stores and allows the user to access data gathered by the system from social media and like sites. The gathered data may relate to the content, the artist, the publisher or other like information. The system may also store and allow the user to access social media links where this information can be accessed from its source.

In various embodiments, these and other additional vault data items can be collected by unaffiliated or third-party service providers and aggregated for quick and easy access by the container application user. As the above examples illustrate, listener/critic review data from multiple sources, streaming data from a plurality of streaming providers and social data from various social media sources can be collected, distilled and made available to the user via the interface elements in additional vault data portion 1030. Note that each of the interface elements in FIGS. 11 and 12 may be used to access an item directly or to drill down to a deeper level user interface.

Figure 13:
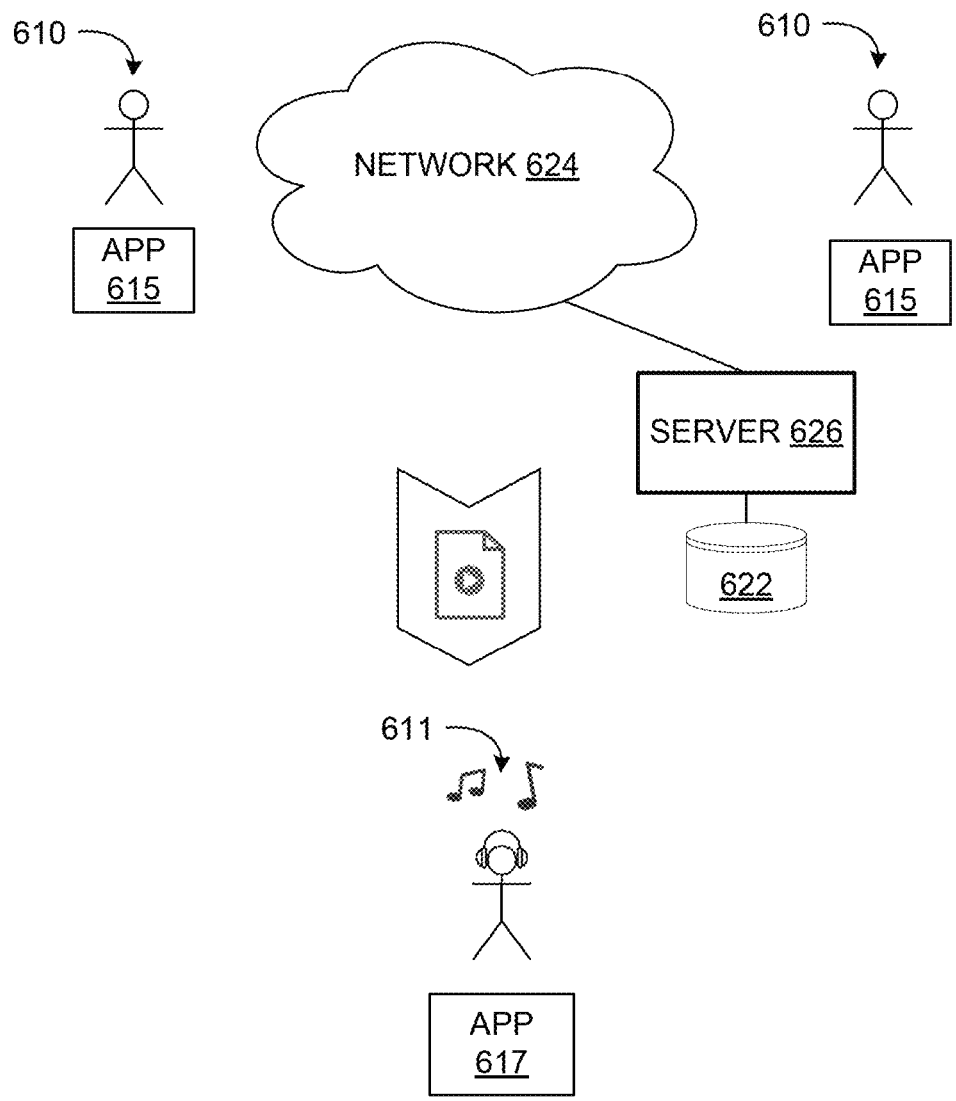
FIG. 13 illustrates an example scenario of collaborative music creation in a cloud environment in accordance with one embodiment.
Figure 14:
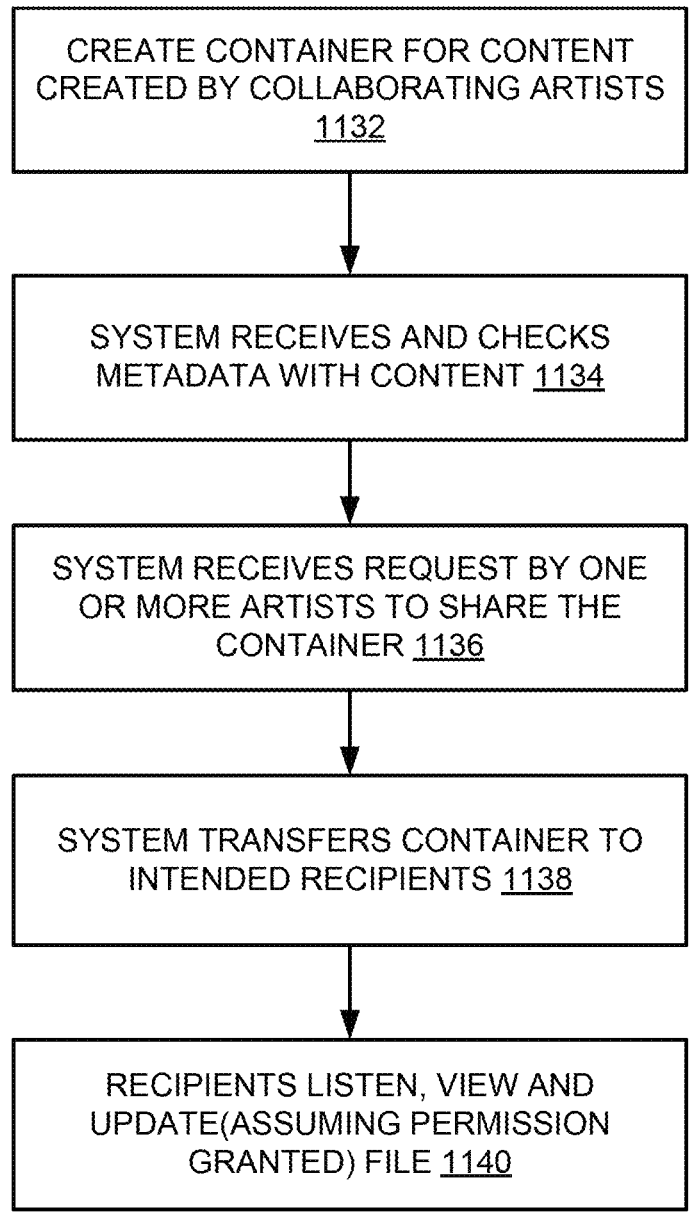
FIG. 14 illustrates an example process for collaborative music creation in accordance with the example of FIG. 13.

FIG. 13 illustrates an example scenario of collaborative music creation in a cloud environment in accordance with one embodiment. FIG. 14 illustrates an example process for collaborative music creation in accordance with the example of FIG. 13. In this example, two creators 610 use applications 615 to create content, which can be stored on a data store 622 (e.g., a vault) at server 626. Creators 610 use the system to share their content file, or a container 612 including the content file with a third party 611.

At operation 1132, the system creates a container to contain the content created by creators 610 and the associated metadata. As noted above, the container created can be container configured to accommodate NFT transactions. Creators 610 may use the system application 615 to collaboratively create the content and store it in a container with the associated metadata (e.g., as an audio file 762 and a metafile 764). At operation 1134, the system verifies that the metadata associated with the content is complete. For example, this verification can be performed by application 615 during or after content creation or by server 626 when the container is provided to data store 622 for storage.

At operation 1136, the system receives a request by one or more of the creators 610, or from an authorized user, to share the content or the entire container 612 with a designated recipient 611. This may be done, for example through application 615, server 626 or a combination of the two. This request can also be made in the context of an NFT transaction. For example, an owner may make a request to share a salable item in a container with potential purchasers via a token transaction. As noted above, in some embodiments the system may create a separate container for the salable item. The system may also be configured to ensure that appropriate permissions from other owners (e.g., creators, contributors or otherwise) is obtained before any content can be shared in contemplation of an NFT transaction. The system can check appropriate permissions to determine whether the requested transfer or NFT transaction is permitted. The system can also check completeness of the container (including NFT metadata in the event of an NFT transaction) before transferring and issue any alerts, if appropriate, depending on the status of the completeness of the container. Examples of a designated recipient may include, a producer, creator, manager, record label, publisher, a potential or actual purchaser via an NFT transaction, and so on.

Assuming the users are authorized and the transfer permitted, the system transfers the container 612 to the designated recipient 611 at operation 1138. At operation 1140, the recipient accesses the container and the content therein using an application 617. In various embodiments, application 617 may be the same as or similar to application 615. In some implementations, application 617 may be limited to a playback only application whereas another implementations, application 617 may be a fully functional application allowing playback and modification. The system may be configured such that application 615 or server 626 keeps track of the transfers made and can provide reporting to the user such as, for example via the user interfaces such as those exemplified in FIGS. 11 and 12.

Upon authorizing a transfer, a sender may specify different levels of permission for different recipients. In some instances, certain recipients may have set levels of permissions. Permissions can identify parameters such as access types (review, modify, etc.), number of times access is permitted, durations or time windows in which access is permitted, further sharing rights, and so on. Assuming recipient 611 has the appropriate permissions, recipient 611 may modify the content or the metadata and, using application 617, save and updated container file locally or in data store 622, or otherwise transfer the updated container file to the content creators 610 or other content centers. These different levels of permission can apply to recipients 611 who are purchasers or potential purchasers of rights via an NFT transaction.

Figure 15:
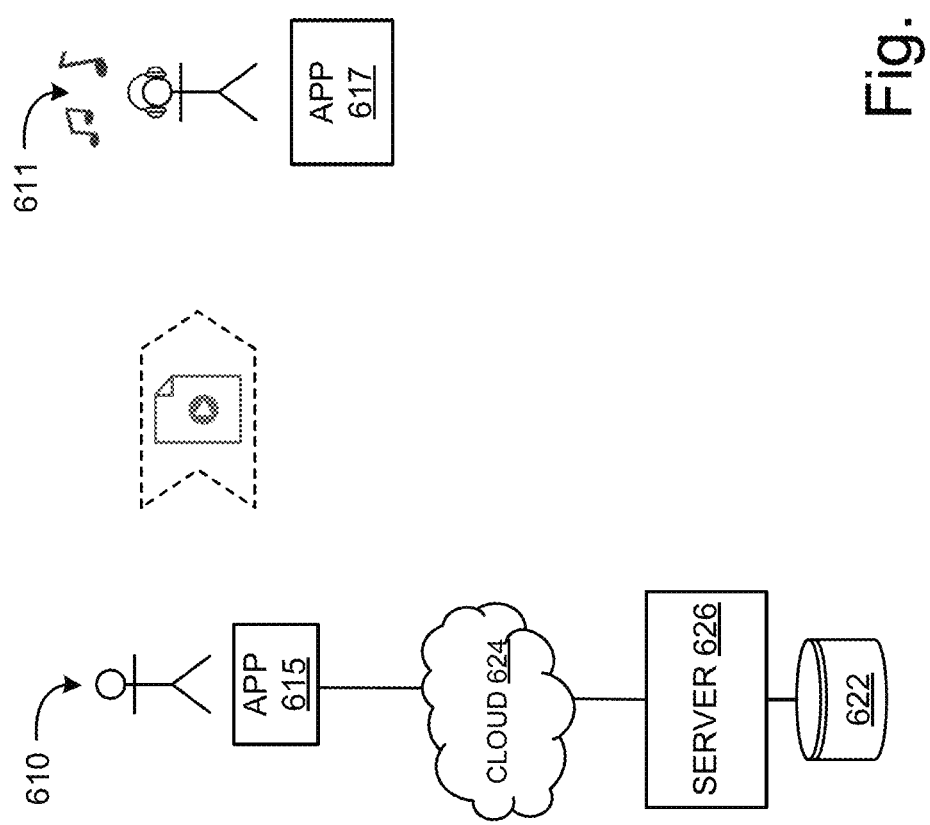
FIG. 15 illustrates an example scenario of music creation in a local environment in accordance with one embodiment.
Figure 16:
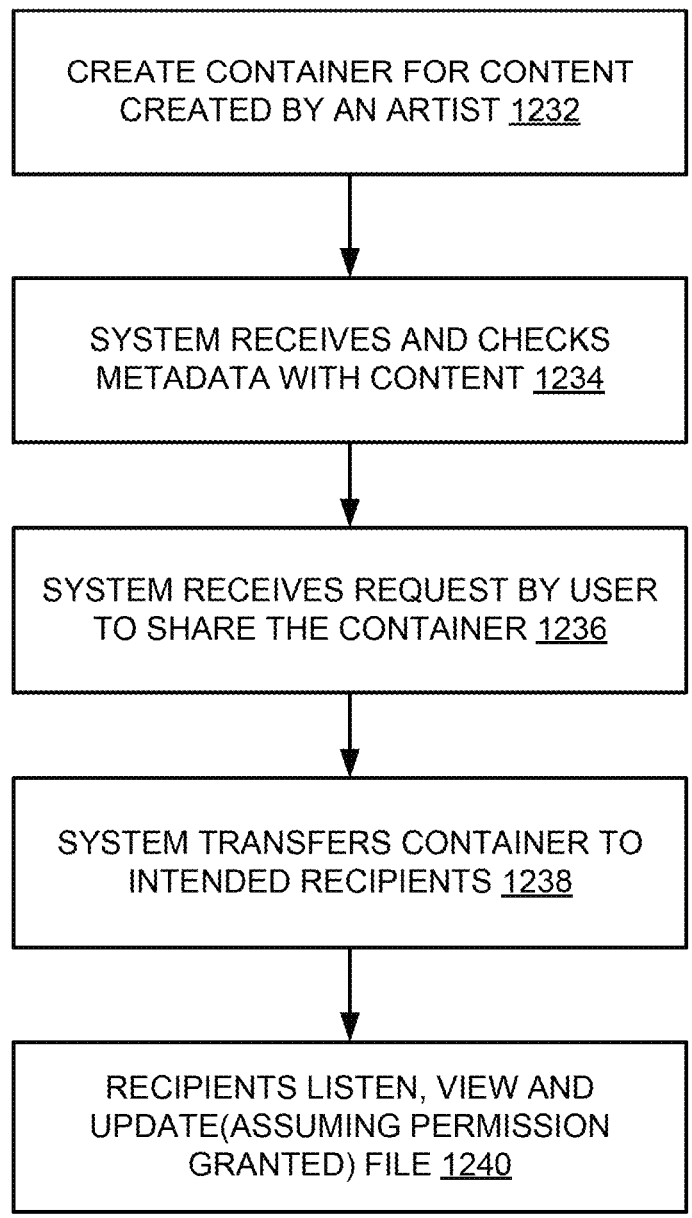
FIG. 16 illustrates an example process for music creation in accordance with the example of FIG. 15.

FIG. 15 illustrates an example scenario of music creation in a local environment in accordance with one embodiment. FIG. 16 illustrates an example process for music creation in accordance with the example of FIG. 15. In this example, a creator 610 uses an application 615 to create content, which can be stored on a data store 622 (e.g., a vault) at server 626. Creator 610 uses the system to share its content file, or a container 612 including the content file with a third party 611.

With reference now to FIGS. 15 and 16, at operation 1232, the system creates a container to contain the content created by creator 610 and the associated metadata (which may include NFT metadata). As noted above, the container created can be container configured to accommodate NFT transactions. Creator 610 may use system application 615 to create the content and store it in a container (e.g., container 612) with the associated metadata (e.g., as an audio file 762 and a metafile 764). At operation 1234, the system verifies that the metadata associated with the content is complete. For example, this verification can be performed by application 615 during or after content creation or by server 626 when the container is provided to data store 622 for storage.

At operation 1236, the system receives a request by creator 610, or from an authorized user, to share the content or the entire container 612 with a designated recipient 611. This may be done, for example through application 615, server 626 or a combination of the two. This request can also be made in the context of an NFT transaction. For example, an owner may make a request to share a salable item in a container with potential purchasers via a token transaction.

As noted above, in some embodiments the system may create a separate container for the salable item. The system may also be configured to ensure that appropriate permissions from other owners (e.g., creators, contributors or otherwise) is obtained before any content can be shared in contemplation of an NFT transaction. The system can check appropriate permissions to determine whether the requested transfer or NFT transaction is permitted. The system can also check completeness of the container before transferring and issue any alerts, if appropriate, depending on the status of the completeness of the container (including NFT metadata in the event of an NFT transaction). Examples of a designated recipient may include, a producer, creator, manager, record label, publisher, a potential or actual purchaser via an NFT transaction, and so on.

Assuming the user requesting transfer is authorized and the transfer permitted, the system transfers the container 612 to the designated recipient 611 at operation 1238. At operation 1140, the recipient accesses the container and the content therein using an application 617. The system may be configured such that application 615 or server 626 keeps track of the transfers made and can provide reporting to the user such as, for example via the user interfaces such as those exemplified in FIGS. 11 and 12.

Figure 17:
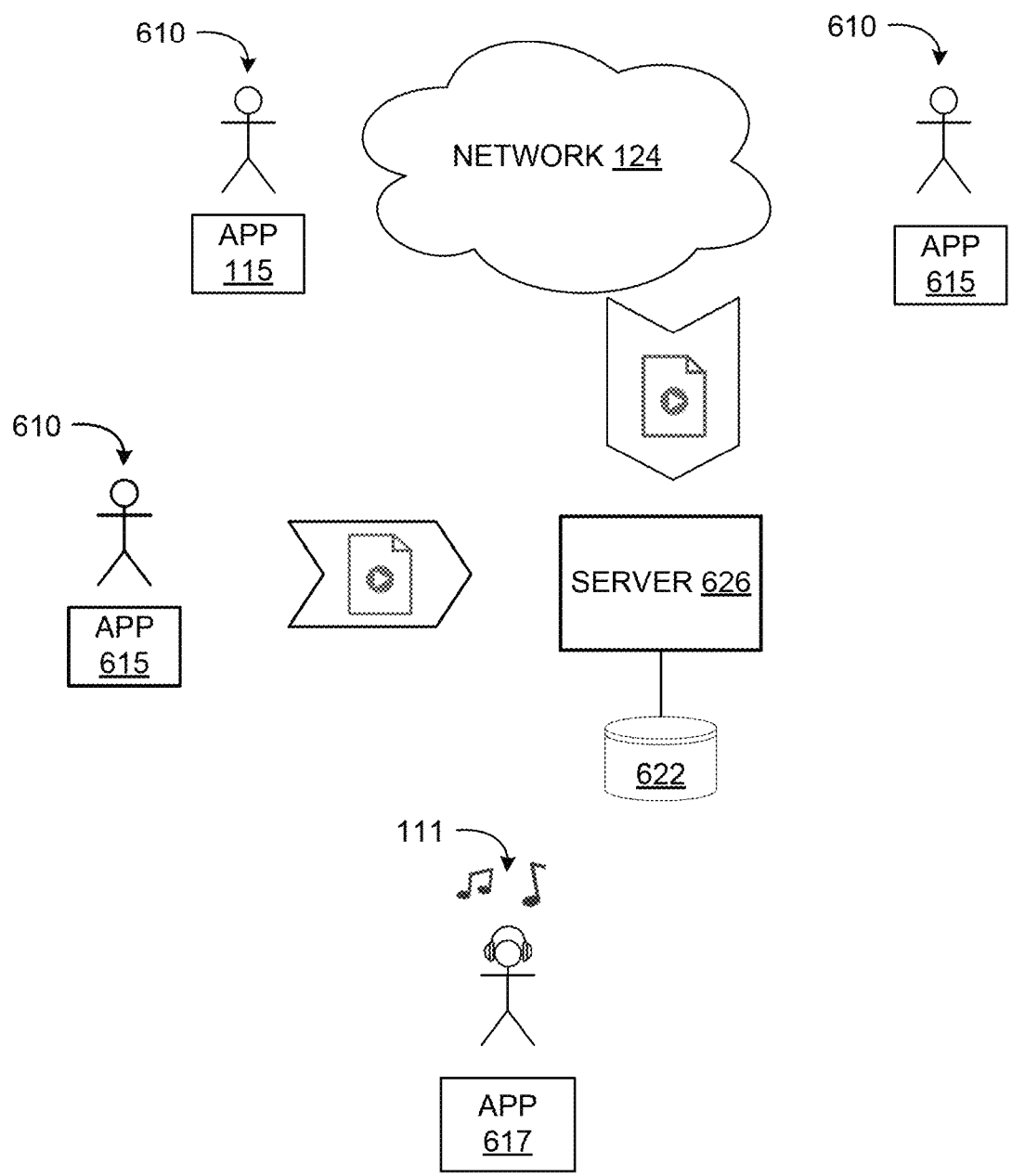
FIG. 17 illustrates an example scenario of hybrid music creation in which multiple creators create content in a cloud-based environment and another collaborator performs content creation in a local environment.

FIG. 17 illustrates an example scenario of hybrid music creation in which multiple creators 610 create content in a cloud-based environment and another collaborator performs content creation in a local environment. This example combines the example illustrated in FIGS. 13 and 14 with the example illustrated in FIGS. 15 and 16.

In the various examples disclosed herein, the transfer of a container 612 for the files therein can be made by sending the container or files themselves or by sending a link to a location where the container or the files therein can be accessed. For example, the system may send a recipient a link or other designation to access the container stored in data store 622.

Upon authorizing a transfer, a sender may specify different levels of permission for different recipients. In some instances, certain recipients may have set levels of permissions. Permissions can identify parameters such as access types (review, modify, etc.), number of times access is permitted, durations or time windows in which access is permitted, further sharing rights, and so on. Assuming recipient 611 has the appropriate permissions, recipient 611 may modify the content or the metadata and, using application 617, save and updated container file locally or in data store 622, or otherwise transfer the updated container file to the content creators 610 or other content centers.

If a recipient does not have appropriate permissions, the system may be configured to allow the recipient to submit a request for the particular permission desired (e.g., to update a particular item of data) and to present the request to designated owners/admins of the data for approval or denial. Users may be given the ability to adjust settings to specify the various notifications they would like to receive throughout the process of sharing data with other parties.

Application 615 may be implemented to facilitate metadata tracking and update. Embodiments can include the ability to display metadata to the user so that the user can make appropriate updates. The system can further be configured to reach out through network connections to verify of any metadata is out of date. Any out of date data can be flagged and visually highlighted so the user knows that it is stale data.

In various embodiments, creative asset metadata (including associated documents and including NFT metadata) may be appended to an existing media file in another file format such as an .mp3, .wav, or other file. In the process, this may create a new file that is readable in its native file format by existing applications such as an audio player capable of reading such files. This preserves the playability/accessibility of the original content if that is desired. The file may be converted in such a way that when the file is opened by the specific Viewer/Reader (e.g., application 615) the application will be able to extract, display and play the additional content.

Figure 18:
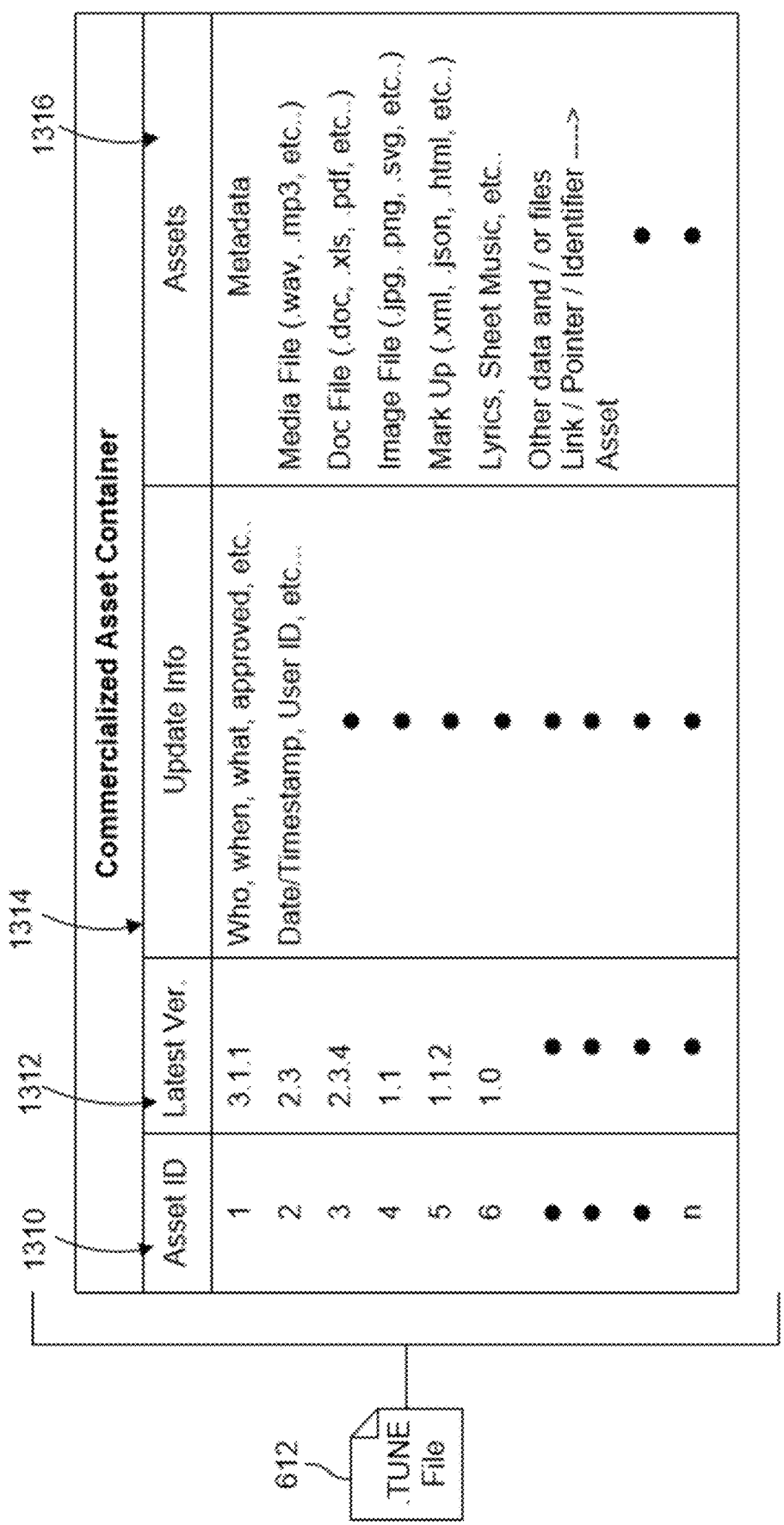
FIG. 18 illustrates an example description of a descriptor file for contents of a container in accordance with one embodiment

FIG. 18 illustrates an example description of a descriptor file for contents of a container 612 in accordance with one embodiment. In this example, the descriptor file includes, for each asset, an Asset ID 1310, version information 1312, update information 1314 and identification of the asset itself 1316. Asset ID can be any identification information to identify the various assets in the container, preferably such that each asset may be uniquely identified. In this example, a numeric designation 1-N is utilized. Where different versions are contemplated and may be tracked, version information 1312 can be used to designate and display the current version of the asset item. In this example, version numbers of the format X.Y.Z are used, although other formats may be utilized. Update information 1314 can be used to capture and display information relative to the version number. This example illustrates displaying who made the update, when it was updated, what the update entails, how it was approved, and so on. The asset identification 1316 itself in this example is a listing of the file. For example, the assets in this container include a content file (e.g., media file in the form of a .wav, .mp3, etc file), a document file (e.g. for contracts), an image file (e.g., for album cover art), and so on. In some embodiments, the .TUNE file itself can include a version number for version tracking such that when updates are made to the contents of the container, that container's version number can also be updated.

In various embodiments disclosed herein, metadata information, including NFT metadata, can be multiple separate metadata files or a metadata file including multiple items of metadata content such that can also be loaded into or associated with a container 612. The metadata can be a collection of data items that are added to container 612. In other embodiments, the metadata can be in a specific or proprietary file structure that has a specified file format and may require a particular application to read, write or modify it (e.g., a proprietary .TUNE file, although other file types may be specified).

Embodiments may be configured such that users can download or extract individual files or data from the .TUNE file, users can view and listen to the files that are included in the .TUNE file, and users can edit or update data in the .TUNE file if they have permission. The system can further be configured such that updates to a local version will also update the data on the server (626, 622 and will send notifications regarding the modifications to other users as well as the owner/admin of the content.

In this example a single audio file (label here as a Media File) is illustrated as being stored in the container. Similarly, in the example illustrated in FIG. 9, a single audio file 762 is illustrated as being stored in container 612. This audio file might be a single track or a collection of tracks (e.g., an album or partial album). Accordingly, an album can be contained in a single container file 612, or an album can be contained across multiple container files (e.g., one track of the album per container 612). The same can be said for other types of content as well.

Storing items in a container (e.g., container 612) can include, in some embodiments, packaging the items together and wrapping them in a container file. The container file can include a file name and can have the stored items embedded within the file. In other embodiments, the container 612 can be implemented in whole or in part as a virtual container and its contents could potentially be physically located in different databases or different locations but linked to or otherwise associated with their respective container 612. Accordingly, storing items in a container can include identifying the items as belonging to the container. This may be implemented by listing the file names in the container file, using a lookup table to store the filenames included in the container, identifying the corresponding container for each item by designating the container in the filename or file header, or otherwise associating the item files with the corresponding container.

Figure 19:
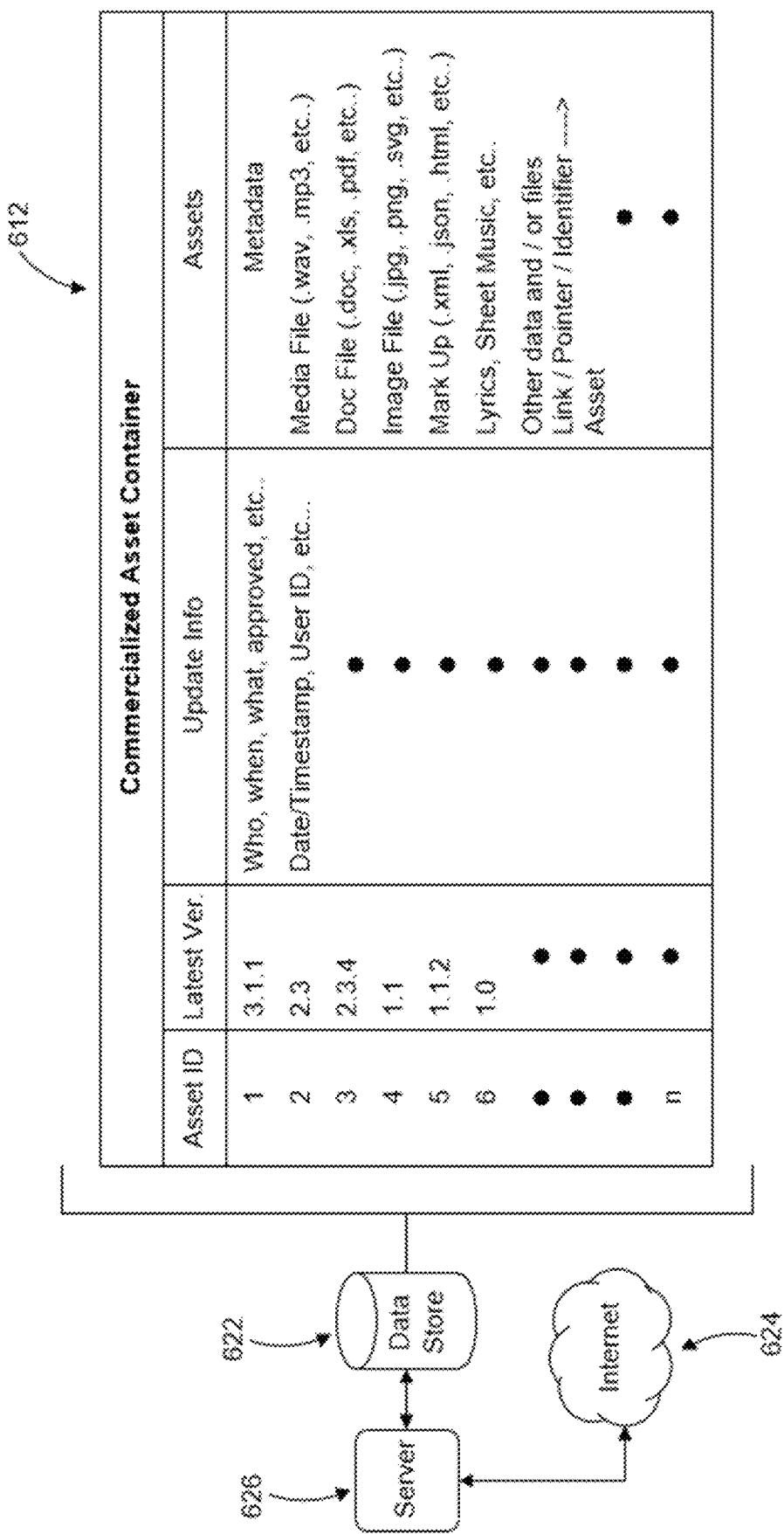
FIG. 19 illustrates an example of a container stored in a data store in accordance with one embodiment.

FIG. 19 illustrates an example of a container stored in a data store in accordance with one embodiment. In this example, container 612 is stored in data store 622 of server 626 which may be accessible via a network 624 such as the Internet.

Figure 20:
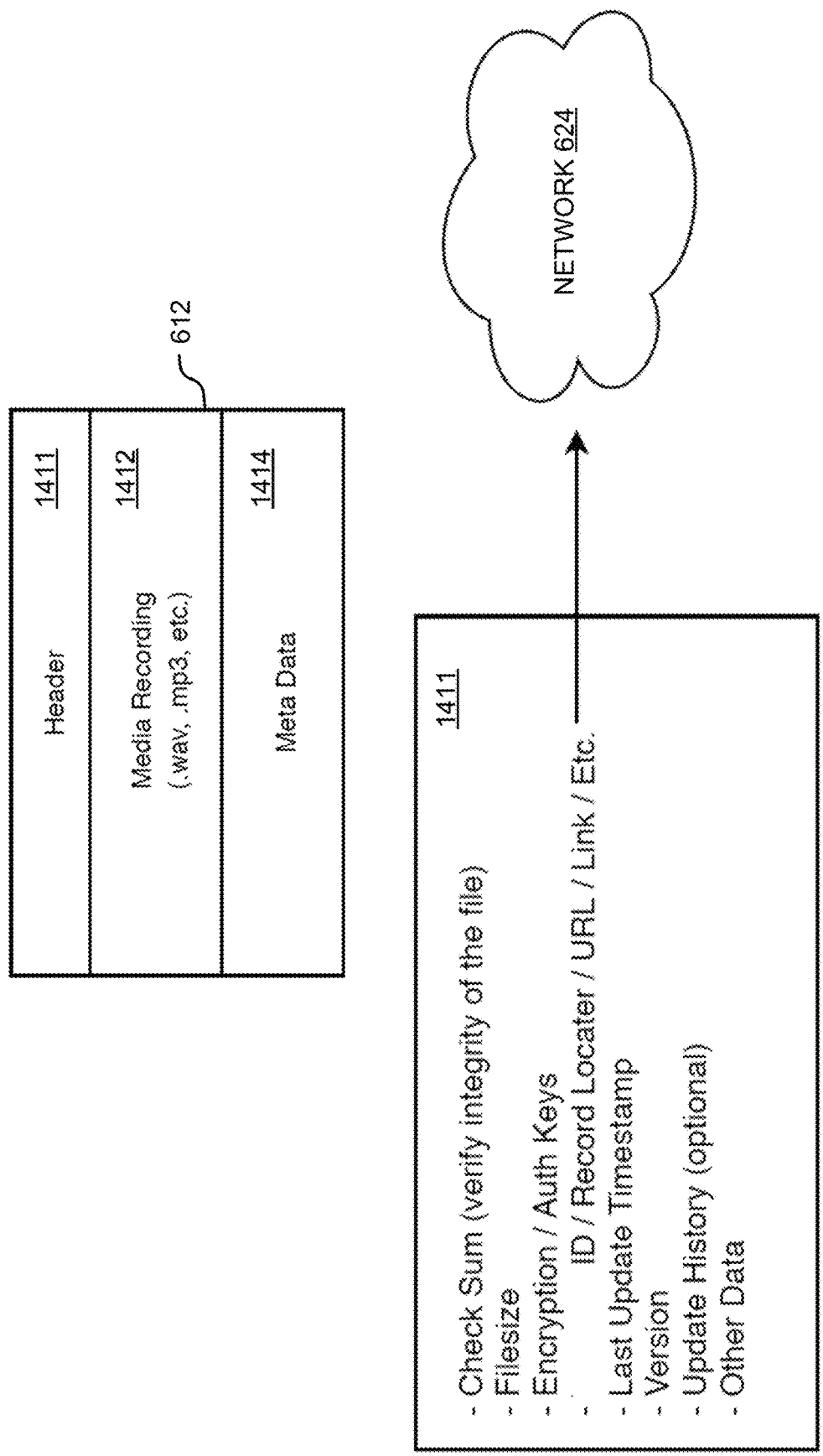
FIG. 20 illustrates an example file structure that can be used for a container file 612 in accordance with one embodiment.

FIG. 20 illustrates an example file structure that can be used for a container file 612 in accordance with one embodiment. Although any of a number of different structures can be utilized, this example structure includes a header 1411, the content 1412 and metadata 1414. In the context of FIG. 9, content 1412 may include one or more audio files 762, and metadata 1414 may include a metafile 764. An example of header 1411 is also illustrated in FIG. 20. Again, any of a number of different header structures can be utilized. This example header 1411 includes a checksum (to verify integrity), a file size indicator, encryption information, identifying information, version information, update history, and other information. As this example further illustrates, container 612 may be sent to data store 622 or otherwise shared via network 624.

Figure 21:
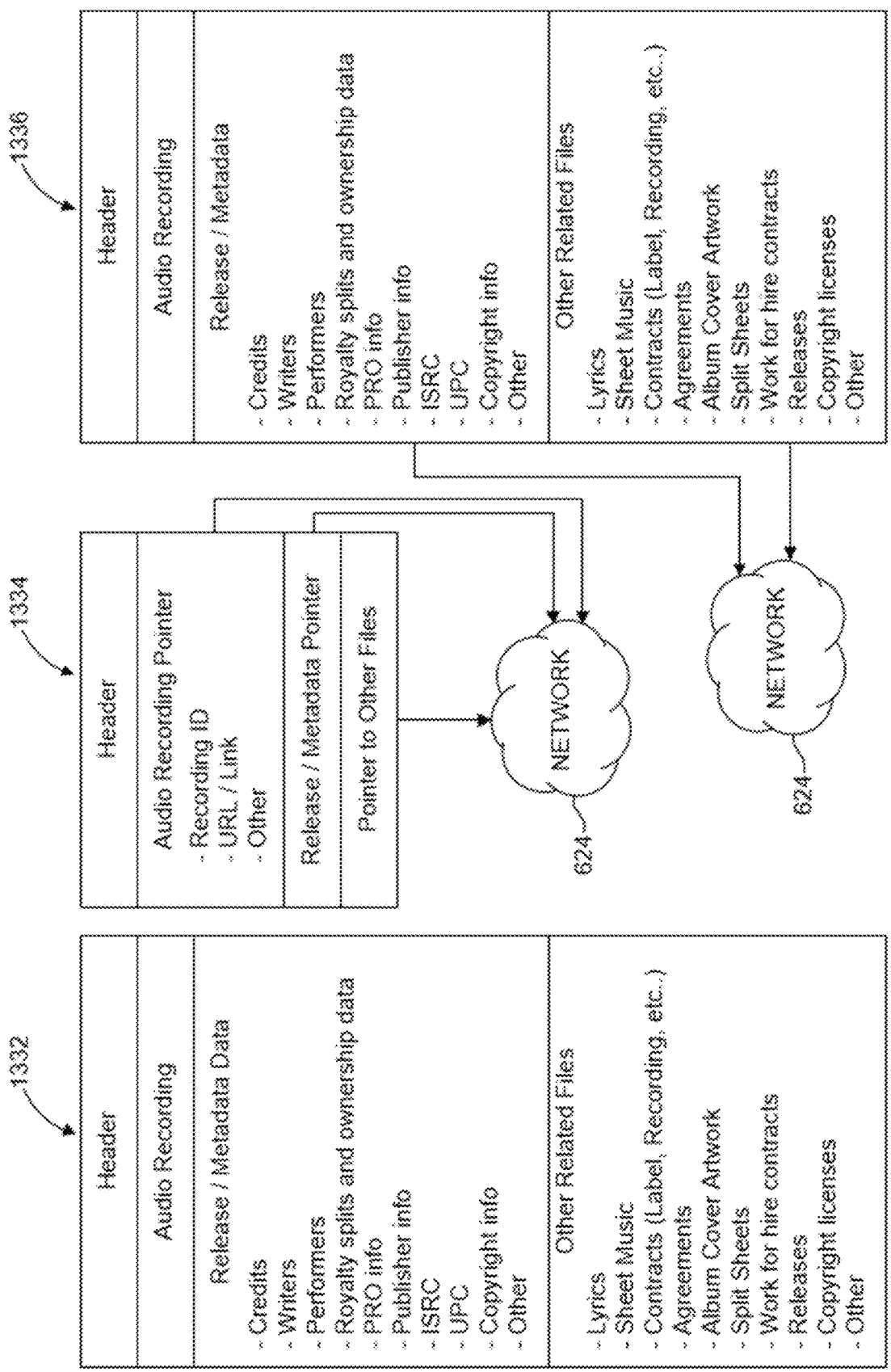
FIG. 21 illustrates examples of different forms of container storage. At 1332, a fully encapsulated container 612 is illustrated.

In various embodiments, container 612 may be maintained as an integral unit and stored in one location, or copied across multiple locations. In other embodiments, information in a container 612 may be stored in multiple locations, but not necessarily all in the same place. FIG. 21 illustrates examples of different forms of container storage. At 1332, a fully encapsulated container 612 is illustrated. This encapsulated container includes all data maintained in a single container. At 1334, all of the data for the container (except for the header in this example) is stored external to the container. For example, it may be stored at data store 622 accessible via network 624. In other examples, the data can be stored in other locations including multiple locations. Here, pointers or indices are used to point to the locations of the files. 1336 illustrates a hybrid approach in which a combination of internal (encapsulated data) and external storage are used. Here, the container includes the original audio recording, but at least some of the metadata is stored elsewhere in links or indices to that data point to the data locations.

Figure 22:
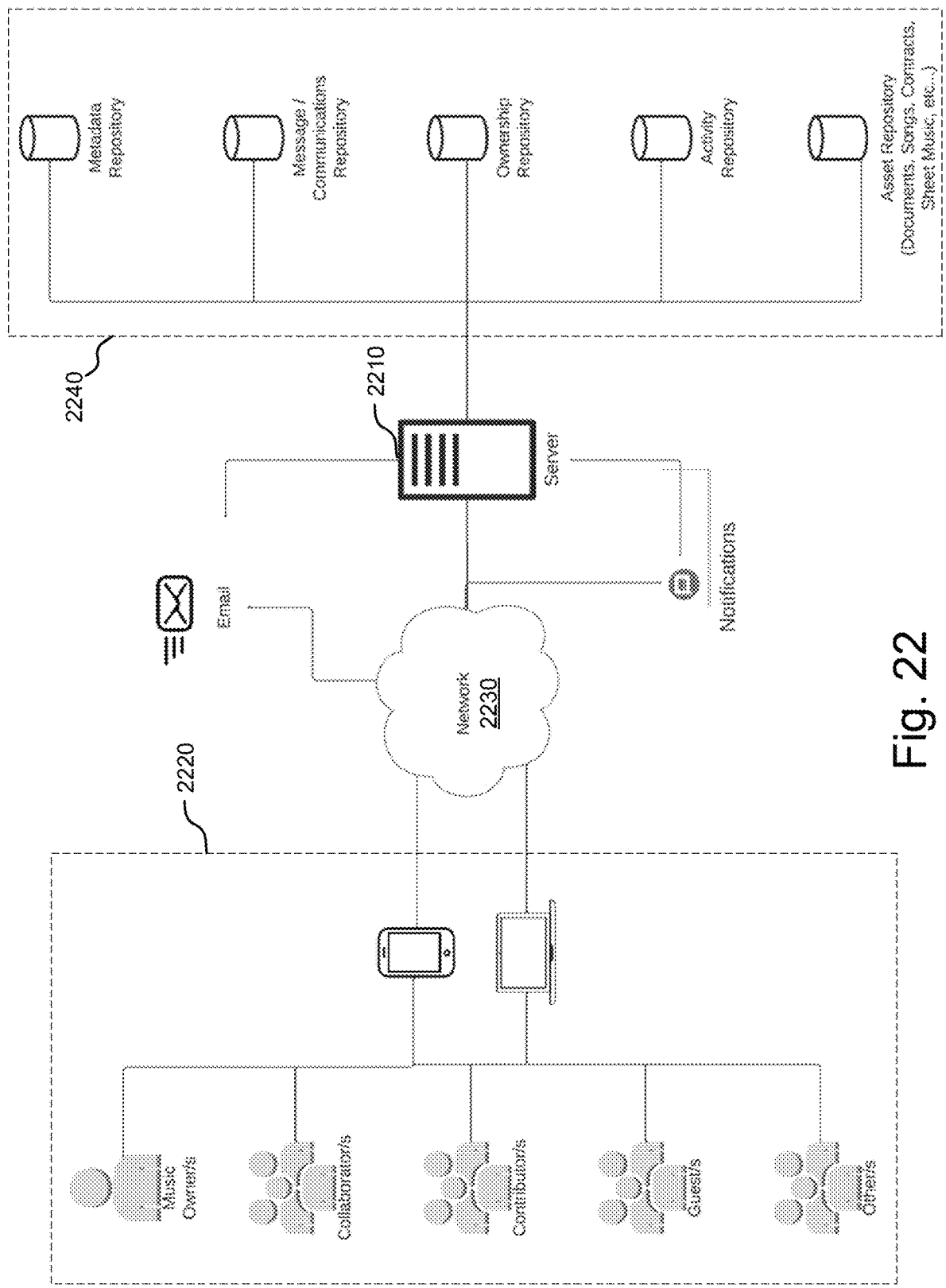
FIG. 22 illustrates a diagram of a system to enable communications and collaboration of media content in accordance with one embodiment.

FIG. 22 illustrates a diagram of an example system to enable communications and collaboration of media content in accordance with one embodiment. System 2210 includes server 2210, data repositories 2240, and one or more user devices 2220 operated by one or more parties affiliated with a media content item, including, for example medium content owners, collaborators, contributors, their guests, and other users. A network 2230 connects the various devices for intercommunications. System 2210, data repositories 2240, user devices 2220, network 2230 may be similar to digital vault 110, repository 115, user devices 125, 135, and network 160 of FIG. 1.

System 2210 may manage organization, storage and communications of files and metadata related to media content (e.g., a song, album, video, artwork, track, lyrics, script, single media, etc.). The communications may be related to various entities such as an album, folder, file, ownership, etc. One or more users via their user devices 2220 may communicate and coordinate in the development and creation process of the media content, as well as for other aspects relating to the media content.

System 2210 may maintain contact information and enable communications for all entities. The communication may be related to the media content, including creation and modification of media content, collaboration on the creation and modification, coordination of licensing and ownership rights of the media content, royalty shares in the media content, and other discussions/meetings regarding the media content and related topics. During creation of the media content, as well as any time period after the media content has been commercialized, the users can easily communicate to review, discuss, and approve various aspects of the media content including, for example, components of the media content (e.g., images, tracks, lyrics, video sequences, and so on), future licensing opportunities related to the media content, royalty shares for the media content, and other aspects of the media content via system 2210. The system may also be configured to track contributions during these communications to further facilitate identification and tracking of contributors.

These and other features described herein constitute improvements over conventional haphazard processes that fail to maintain contact information and track communications between parties, leaving uncertainty whether, for example, the necessary approvals are received from all involved parties and whether all the right parties are identified as contributors or owners of the content.

The communication data may include audio and/or video data. For example, system 2210 may record group meetings with recording capabilities that is saved in an audit trail of the media content.

The communication data may be centralized in one location in repositories 2240 are shared across a plurality of repositories 2240. The user devices 2220 may access repositories 2240 to identify all communications, actions, and data associated with the media content throughout its lifecycle. Repositories 2240 may maintain a historical recording to keep throughout the lifecycle of the media content.

Repositories 2240 may include a transaction log (e.g., container fingerprint element 1018). Communications and media content audit trail can help resolve any future disputes or questions that may arise amongst contributors and/or collaborators. Additional functionality may include communications and data logging of transactions related to payment distributions such as royalty payments.

The transaction log may be accessible via user devices 2220. The user interface may display an aggregate of all activities associated with the media content accessible by the particular user, including a folder, project, or locker from the user's authorized communication channels. This may provide a holistic view of the activities related to the user that can be displayed and sorted (e.g., the most recent activity first, reverse chronological order, etc.). The data may include a profile name, project name, media content description, transaction log data, timestamp, participants and the like. Different users may be provided with different access levels to control who is granted permission to view or access various elements of the transaction log.

In addition to messages in the form of audio/video messages, calls and meetings via user devices 2220, in various embodiments the user devices 2220 can generate and transmit electronic messages (e.g., text messages) through system 2210 that are transmitted to other user devices 2220 and stored in repositories 2240. For example, a request message may be generated to ask other users for feedback on media content, including, for example, a file, album, track, artwork, video or metadata. The response message can be generated by one or more other users and received by the original user. In some embodiments, messaging shorthand technologies can be used to facilitate the messaging process such as providing requests and answers in the form of a poll, vote, rating, score, thumbs up or down, or other feedback request. The messaging system may be configured to provide user interface attributes for user devices to facilitate quick responses such as one-touch interface icons for responses to poles, votes, requests for rating, thumbs up/down responses, and so on. The responses may be tallied and stored by the system as part of the record.

The electronic messages may propose various requests to one or more users in a communication channel where users can respond with an action that will get tallied and stored.

The electronic messages can be accessed directly from the system 2210. For example, a song can be shared in a message and one or more users can access the song via their user device 2220 and provide a rating for the song. The song, ratings, and related user information may be stored in repositories 2240. In another example, a request message can be sent to a plurality of users asking them to confirm updated data is correct (e.g., song title, verse, melody, etc.) and the users can send a response message such as by entering a bespoke response or by selecting from application-provided responses (e.g., by selecting "Yes" or "No") via a user interface that can automatically generate the response message. As these examples illustrate, ache medication system can be configured to allow real-time audio/video communications among a plurality of participants as well as messaging among the participants. As also noted, records of these communications can be maintained for future access as may be useful or necessary.

Figure 23:
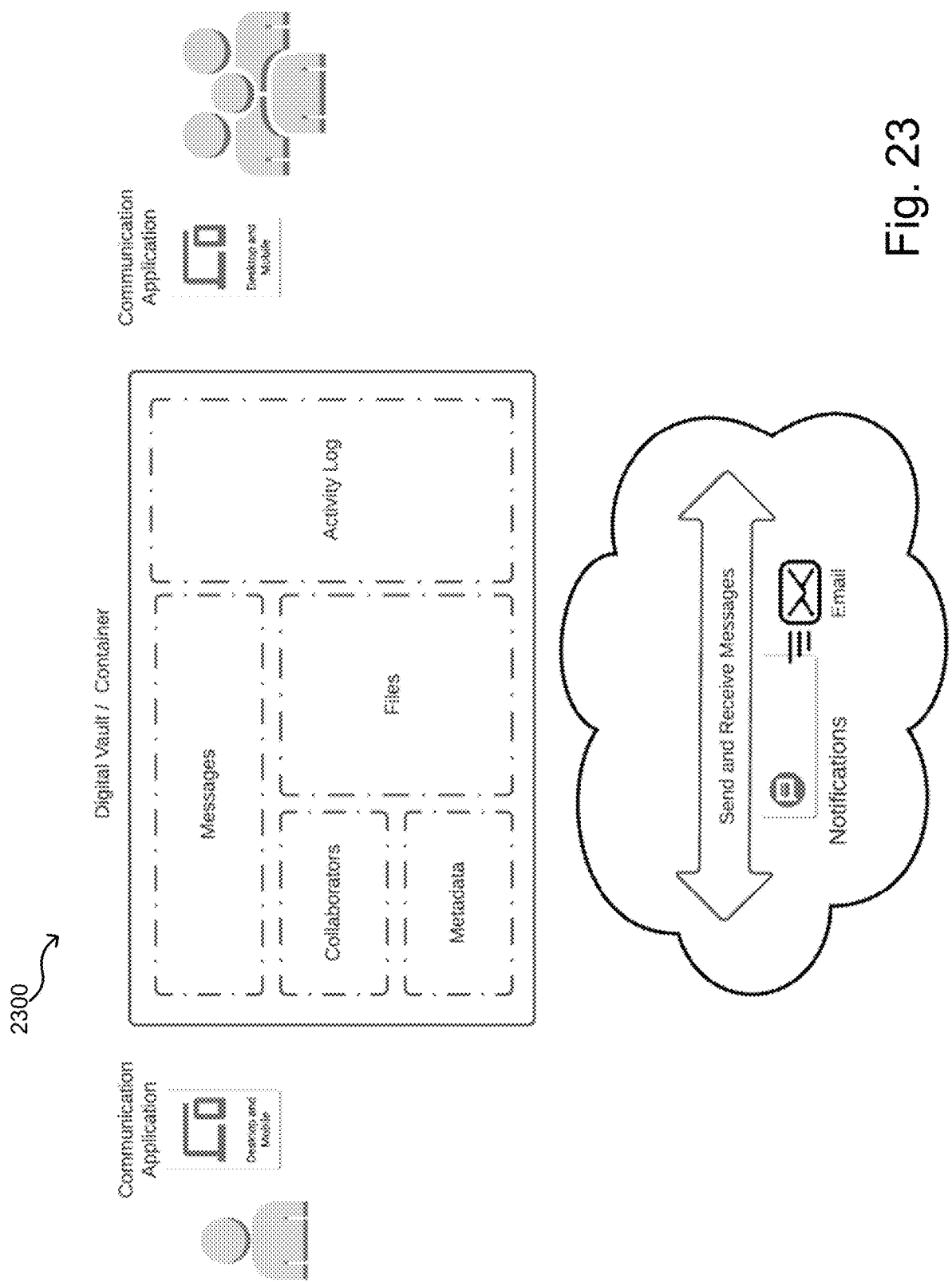
FIG. 23 illustrates a communication channel of the system in accordance with one embodiment.

FIG. 23 illustrates an example communication channel 2300 of the system in accordance with one embodiment. For example, the electronic messages may be transmitted via a communication channel. Each communication channel may contain the messages and/or communication history of the collaborator users associated with the communication channel. Individual communication channel strings may include messages from collaborator users, the ability to post messages, and/or the ability to share files from repository 2240.

The media content files may be shared via the communication channel. For example, when a user desires to share a media content files, the file may automatically open at the user device and allow the user to select files from their accessible communication channels. When files are shared within the communication channel, all included channel collaborators (or certain collaborators who have been granted permission) may view a link to the shared file, watch/listen to the file, download the file to their user device and edit the file as appropriate. Different users may be given different levels of permission for any or all of the foregoing activities.

When supported media files are shared, audio/video playback may also be supported within the communication channel. For example, media playback may be enabled via a collapsed media player application. When users initiate audio/video playback of supported media files, the collapsed player may appear at the user device 2220 (e.g., above the footer of the display screen, with an ability to expand the media player to a full screen player, etc.) and initiate playback of the media file.

System 2210 may provide a mechanism for users to accept or deny various requests that are transmitted via the communication channel. The requests may, for example, be to approve metadata or to approve content or data updates directly from the communication channel. The communication channels may be associated with objects and metadata stored in a container such as a folder, project, or locker.

System 2210 may establish one or more communication channels as a private electronic connection between a plurality of devices (e.g., communication cables) that can be exclusive to users of the system. Each communication channel may correspond with a private "group chat" for users who possess the proper access permissions to view electronic messages transmitted via the communication channel. Cable communications are specific to the communication channel. The communication channels have the ability to transmit, track, and store electronic messages from all other collaborator users within the communication channel. The communication channel may be exclusive and specific to each private or public channel associated with system 2210.

The electronic message may include data associated with the distribution rights of the media content. For example, the user may confirm (or deny) agreement for the ownership, distribution and other rights associated with the media content. This may include, for example, ownership shares in the content, distribution rights for the content, splits/percentages, and so on. As another example, the split percentages may be provided via the electronic message. When split data is changed, users associated with the media content can be sent an electronic message to confirm or deny the change directly from the message (e.g., by selecting "Confirm" or "Deny" in the message). Users can accept and acknowledge splits percentages directly within a message or group conversation by selecting a button, digitally signing, or some other interactive action. Upon providing the response, the data may be updated and stored in repository 2240.

An audio or video call may be initiated between two or more users using system 2210. For example, a first user and a second user may initiate an audio/video call (e.g., between two parties), a group call (e.g., between more than two parties), or group meetings (e.g., a virtual meeting room (such as a secure platform where users can join and communicate). In any of these instances, the time that the communication is initiated, the duration of the communication, the parties to the communication (and their individual durations) and subject matter of the meeting (e.g., the media content) may be stored with repository 2240. An audio/video recording of the call may also be stored in repository 2240. The system may also store documents, media files, or other materials that were shared by one or more participants in the call and may identify the participant who shared the material during the call.

Embodiments may implement a one-click feature, allowing a user to initiate a call/message to all users associated with a container or content item. Information re contributors for each container or item in a container can be stored for such one-click call/messaging purposes. Embodiments may further be implemented to provide the option to invite external parties (e.g., non-collaborators) to a call or message thread and capabilities may be implemented to control parameters relating to third-party access such as, for example, limiting the type of access provided to certain parties (e.g., read-only access), placing temporal access on certain parties (e.g., can only access certain messages for limited period of time, can only participate on given dates or given times, etc.), limiting the types of responses ⅓ party can make, and so on. Likewise, users invited to a message string may be permitted to view messages for the entire string or may be limited to viewing only messages occurring after that party was included in the string. Embodiments may also be configured to limit non-collaborator access such as by limiting the quantity of media plays, limiting media plays by time, code or date and limiting media plays from the point of inclusion in the message string.

From the .tune file or system 2210, the user may provide a single response (e.g., one click) to generate and transmit an electronic communication or call to other users (e.g., collaborators) associated with the media content (entity/container). System 2210 maintains and manages contact information and related data, and can enable communications to chat, direct message, or one to one calls (e.g., group audio, chat, and video).

System 2210 may provide an option to invite external parties to a chat for a period of time along with various access controls/roles. For example, a user can be invited to a communication channel for a week and their access could possibly be limited to only viewing communications starting a specified date and/or as a "read-only" user. In another example, the user may be given access to see a history of transactions associated with the media content, including conversations (e.g., view, send, etc.).

Communication users may be provided with an access code, such as from the music owner or the digital vault, that is either a single use, disposable access code or a user-specific, non-transferable access code that remains valid for a predetermined period of time established by the music owner.

An access role can be assigned to an individual electronic message. For example, if an electronic message includes a question that requires a response (e.g., "Accept" or "Deny," etc.), it can be read-only or viewable for some users while other users can have access to respond by interacting with the message. In another example, a user may initiate a request message that asks for users to confirm data. This may include their publishing ownership percentage or other data. Certain users can select an "accept" or "deny" response while other users can follow the conversation (e.g., view, read-only, etc.) and see their responses.

The owner users may define access rights for collaborator users to access data in system 2210, including access rights of a particular communication channel. The channel owners may specify if new collaborator users may view the entire communication history within a communication channel, or may specify if new collaborator users may view communications within a communication channel from the point of inclusion going forward until the point of exclusion.

In addition to collaborator users, channel owners may provide non-collaborator users with limited and temporary access to communication channels. Non-collaborator users may have limited accessibility to data, including limited viewing to communications within a communication channel from the point of inclusion until the point of exclusion, as designated by the channel owner. Channel owners may limit access to non-collaborators by time (e.g., 1 day, 1 week, 1 month, etc.). Channel owners may send disposable codes to non-collaborators that may include a specified time limit, or number of plays of an audio file within the communication channel.

The collaborator users may have the ability to share files stored in repository 2240 privately with the other collaborator users on a communication channel. The collaborator users may have the ability to play media content files within the communication channels, including music and video files, within a custom media player that is accessible via the communication channel. The activity related to playing or sharing the media content file within the communication channel may be recorded and logged within the transaction log (e.g., container fingerprint element 1018). As discussed, the transaction log may create an immutable record of file sharing, file downloads, and/or streaming media playback within the communication channel. The immutable record may be timestamped to provide a chronological history of file activity and collaborator communications within the communication channel.

In some examples, the transaction log (e.g., container fingerprint element 1018) may save audio or video recordings of the communications between/among users. This may include discussions, conversations, electronic communications, or public/private channels between collaborators (parties) as part of the fingerprint (audit trail, immutable record, etc.). This may also include documents, music, artwork, or other media or files shared during the communication.

FIG. 24 illustrates an electronic communication in accordance with one embodiment. The electronic message may comprise message information (e.g., text, emoji, etc.), link or pointer to media content (e.g., audio, video, image, etc.), interactive module (e.g., thumbs up/down, rating, digital signature, etc.), data security information (e.g., timestamp, internet protocol (IP), unique identifier (ID), checksum, access key, location, etc.), message security, audit information, access role information, sender information, recipient information, and/or container identifier.

Various examples of electronic messages are provided. For example, the electronic message may be transmitted from a first user to a second user, where the first user asks for feedback about media content (e.g., a music track) from the second user. The second user can access the media content via a private or public communication channel to the media content that is stored with the system (e.g., in repository 2240). The second user can provide the feedback as text or by selecting an option in the electronic message (e.g., thumbs up or thumbs down, etc.). In another example, the first user asks for a confirmation about a writer's share of the media content (e.g., a song) from the second user. The second user may provide a percentage value and a digital signature, both of which may be stored with the system (e.g., in repository 2240). In another example, the first user may ask for a confirmation about a predetermined writer's share of the media content (e.g., a song) from the second user. The second user may select an option in the electronic message (e.g., approve, deny, etc.) which may be stored with the system (e.g., in repository 2240).

Access to system 2210 may be restricted using an onboarding process. For example, the users may be registered and can use their credentials to sign in to a mobile application stored at their user device 2220. Users may not have the ability to create independent accounts outside of the system, so that the system can authenticate and authorize their access to the data.

Figure 25:
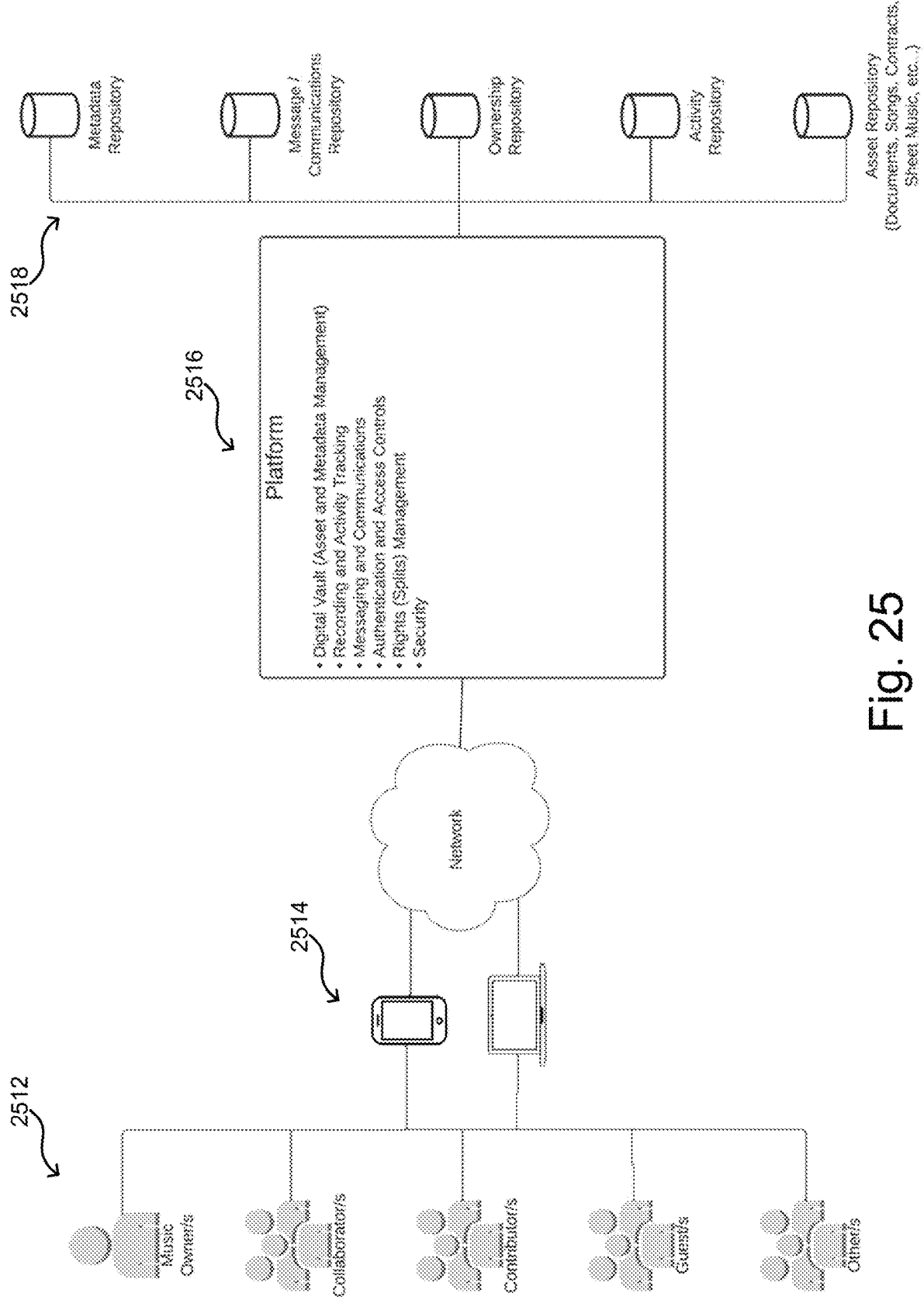
FIG. 25 illustrates a high level overview of the vault computer system, including communications and messaging, in accordance with one embodiment.

FIG. 25 illustrates an example of a high level overview of the vault computer system, including communications and messaging. The illustrated system in FIG. 25 may correspond, for example, with one embodiment of digital vault 110 illustrated in FIG. 1. For example, the system may include the digital vault, recording and activity tracking (e.g., users that access media content, etc.), messaging and communications (e.g., users that interact digitally via public or private communication channels, time stamps, message content, etc.), authentication and access controls (e.g., limited access to media content for certain user IDs, etc.), rights or splits management (e.g., identifying percentage of contribution to generating the media content, etc.), and security (e.g., technically securing media content, etc.). In some examples, the media content may be contained in the container (e.g., in a .Tune file container) to associate one or more content items and metadata discussed throughout the application. In the illustrated example, various parties 2512 may use the communication-enabled platform 2516 for conducting communications relating to the development of media content. In this example, the parties 2512 include music owners, collaborators, contributors, and may also include guests and other participants. These parties 2512 can access the platform 2516 via various devices 2514 including, for example, tablets, computers, smart-phones, computer-enabled media creation tools and so on. Platform 2516 may include capabilities for messaging and communications as described herein, as well as other capabilities such as, for example, those described above with reference to digital vault 110. The system may also include various repositories 2518, including the examples illustrated in FIG. 25.

Figure 26:
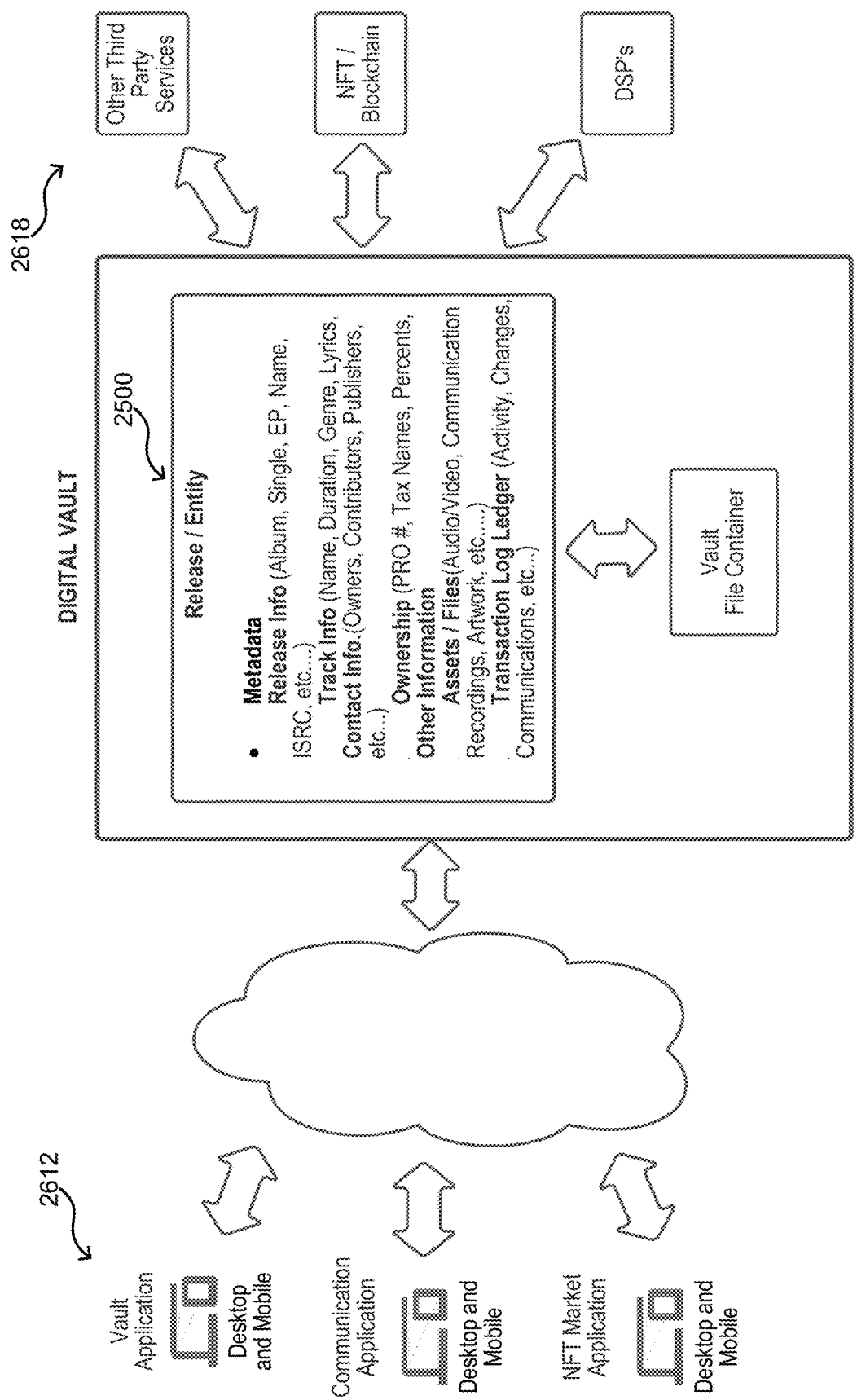
FIG. 26 illustrates an example configuration for using a digital vault for NFT transactions in accordance with one embodiment.

FIG. 26 illustrates an example configuration for using a digital vault for NFT transactions in accordance with one embodiment. With reference to FIG. 26, in this example a plurality of applications 2612 are configured to access the digital vault such as via a network interface. This example includes a vault application, a communication application, and NFT market application. The vault application may be used, for example, to perform content management such as is described in this document. The communication application may be used, for example, to perform secure communications such as described with reference to FIGS. 22-24. The NFT market application may be used, for example, to facilitate NFT transactions by a user. Although illustrated as three separate applications, parts or all of these applications may be combined in various ways into one application or a different combination of multiple applications.

Where rights to a content item are released for (e.g., sale, licensing or other transfer) via a token such as an NFT token, NFT metadata may be included in the digital vault as illustrated at 2500. In this example, the NFT metadata includes information that can be used to identify a salable item that is transferable via the NFT. In this case, this includes release information (e.g., album, single, EP, name, ISRC, etc.); track information (name, duration, genre, lyrics, etc.); contact information (e.g., owners, contributors, publishers, etc.); ownership information (e.g., PRO #, owner identification, tax names, ownership presents, other owner rights, etc.); assets and files (e.g. audio/video files, communication files, recordings, artwork, images, etc.); and transaction log ledger information (e.g., activity, changes, communications, etc.). As described above, and existing container for the work that is going up for sale may be used and augmented to include the NFT metadata, or a new container can be created for the item that is going up for sale, and this new container can include the NFT metadata.

This example also illustrates other entities 2618 that may be in communicative contact with the digital vault. For example, other third parties and services may have access to the container housing the salable item. These can include, for example, purchasers or potential purchasers of rights, third-party service providers who may provide services to facilitate the advertising, promotion, sale and closing of the transaction; providers who may supply additional items to accompany the sale of rights (e.g., concert tickets, celebrity appearances, promotional materials) and other third parties. Additionally, the system may be configured to log the NFT transaction on a block chain or other distributed ledger.

In some examples, other entities 2618 that may be in communicative contact with the digital vault may include digital service providers (DSPs). Digital vault 2500 may perform functionality as a hub of services, one of which is to provide NFT/Blockchain data by sending and receiving data with a DSP (e.g., an online store or streaming service that features digital albums and singles, Spotify®, Apple Music®, Tidal®, YouTube Music®, etc.).

Figure 27:
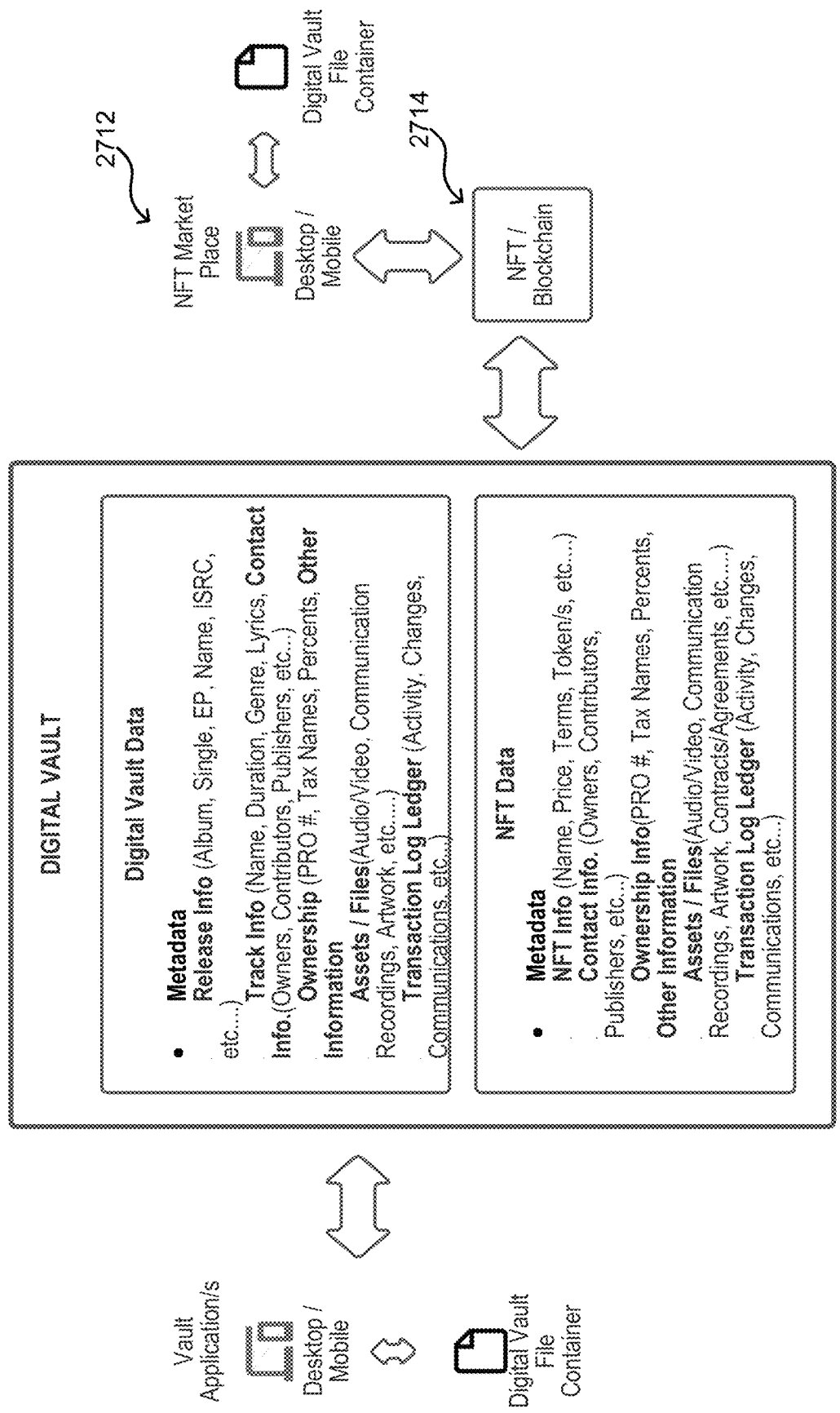
FIG. 27 illustrates an example configuration for NFT creation and management in accordance with one embodiment, example processes for NFT creation and management were described above at least with reference to FIGS. 8 and 10.

FIG. 27 illustrates an example configuration for NFT creation and management in accordance with one embodiment. Example processes for NFT creation and management were described above at least with reference to FIGS. 8, 10, 14 and 16 (and others). FIG. 27 illustrates that content creators and owners may access the digital vault including digital vault data and NFT data. A content owner may, for example, decide to put his or her ownership interest in a salable item for sale by way of an NFT transaction. The system may be configured to give the user the right to flag his or her content for sale and to list that content on an NFT marketplace. The system may further provide the seller with a digital vault application (or an application to access a cloud or server-based digital vault) and a container for the salable item. The container can be part of the cloud or server-based vault or it can be a local container in a local instance of a vault stored on the sellers device (e.g. desktop or mobile application). As illustrated, the container on the digital vault may include the content, sale data, content metadata and NFT metadata.

The NFT marketplace 2712 can include relevant information regarding the salable item, the contents of which may be determined by the seller. For example, the NFT marketplace 2712 can include a listing of the item for sale including pertinent information about the item such as, for example, a description of the item, artist information, a sample of the associated content, etc. The listing can also include an asking price or a bid price. In various embodiments, the NFT marketplace can be configured to conduct auctions for the salable item. As described above, purchasers or potential purchasers can be given access (e.g. controlled Access) to items or information in the vault pertaining to the salable item. This can include, for example, information on the terms and conditions, samples of the content up for sale, and so on.

A communication channel can be established between the NFT marketplace and the seller either via the digital vault or externally. Once a sale is completed, the transaction can be recorded on the NFT block chain 2714 and the sold item transferred to the user. In some embodiments, this transfer is accomplished by giving the new owner access rights to the file container in the digital vault, where such access rights match or correspond to the rights actually purchased in the content item. Accordingly, the new owner can access his or her content in the digital level. For example, where the new owner has full ownership rights in a content item, the new owner is free to access the item in the vault, share the item with others and so on. In other words, embodiments can be implemented in which the new owner can enjoy all of the features, benefits and advantages of the digital vault and container system. The new owner may, at his or her discretion, even remove the item from the digital vault if the new owner no longer wants the item to be maintained there. Although embodiments disclosed herein describe recording the NFT transaction on a distributed ledger, other embodiments may be implemented that don't utilize a block chain or other distributed ledger to record the transaction. The content management system can be configured to maintain its own registry, for example, to log and authenticate sale transactions conducted using the system as well as other transactions outside the system.

In various embodiments, when the sale is complete, the system allocates the appropriate rights to the container (and the purchased rights) to the purchaser. For example, in some embodiments, the system can provide the purchaser with a digital vault application and a container with the purchased rights. The container can include the purchased work or a link to the purchased work (e.g., via IPFS). The purchaser can have an individual vault in the name of the purchaser who now becomes the administrator of that container. The container can be placed into the vault and access controlled by the owner so that the content in the container is secure. The new owner can control things such as, for example, access codes and access rights, sharing of the work, reselling the work, and so on.

With various embodiments, selling owners can deposit salable content into a separate NFT container for transfer. Once the sale is complete, the content and the container can be transferred to the new owner. This can be analogized to selling the content to the new purchaser including a locked storage facility that allows the purchased properties to be secured before, during and after the sale. The system can be configured to control access to the salable items and other content in the vault before during and after the sale and the parameters of access such as who, when, what and how, can be controlled and changed as appropriate each step of the way.

Figure 28:
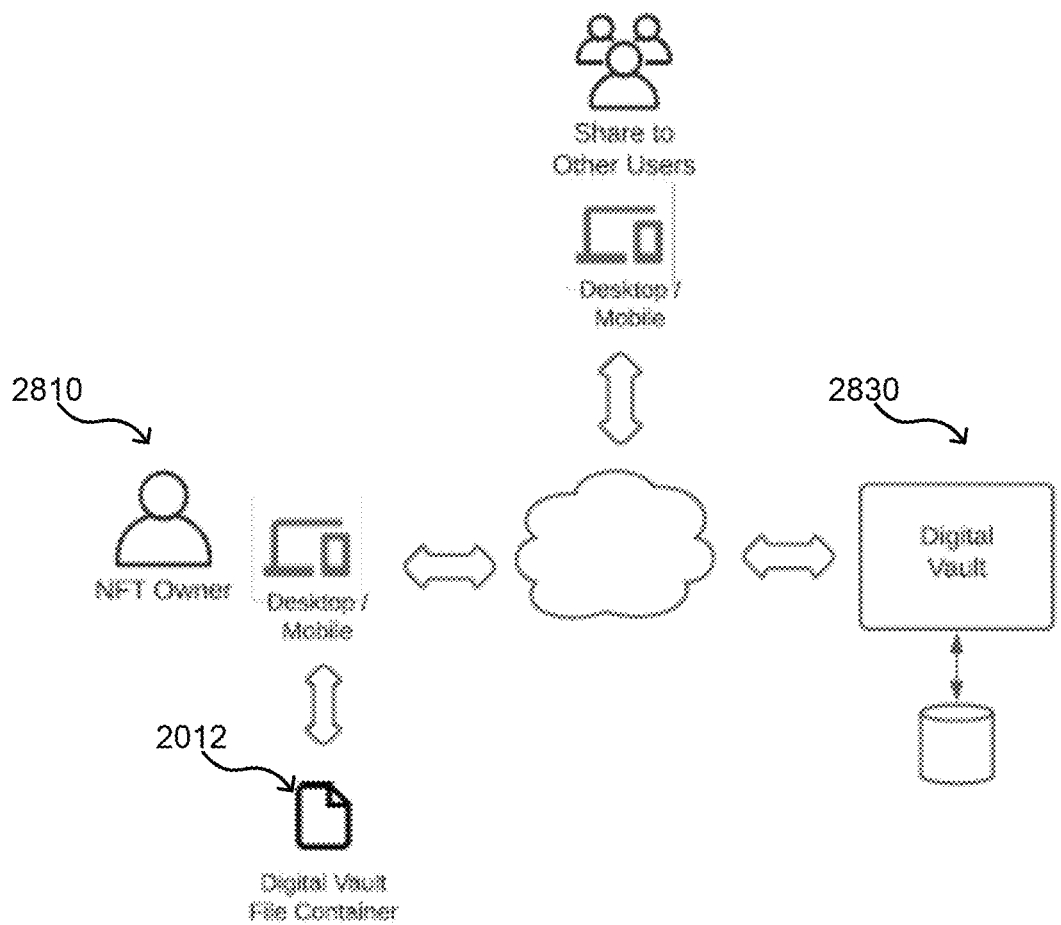
FIG. 28 illustrates an example of some additional actions that can be taken by a new NFT owner via the digital vault.

FIG. 28 illustrates an example of some additional actions that can be taken by a new NFT owner via the digital vault. In this example, a new NFT owner 2810 may access a container in the digital vault 2830 such as from his or her computer or mobile device via a network. NFT owner 2810 may also have a local copy of the container 2812 that he or she can access. As noted above, NFT owner 2810 may opt to share his or her own content with other users and otherwise manage the content via the digital vault content management system.

As described above, FIG. 29 illustrates examples of NFT metadata and other assets/files that can be included in the container.

Figure 30:
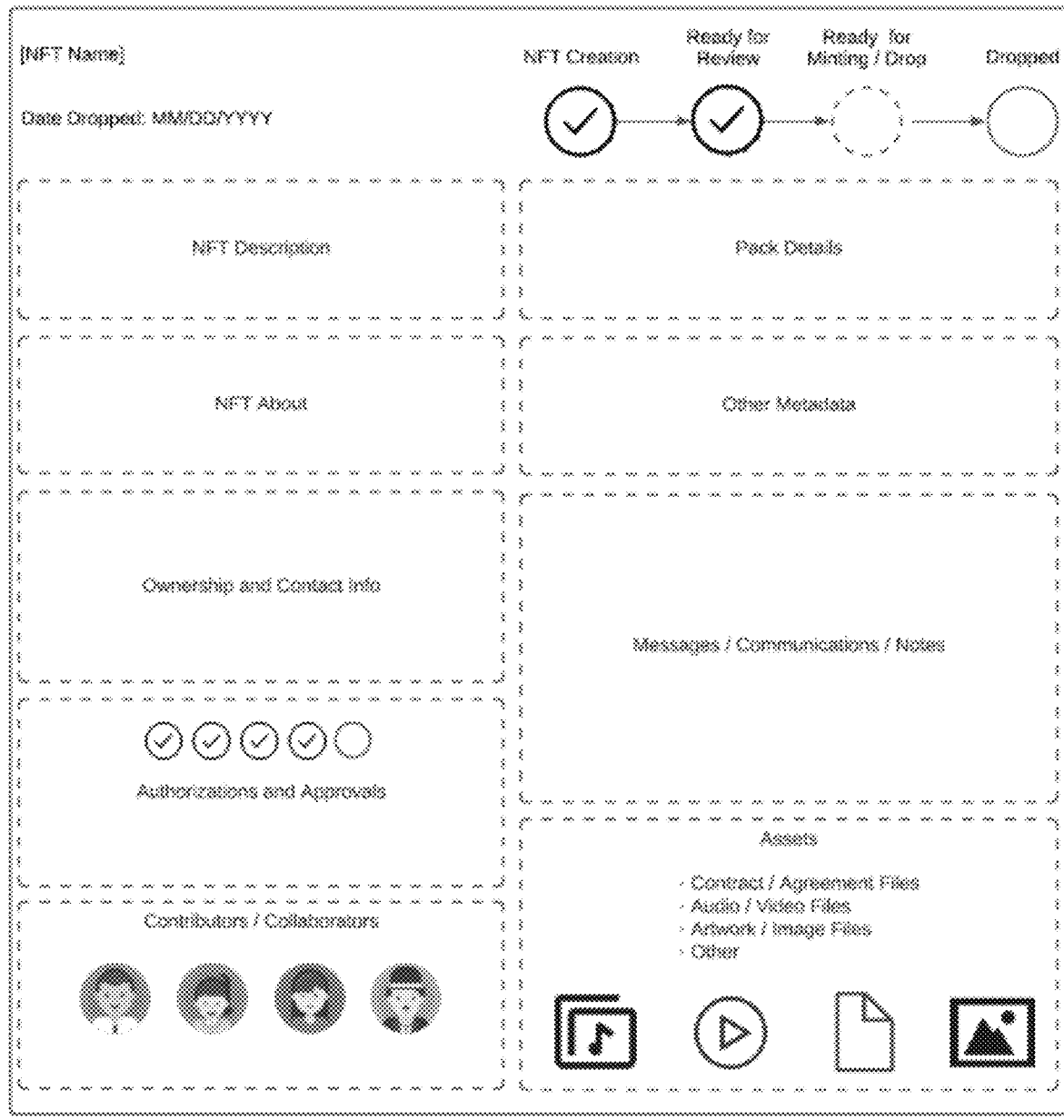
FIG. 30 illustrates an example NFT UI for a container in accordance with one embodiment.

FIG. 30 illustrates an example NFT UI for a container in accordance with one embodiment. As noted above with reference to FIGS. 11 and 12, this user interface is merely one example of a user interface that can be provided. This illustrates information items that can be included in the UI such as, for example, a description of the NFT, details about the NFT package, NFT and other metadata, ownership and contact information for the content associated with the NFT, messages, communications and notes pertaining to the NFT, authorizations and approvals, contributors and collaborators, and assets.

The NFT description may include, for example, a description of the content that is going to be associated with the NFT and the rights to be transferred upon acquisition. For example, this may include information such as whether full or fractional ownership is being transferred, whether ownership or license rights are being transferred, etc. Other metadata may include content metadata NFT metadata and other metadata items relevant to the content being transferred. The ownership and content information can include information regarding who owns the item for which the NFT is going to be minted, what their ownership share is, etc. The Assets field may include an identification of the particular content associated with the NFT, and other information such as contracts and agreements associated with the NFT.

The pack details can include, for example, information about other items that may be bundled with the rights to the work that are being transferred. This can include, for example, other package items like concert tickets, movie passes, backstage passes, vinyl albums, posters, sheet music, T-shirts, memorabilia, or other items that might be included as part of a package.

The authorizations and approval section can provide an indication to the user of which other users whose approvals might be needed to enter into the transaction (if any) have approved and which have not. In this example, a series of check boxes is shown to indicate the approvals obtained and not yet obtained. The contributors/collaborator section displays a list of contributors/collaborators for the content associated with the NFT transaction. The status bar at the top right hand corner shows the progress of creating, minting and dropping the NFT.

With a token transaction, the smart contract can define the parameters of the transaction this can include, for example, terms such as purchase price; agent/broker commissions; royalties or residuals for the seller, co-owners or other contributors; limitations or conditions on rights; and so on. For example, as described herein the content management system may keep track of creation, contribution, and ownership for works in the vault, which can drive the distribution and split of royalty or other payment rights associated with content items. In some implementations, payment rights for various transactions associated with a content item may be specified for that content item, such as in metadata in the vault. Different 'splits' may be specified for different forms of rights in the content (e.g., rights to perform, reproduce, display, distribute, create derivative works, etc.). Similar to or in conformance with this, the NFT (e.g., via a smart contract or otherwise) can specify parties who are to receive payment associated with the content being transferred and the splits or distributions they are to receive. For example, a smart contract associated with the transaction may specify how payment for the transfer is to be distributed upon receipt, or who is to be paid what amounts. Where royalty payments, payments for future transfers of the rights or other future payments are contemplated, the smart contract may specify how such future payments are to be distributed or paid among the various rights holders.

In various embodiments, the content management system can be configured to be the intermediary for the current sale of a content item as well as for future sales and for royalty or other payments. Embodiments may further be configured in which the content management system collects the payments and conducts the distributions associated with a sale, future sales, royalties or other payments that come due. Payments may be distributed as specified in the smart contract for the subject NFT and the content metadata can be updated to reflect the payment distribution rules. The content management system can also be configured to act as an escrow agent for such transactions.

Embodiments may also be implemented to encrypt or obfuscate the NFT or ledger information that is stored in the public blockchain or other public record. For example any situation in which a popular artist sells the rights to his or her song or licenses it to another entity via the Vault NFT (or not NFT) they may not want all the information to be public like the revenue, plays, ownership percentages, owners, etc. In such circumstances, the system can be configured to provide information in the NFT, Smart Contract, Blockchain, etc. in a manner that can only be interpreted (decoded, decrypted, etc. . . . ) by an authorized user having access to the digital vault. Further embodiments may be configured such that the system can ensure the vault information and assets are immutable based on a hash or some other means so the public record could have the hash, token, keys, and so on that will confirm the validity of the data in the vault and what they are viewing in the vault. In such embodiments, when the purchaser wants to resell the salable item, they can invite the perspective buyers to view the item in the vault and then when it sells the transaction will be recorded on the blockchain but only the person with access to the vault will be able to access the viewable (decoded/decrypted) details and assets pertaining to that NFT, associated ledger and smart contract terms.

The term "coupled" refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

Figure 5:
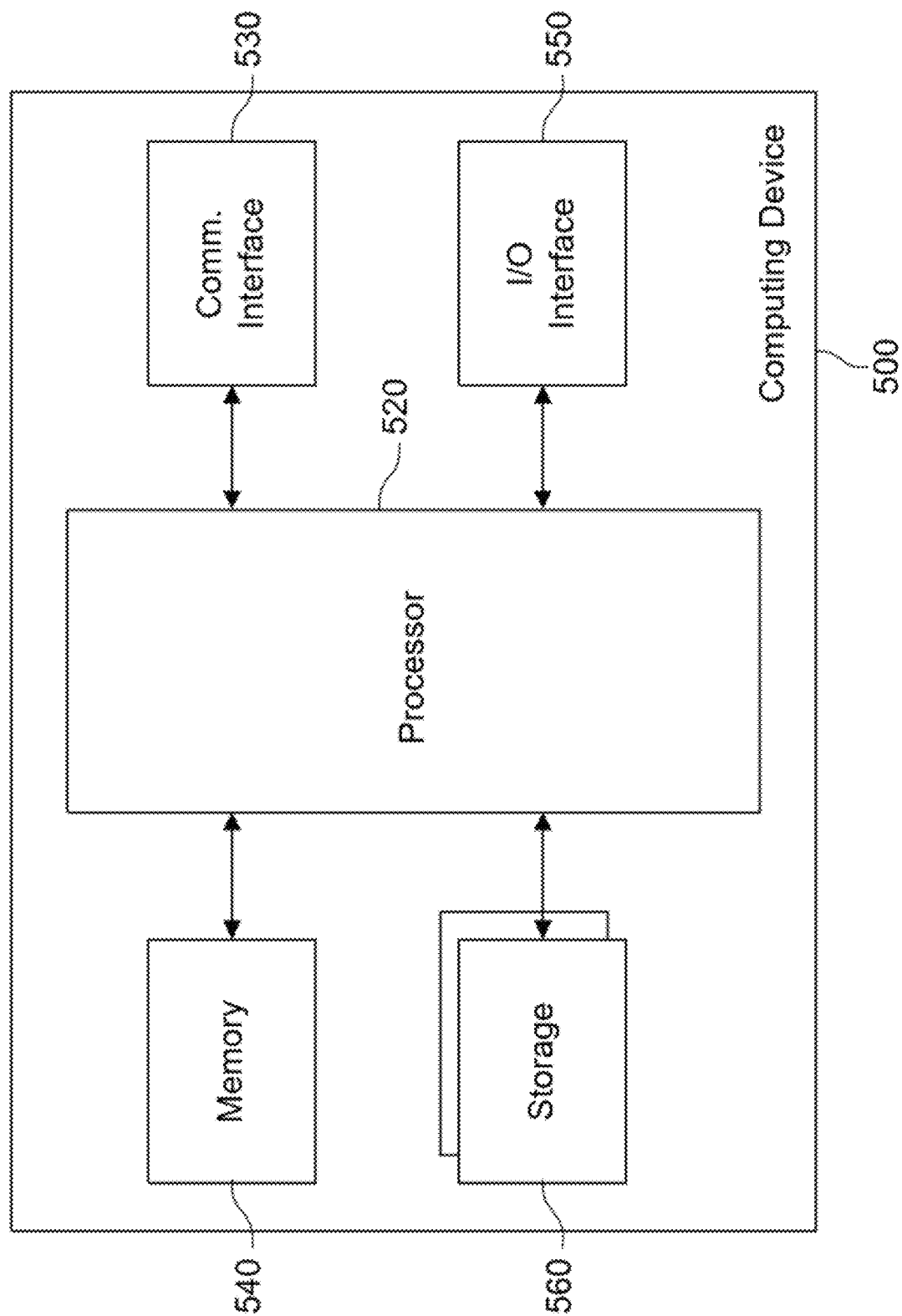
FIG. 5 illustrates an example block diagram of a computing device.

Referring now to FIG. 5 there is shown a computing device 500. The computing devices described herein, such as the digital vault, control devices, reviewing devices, containers and other instrumentalities described herein may be configured as shown in FIG. 5. The computing device 500 includes a processor 520, communications interface 530, memory 540, and an input/output interface 550. Further, although these elements are shown independently of one another, each may, in some cases, be integrated into one another.

The computing device 500 is representative of the mobile devices and other computing devices discussed herein. For example, the computing device 500 may be or be a part of a mobile device or a server. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. The processes, functionality and features may be embodied in whole or in part in software which operates on the computing device 500 and may be in the form of firmware, an application program, an app, a dynamic linked library (DLL), a script, one or more subroutines, or an operating system component or service. The hardware and software and their functions may be distributed such that some components are performed by the computing device 500 and others by other devices.

The processor 520 may be or include one or more microprocessors, application specific integrated circuits (ASICs), or a system-on-a-chip (SOCs).

The communications interface 530 includes an interface for communicating with external devices. In the case of a computing device 500, the communications interface 530 may enable wireless communication with a mobile device. The communications interface 530 may be wired or wireless. The communications interface 530 may rely upon short to medium range wireless protocols like Bluetooth®, infrared, and/or 802.11 x wireless or another wireless protocols then in existence.

The memory 540 may be or include RAM, ROM, DRAM, SRAM and MRAM or other memory systems, and may include firmware, such as static data or fixed instructions, boot code, system functions, configuration data, and other routines used during the operation of the computing device 500 and processor 520. The memory 540 also provides a storage area for data and instructions associated with applications and data handled by the processor 520.

The I/O interface 550 interfaces the processor 520 to components external to the computing device 500. In the case of servers and mobile devices, these may be keyboards, mice, pens, voice activated systems and other peripherals.

The storage 560 is non-transient electronic, machine readable media which provides non-volatile, bulk or long term storage of data or instructions in the computing device 500. The software described herein may be stored in the storage 560. Storage devices include hard disk drives, DVD drives, flash memory devices, and other storage devices. Multiple storage devices may be provided or available to the computing device 500. Some of these storage devices may be external to the computing device 500, such as network storage, cloud-based storage, or storage on a related mobile device. This storage 560 may store some or all of the instructions for the computing device 500. The term "storage medium", as used herein, specifically excludes transitory medium such as propagating waveforms and radio frequency signals.

The system may also enable collaboration and communication between various entities to connect portions of the system in creating, distributing, licensing, and managing the media content. For example, the system can be configured to For example, the system can establish a secure and immutable history of communication and activity associated with media content, including the inception and evolution of the media content. The system can create an audit trail of the creative discussion process. This may include cloud storage and filesharing services, group conferencing, messaging application, social networking application, direct messaging application, and/or music rights and metadata management application or service. For example, embodiments may be configured to capture and store communications among various parties for works being created, modified, managed or stored in the vault, including messages, recordings (e.g., audio, video etc.), still or motion images (e.g, photographs, artwork, pictures, videos, etc.), timestamps, participants, an identification of which participants contributed which materials, and so on. Accordingly, a complete audit trail of not only items or other materials submitted also of communications can be maintained in the system.

The communications can be tagged by the particular contributors to each communication and logged with related materials including files and metadata. The materials can be stored in the vault in the container associated with the corresponding content that is the subject of the communication. File structures can be used to organize materials including, for example, folders, projects, lockers, profiles, etc.

What is claimed is:

1. A method for media content management, comprising:
   creating, via a digital vault, a container file comprising media content submitted by a user and content metadata;
   verifying, via the digital vault, a completeness of the content metadata associated with the media content in the container file;
   classifying, via the digital vault, the container file based on the completeness of the media content;
   identifying a salable content item that is to be offered for sale, the salable content item comprising at least part of the media content;
   creating, via the digital vault, a nonfungible token (NFT) that is populated with NFT metadata, release information, contribution information for each of a plurality of contributors associated with the salable content item, and specification of ownership rights to the salable content item, wherein the specification of ownership rights allocates selling rights to the NFT among the plurality of contributors based on the contribution information; and
   augmenting the container file, via the digital vault, to include the NFT metadata.

2. The method of claim 1, wherein the media content is a song element.

3. The method of claim 1, wherein the media content is a complete piece of content comprising multiple elements.

4. The method of claim 1, wherein the user is an owner of the media content.

5. The method of claim 1, further comprising:
   receiving the media content; and
   uploading, via the digital vault, the media content to a repository.

6. The method of claim 1, further comprising:
   receiving the content metadata associated with the media content; and
   storing, via the digital vault, the content metadata associated with the media content.

7. The method of claim 1, further comprising:
   sending, via the digital vault, a message to a second user inviting the second user to access the container file; and
   confirming that the second user is authorized to access the container file based on the message.

8. The method of claim 7, wherein the message includes an access code used for confirming authorization to access the container file.

9. The method of claim 8, wherein the access code is a single use access code.

10. The method of claim 8, wherein the access code is a user-specific, non-transferable access code that remains valid for a pre-determined period of time.

11. The method of claim 1, wherein the content metadata comprises at least one of a length of the media content, performing artist name, producer name, arranger name, author name, recording engineer name, recording studio name, recording date and time, genre of the media content, and sub-genre of the media content.

12. A system for media content management using a digital vault, comprising:
   one or more processors; and
   a memory coupled to the one or more processors to store instructions, which when executed by the one or more processors, cause the one or more processors to perform operations comprising:
   create a container file comprising media content submitted by a user and content metadata;
   verify a completeness of the content metadata associated with the media content in the container file;
   classify the container file based on the completeness of the media content;
   identify a salable content item that is to be offered for sale, the salable content item comprising at least part of the media content;
   create a nonfungible token (NFT) that is populated with NFT metadata, release information, contribution information for each of a plurality of contributors associated with the salable content item, and specification of ownership rights to the salable content item, wherein the specification of ownership rights allocates selling rights to the NFT among the plurality of contributors based on the contribution information; and
   augment the container file, via the digital vault, to include the NFT metadata.

13. The system of claim 12, wherein the media content is a song element.

14. The system of claim 12, wherein the media content is a complete piece of content comprising multiple elements.

15. The system of claim 12, wherein the user is an owner of the media content.

16. The system of claim 12, wherein the content metadata comprises at least one of a length of the media content, performing artist name, producer name, arranger name, author name, recording engineer name, recording studio name, recording date and time, genre of the media content, and sub-genre of the media content.

17. A non-transient electronic, machine readable media storing a plurality of instructions executable by one or more processors, the plurality of instructions when executed by the one or more processors cause the one or more processors to:
   create a container file comprising media content submitted by a user and content metadata;
   verify a completeness of the content metadata associated with the media content in the container file;
   classify the container file based on the completeness of the media content;
   identify a salable content item that is to be offered for sale, the salable content item comprising at least part of the media content;
   create a nonfungible token (NFT) that is populated with NFT metadata, release information, contribution information for each of a plurality of contributors associated with the salable content item, and specification of ownership rights to the salable content item, wherein the specification of ownership rights allocates selling rights to the NFT among the plurality of contributors based on the contribution information; and
   augment the container file to include the NFT metadata.

18. The non-transient electronic, machine readable media of claim 17, wherein the media content is a song element.

19. The non-transient electronic, machine readable media of claim 17, wherein the media content is a complete piece of content comprising multiple elements.

20. The non-transient electronic, machine readable media of claim 17, wherein the user is an owner of the media content.

* * * * *